Mar. 13, 1923.
G. P. FERRELL.
TYPOGRAPHICAL METHOD AND APPARATUS.
FILED MAY 16, 1921.
1,448,620.
4 SHEETS—SHEET 1.
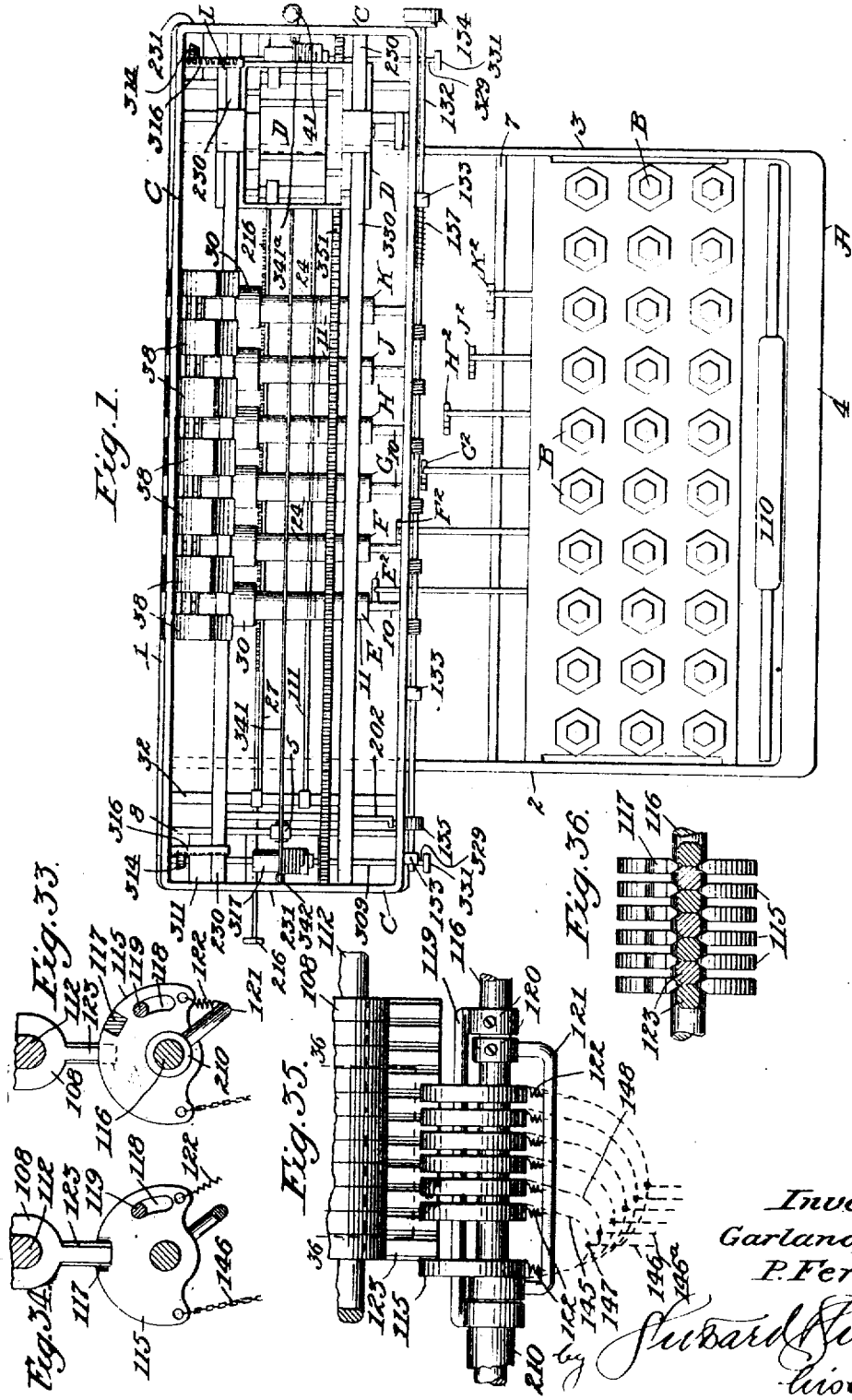
Inventor:
Garland P. Ferrell,
by Hubard & Hubard
his Attys.

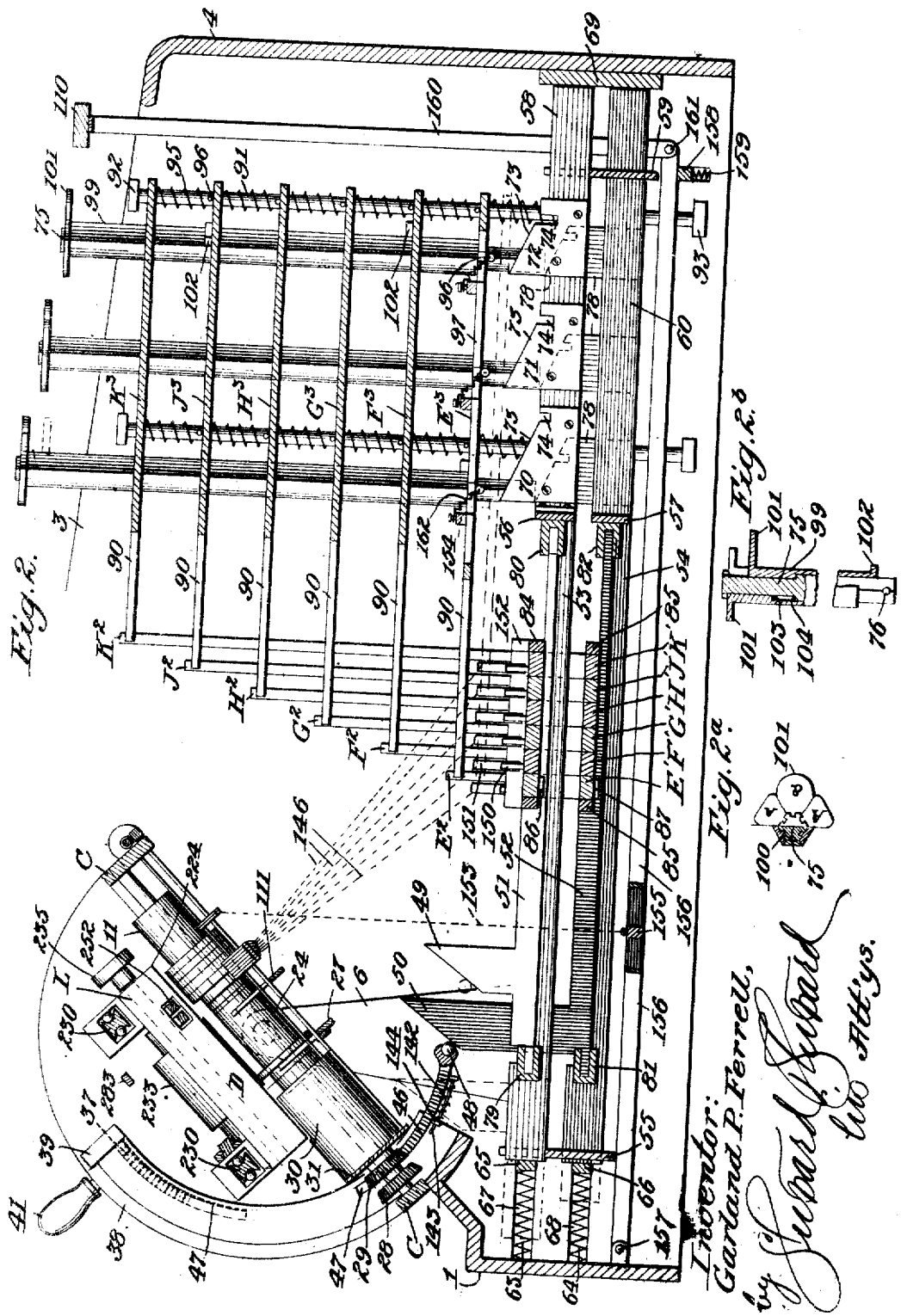

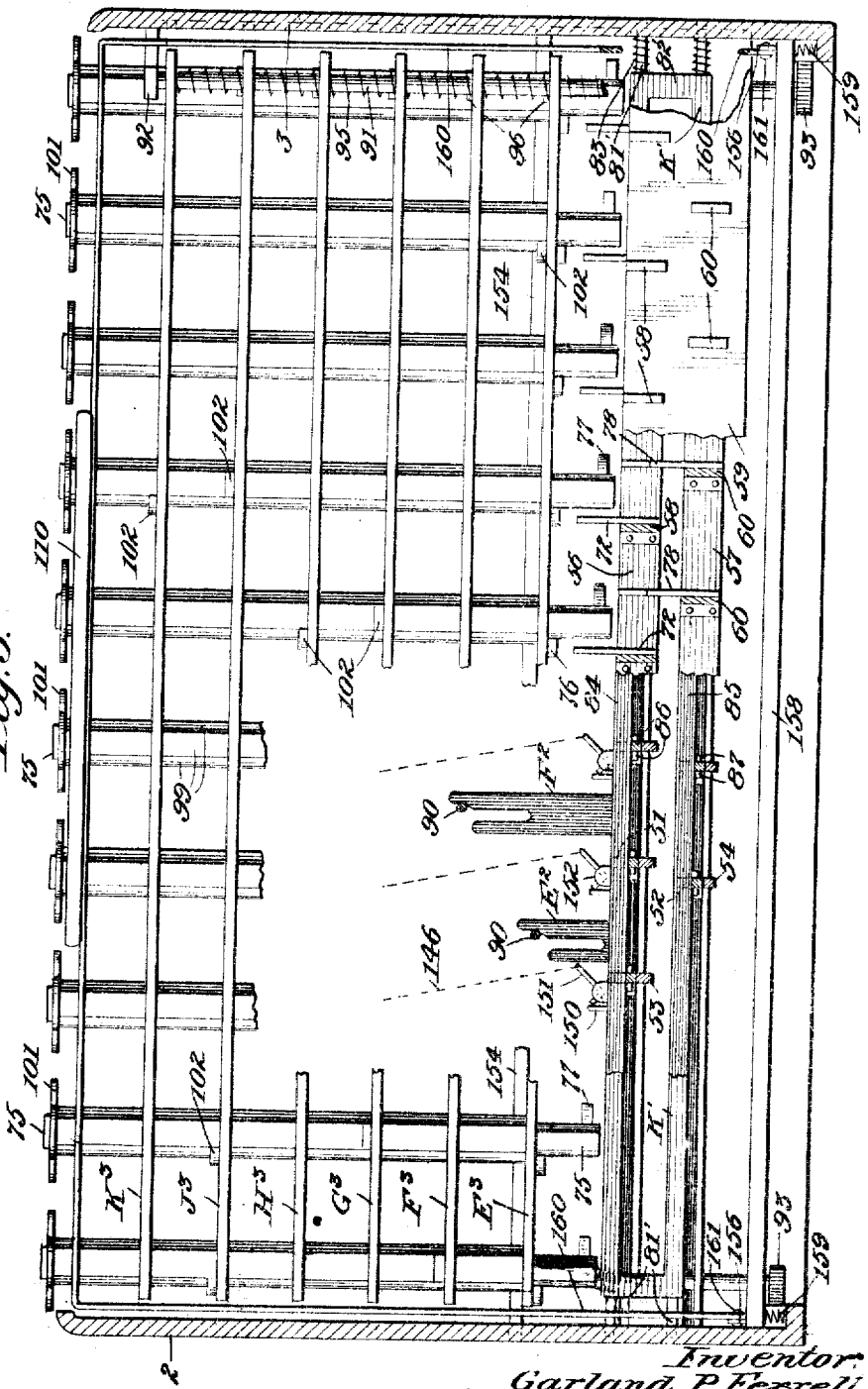

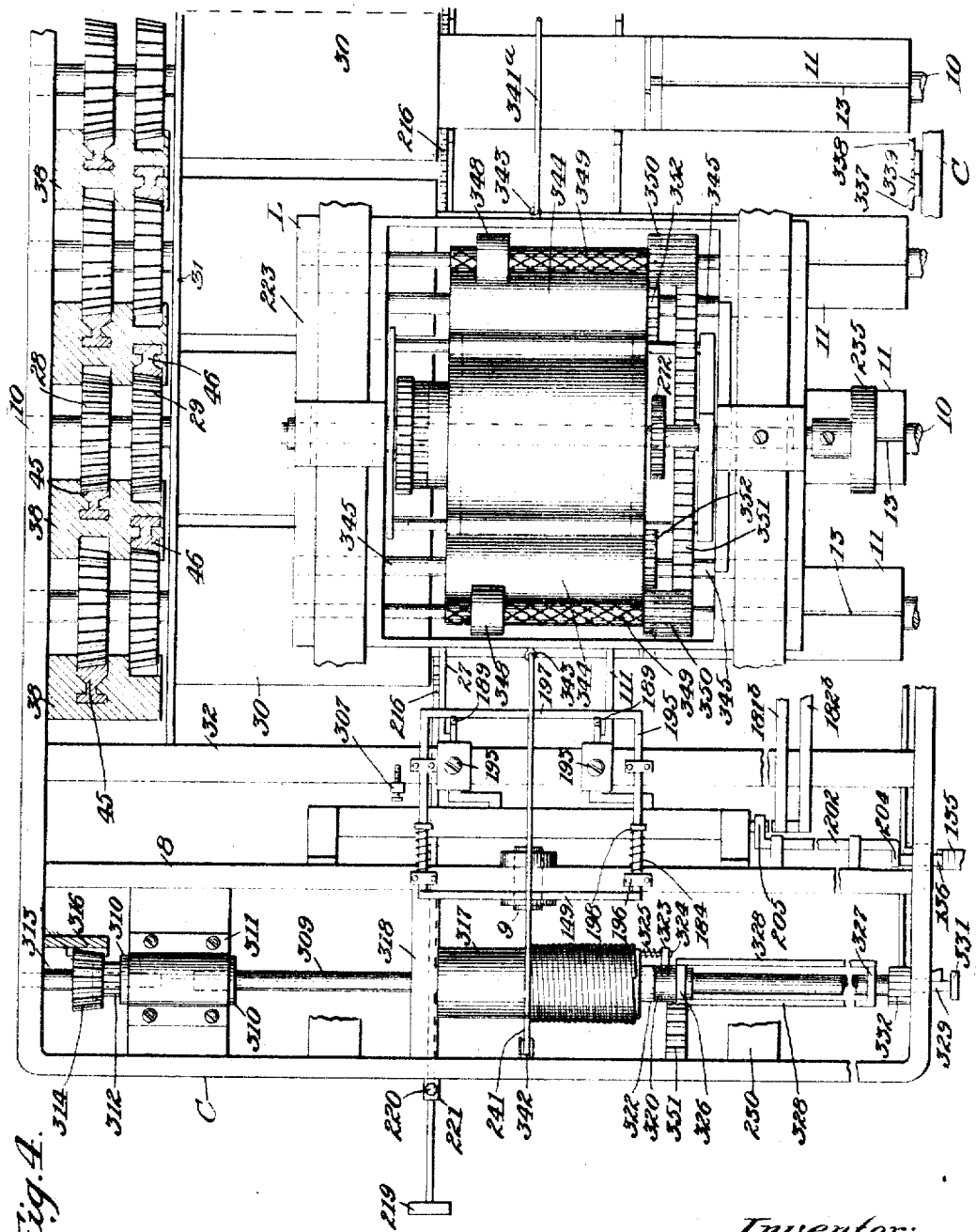

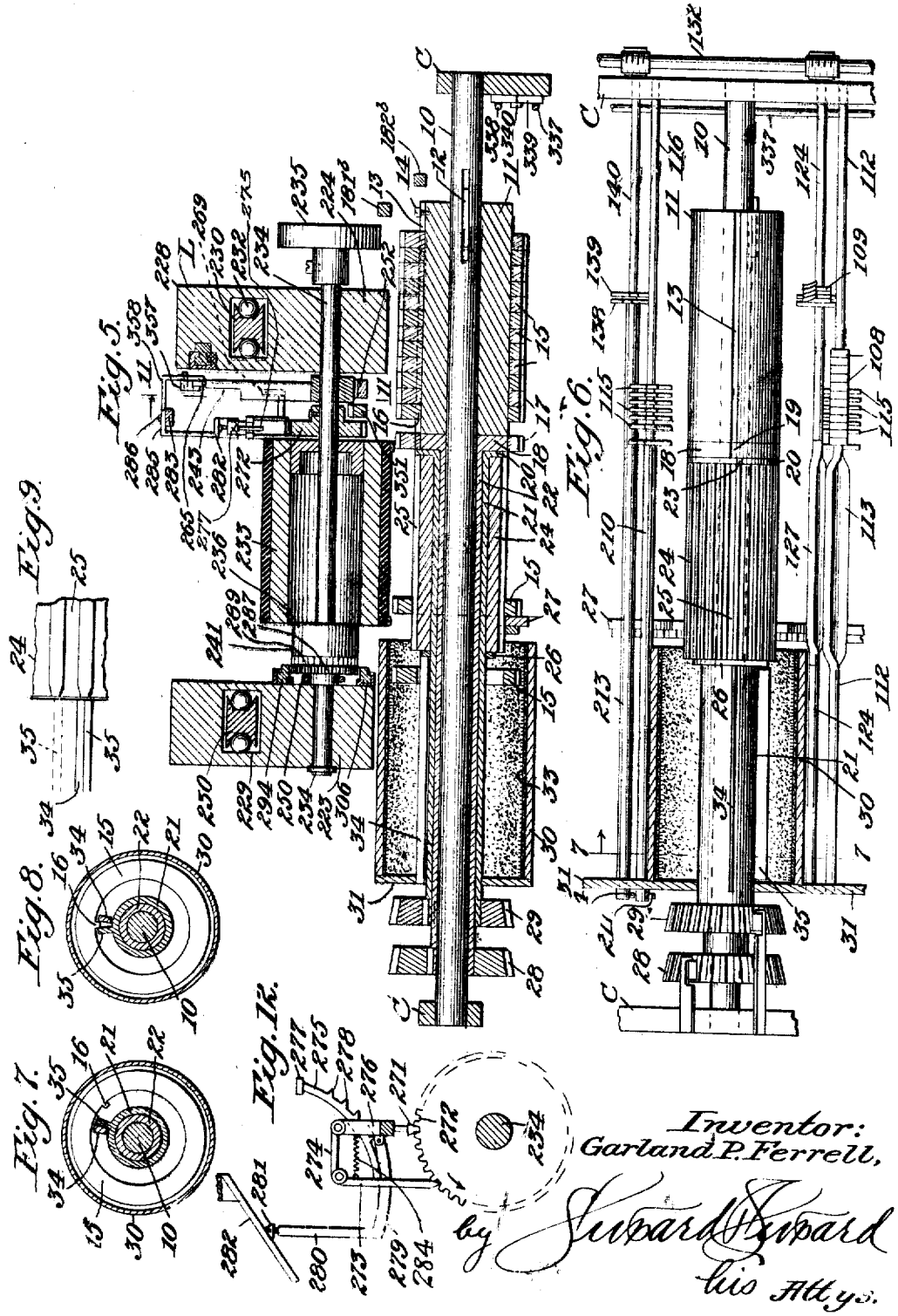

Mar. 13, 1923.
G. P. FERRELL.
TYPOGRAPHICAL METHOD AND APPARATUS.
FILED MAY 16, 1921.
1,448,620.
14 SHEETS—SHEET 6.
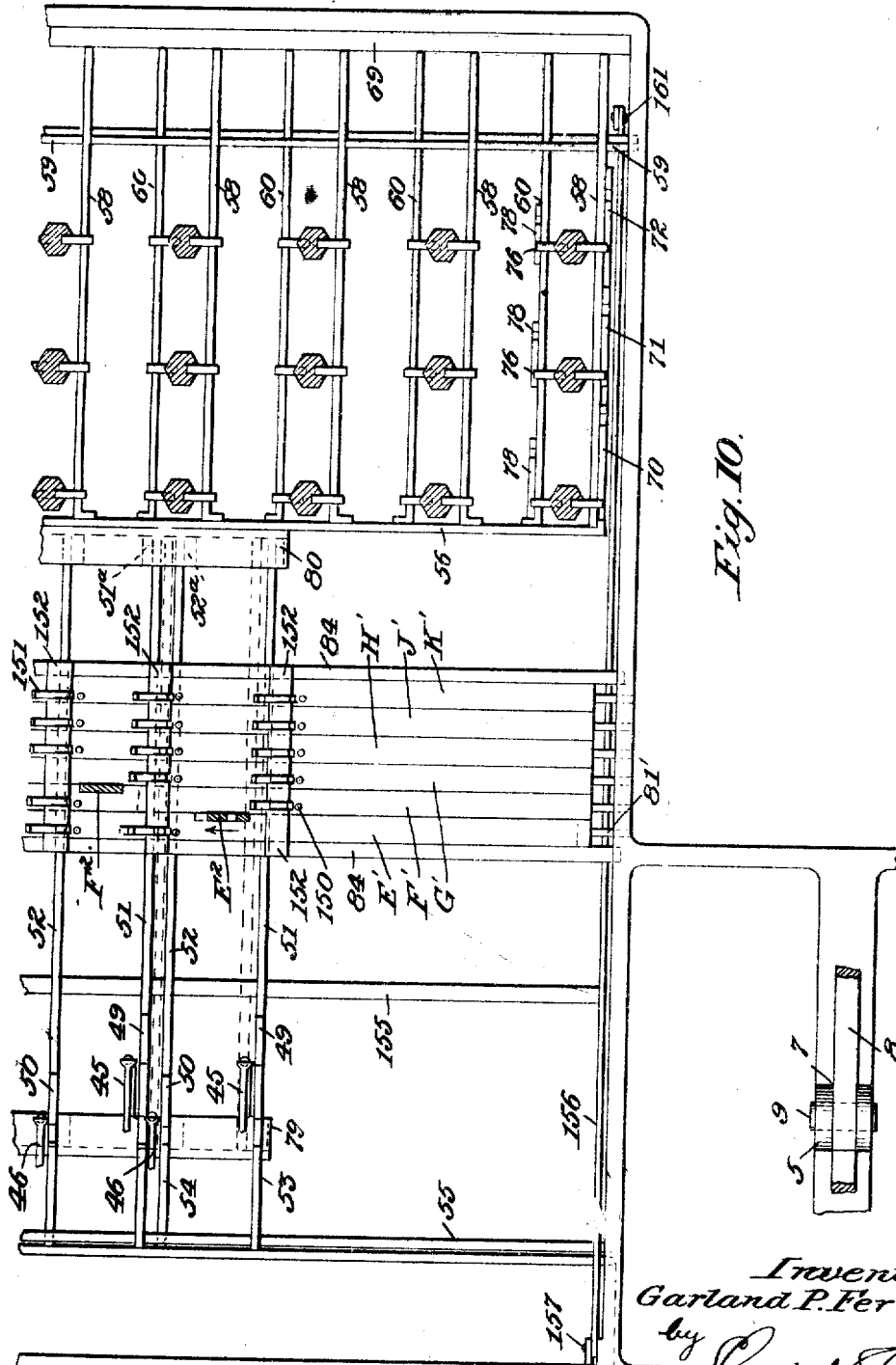
Fig. 10.
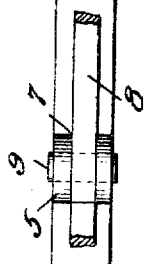
Inventor:
Garland P. Ferrell.
by
[signature]
his Att'ys.

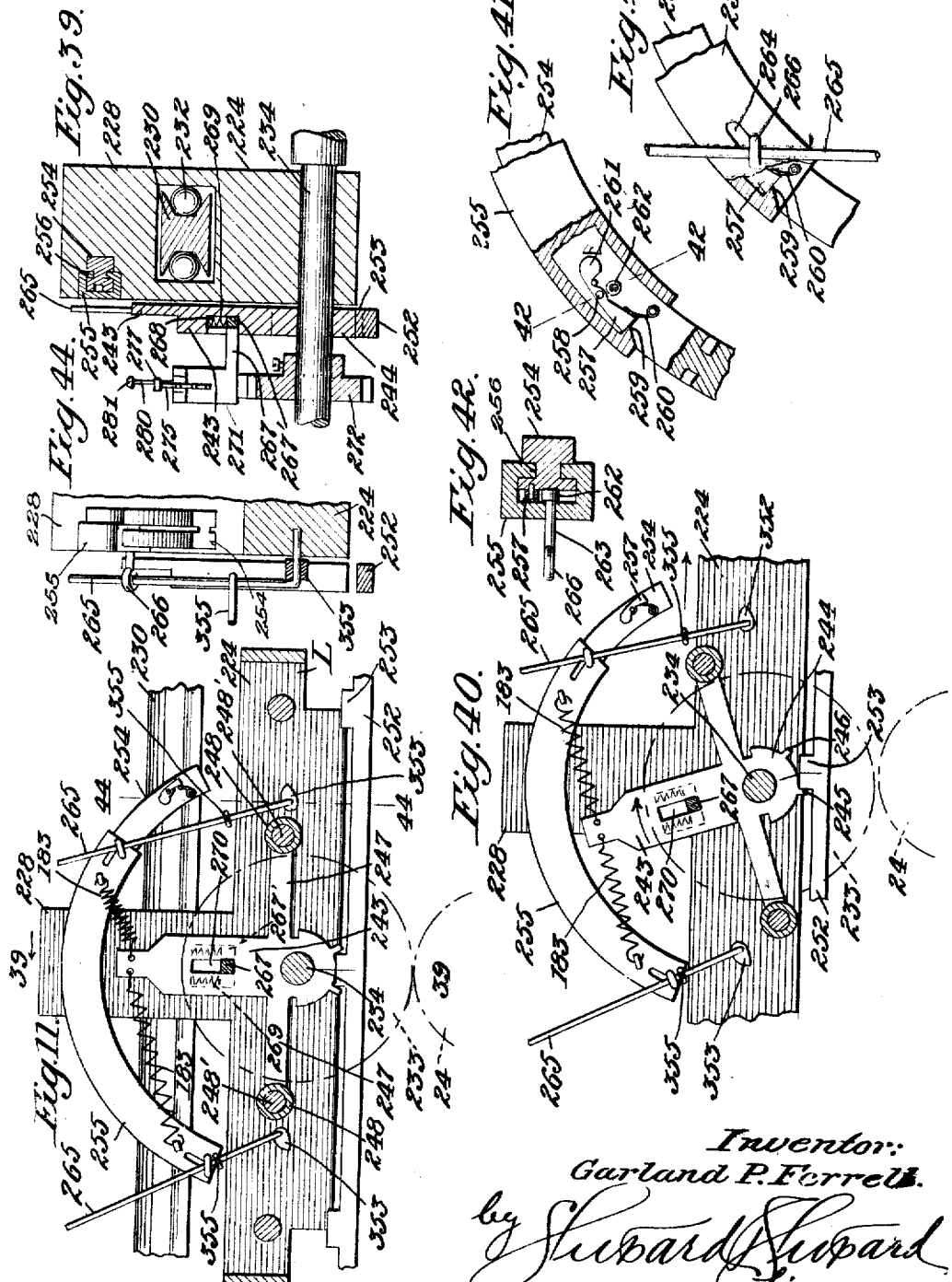

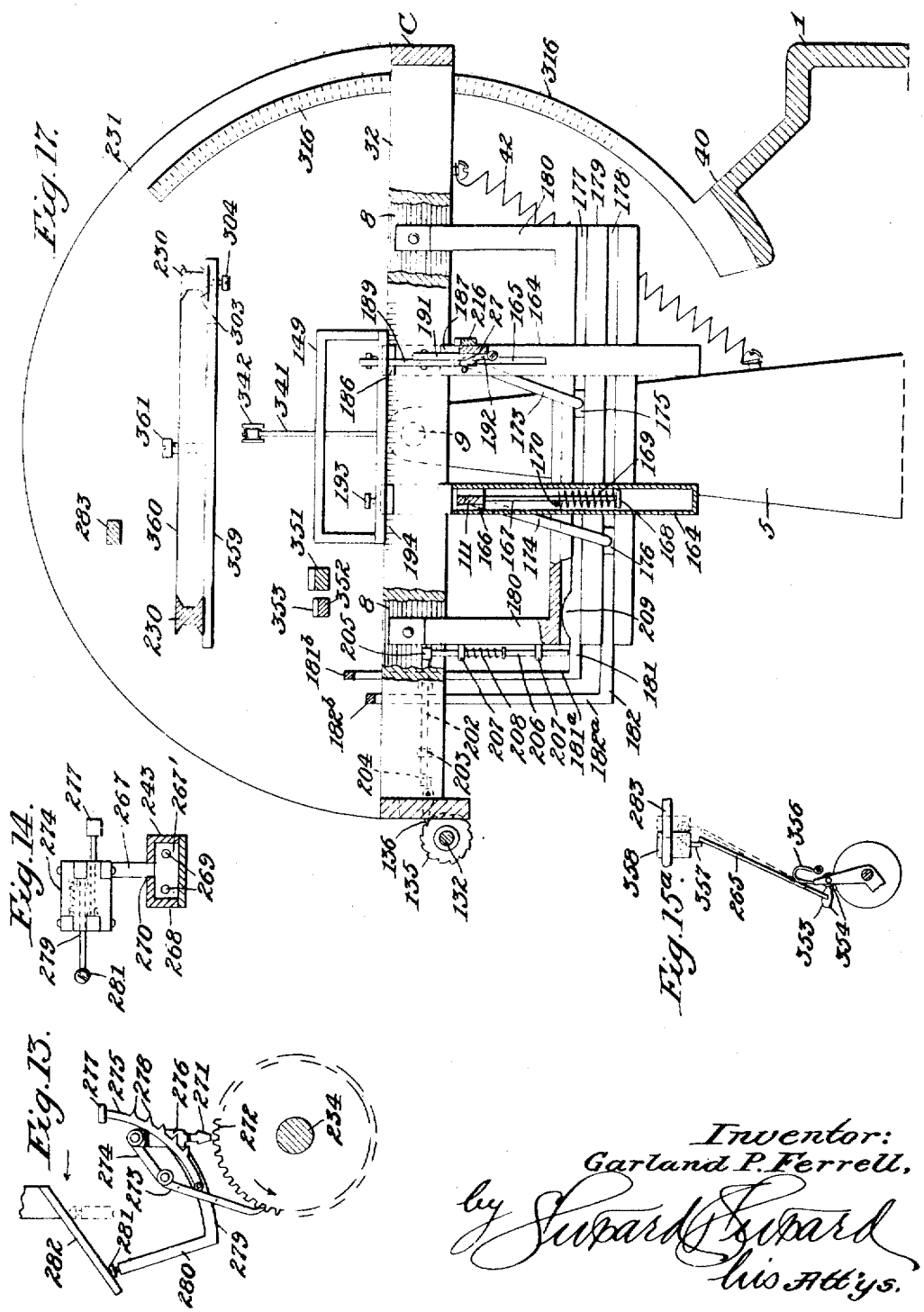

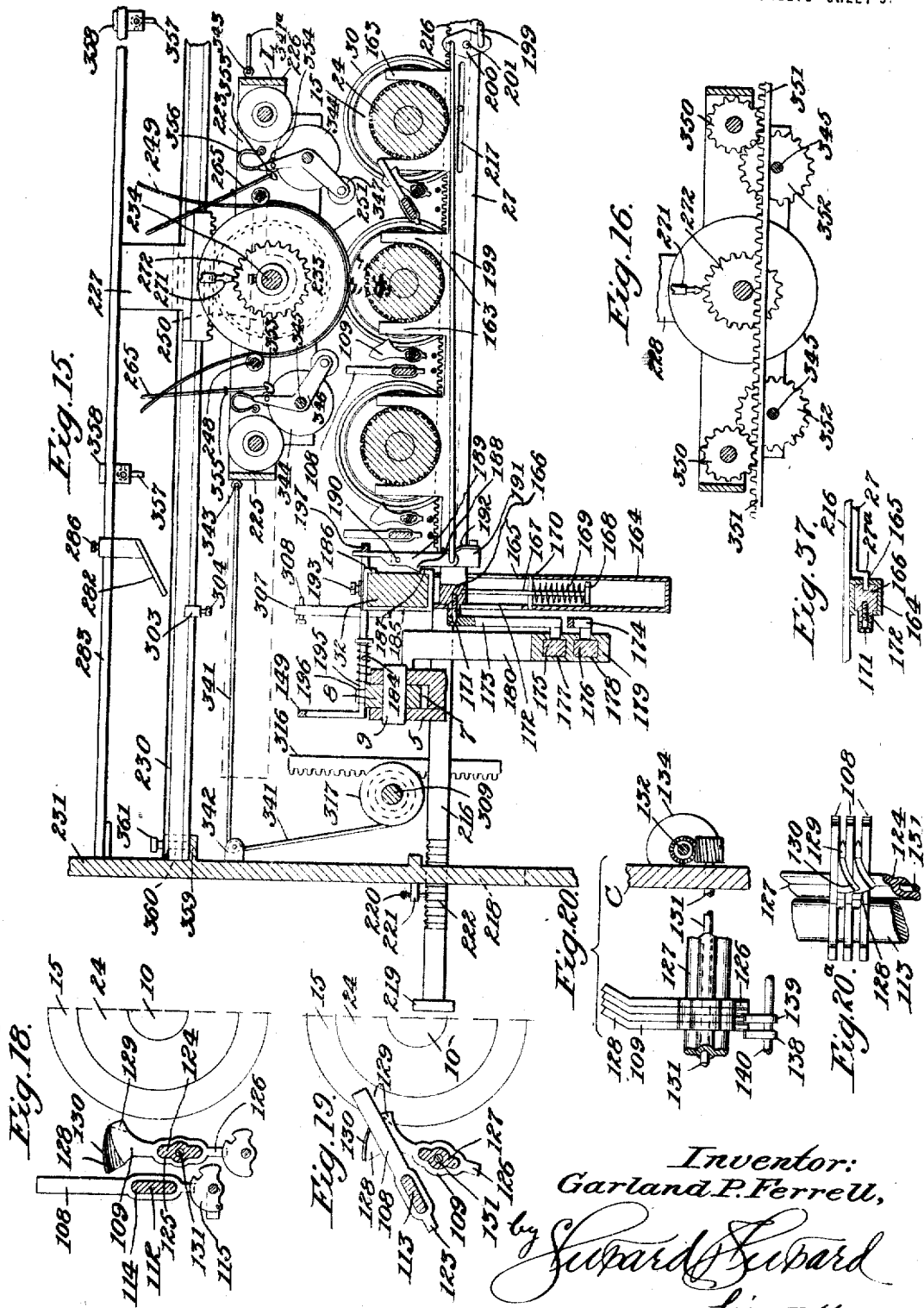

Mar. 13, 1923.
G. P. FERRELL.
TYPOGRAPHICAL METHOD AND APPARATUS.
FILED MAY 16, 1921.
1,448,620.
14 SHEETS—SHEET 10.
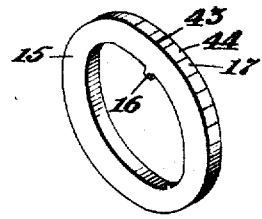
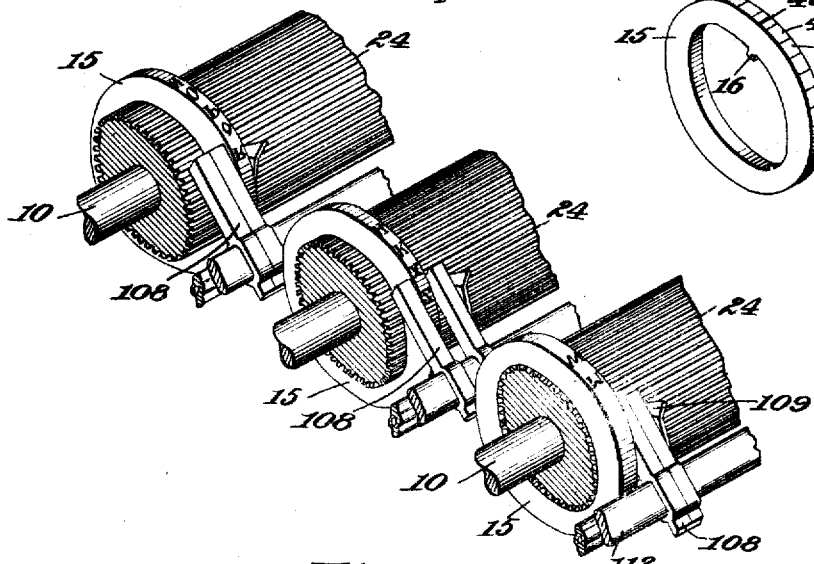
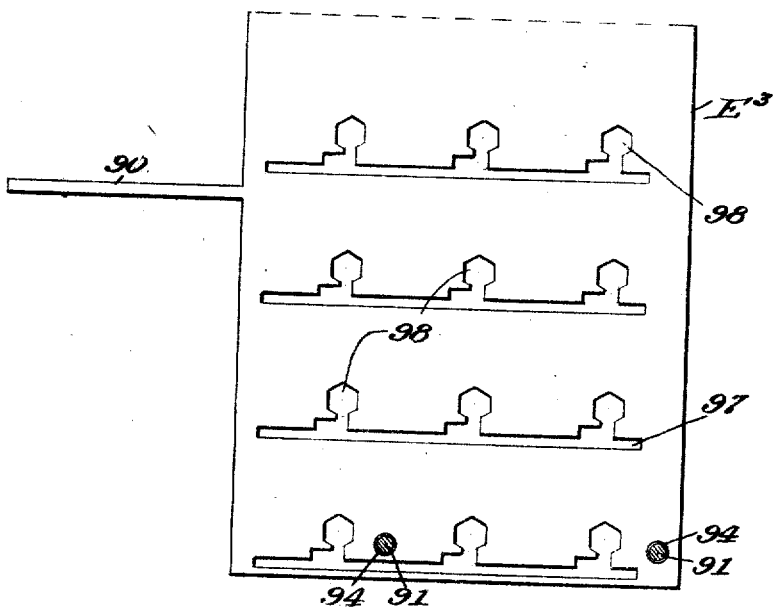

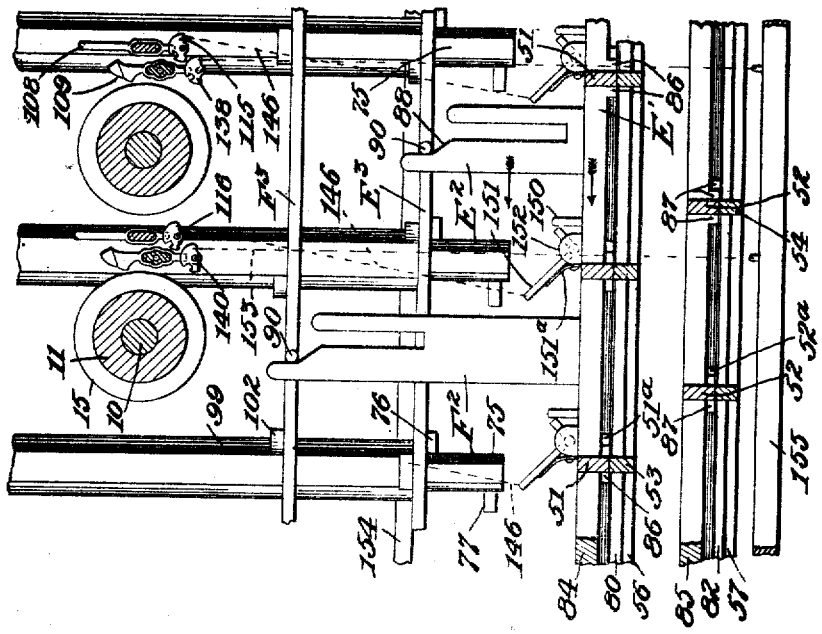

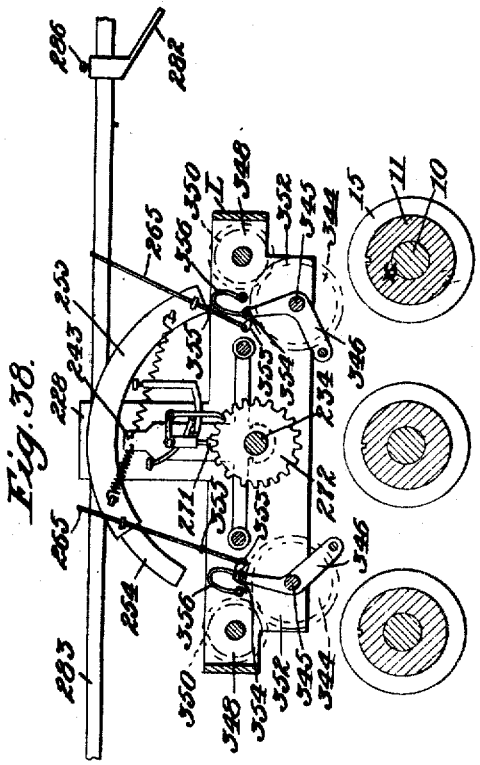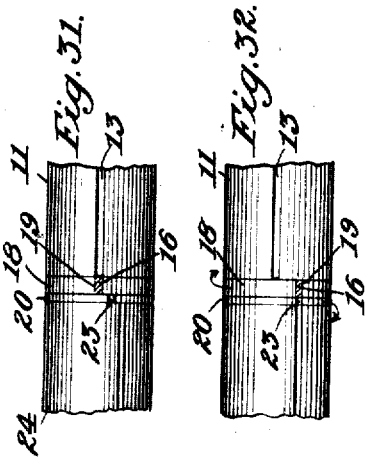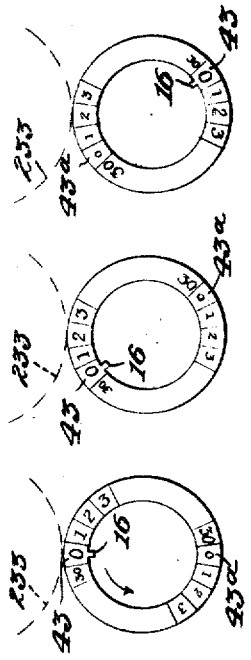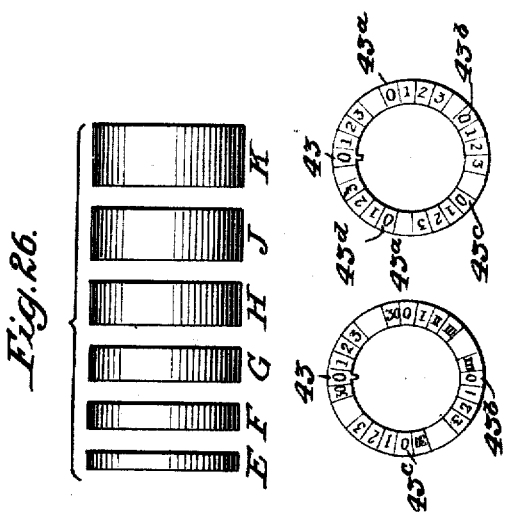

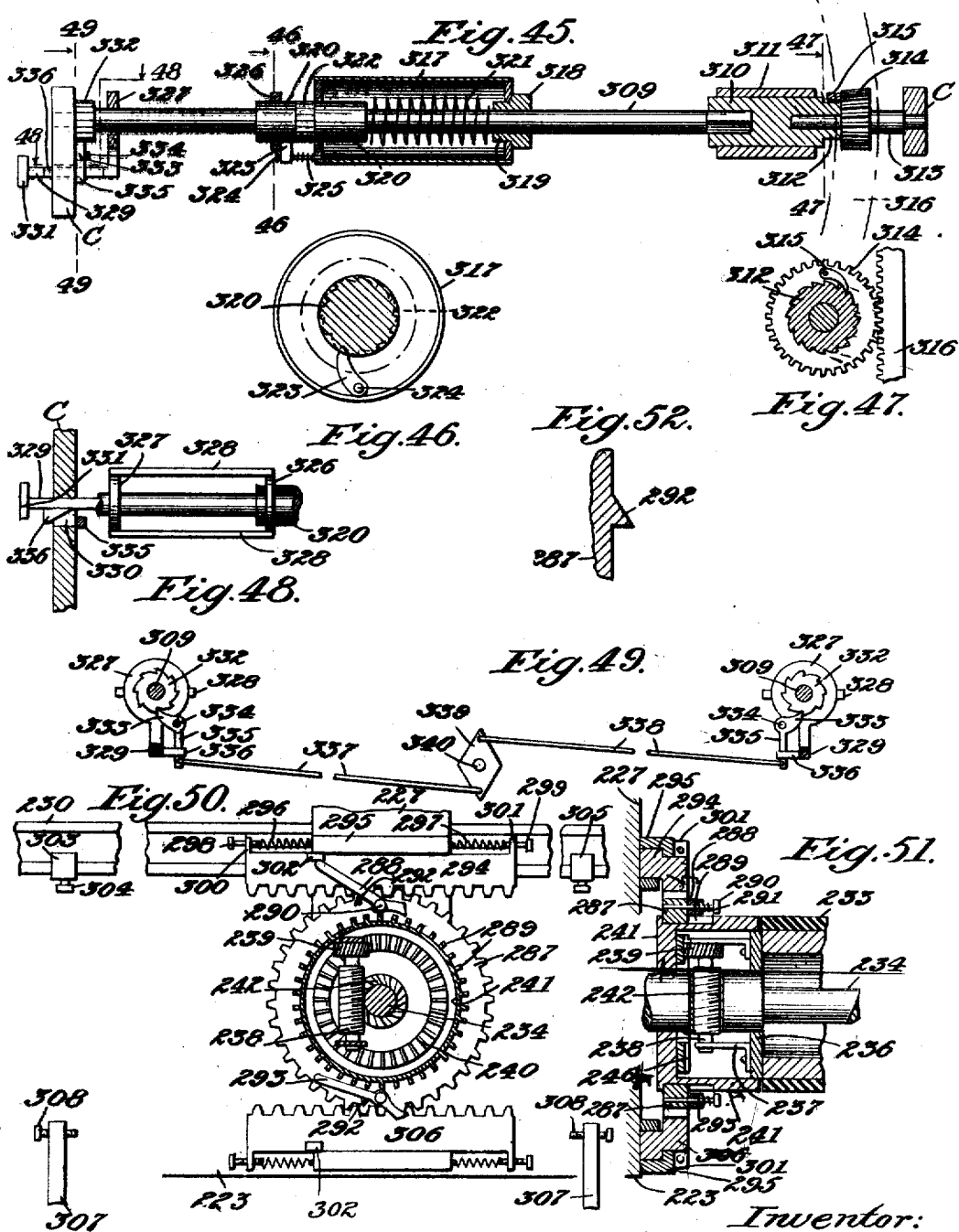

Mar. 13, 1923.
G. P. FERRELL.
TYPOGRAPHICAL METHOD AND APPARATUS.
FILED MAY 16, 1921.
1,448,620.

Inventor:
Garland P. Ferrell,
his Attys.

Patented Mar. 13, 1923.

1,448,620

UNITED STATES PATENT OFFICE.

GARLAND P. FERRELL, OF WICHITA, KANSAS.

TYPOGRAPHICAL METHOD AND APPARATUS.

Application filed May 16, 1921. Serial No. 469,887.

*To all whom it may concern:*

Be it known that I, GARLAND P. FERRELL, a citizen of the United States, residing at Wichita, in the county of Sedgwick and State of Kansas, have invented new and useful Improvements in Typographical Methods and Apparatus, of which the following is a specification.

This invention relates to the art of typography and has for one of its principal objects to simulate printing from hand set type through the instrumentality of a machine or apparatus.

A further object of the invention is to provide for conveniently and satisfactorily justifying the printing elements within a predetermined measure in a simple, accurate and expeditious manner.

The machine or apparatus is key controlled, as for instance in the manner of an ordinary typewriting machine, but is distinguished from typewriting machines in that all of the printing elements which go to make up a printed line are assembled and maintained assembled during the printing operation, after which the printing elements are returned to their normal or stored positions. In this connection it will be explained that each printing element is mounted to travel in a straight line from its normal stored position to one of several selected printing positions in said straight line, as distinguished from machines wherein a freely moving printing character or matrix may have any position in the printed line and requiring complex mechanism and complex paths of movement for bringing the printing element or matrix into its desired position and afterwards distributing or returning the same to its normal position.

In so far as the machine or apparatus is concerned, it will of course be understood that changes in the form, proportion, size and minor details may be made, within the scope of the claims, without departing from the spirit or sacrificing any of the advantages of the invention.

In the drawings;

Figure 1 is a top plan view more or less diagrammatic, of a machine embodying the features of the present invention.

Figure 2 is a vertical longitudinal sectional view of the machine on a larger scale.

Figure 53:
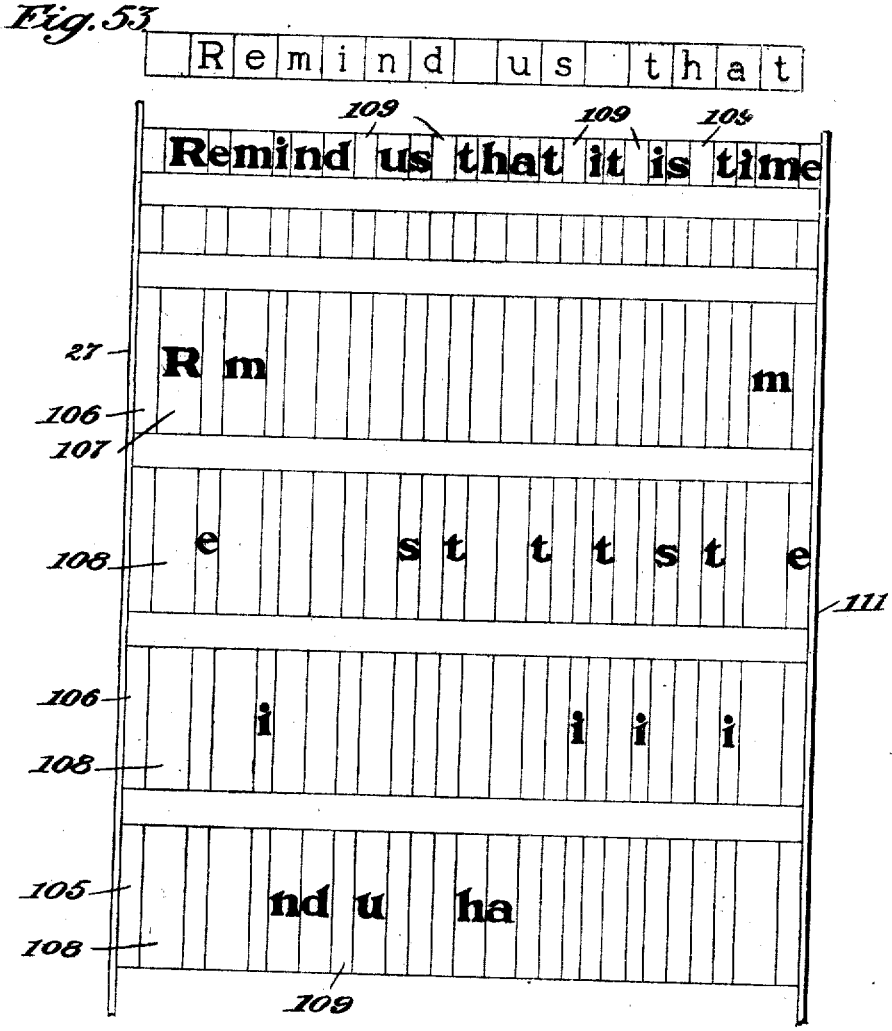

Figure 2ª is a plan view, partly in section, of one of the composite keys of the machine.

Figure 2ᵇ is a fragmentary view partly in elevation and partly in vertical section of one of the composite keys.

Figure 3 is a front elevation of the machine, the front of the frame being removed to show the key mechanism, parts being broken away and also in section.

Figure 4 is a top plan view on an enlarged scale of the printing carriage and a portion of the underlying type bed.

Figure 5 is a cross-sectional view on an enlarged scale of the printing carriage and the type bed.

Figure 6 is a top plan view of one of the units of the type bed, parts being broken away to show an interior construction, the typographical elements being omitted.

Figure 7 is a cross-sectional view on the line 7—7 of Figure 6;

Figure 8 is a view similar to Figure 7 and showing the movable part at the opposite limit of its movement.

Figure 9 is a diagrammatic view illustrating a detail of the present invention.

Figure 10 is a fragmentary plan section taken immediately below the lowermost plunger plate E³.

Figure 11 is an enlarged detail sectional view taken on the line 11—11 of Figure 5.

Figure 12 is a detail view of the line spacer mechanism.

Figure 13 is a view similar to Figure 12 showing a different position of the line spacer mechanism.

Figure 14 is a plan view of the line spacer mechanism.

Figure 15 is a longitudinal sectional view of Figure 4.

Figure 15ª is a detail fragmentary view illustrating the tripping of one of the ink rollers.

Figure 16 is a detail sectional view illustrating the manner of rotating the inking rollers.

Figure 17 is a cross-sectional view of Figure 4 taken at the right hand side of the cross bar 32.

Figures 18, 19, 20 and 20ª are fragmentary detail views illustrating the operations of the filler and justifier elements.

Figure 21 is a detail fragmentary perspective view illustrating the relation of printing elements, spacers and justifying elements on successive type bed units and in printing position.

Figure 22 is a plan view of one of the shiftable plates of the key mechanism.

Figure 23 is an enlarged detail fragmentary sectional view taken through a portion of the type bed with the latter in horizontal position and looking towards the back of the machine.

Figure 23ª is a fragmentary detail sectional view illustrating the manner of tripping the gates or valves which control the filler and justifying elements.

Figure 24 is an enlarged fragmentary sectional view looking towards the front of the machine and showing the cooperation between the cam members and the plunger plates for releasing the typographical elements.

Figure 25 is a detail perspective view of one of the typographical elements.

Figure 26 is a diagrammatic view illustrating the width variation in the six different type wheels or typographical members.

Figure 27 is a side elevation of a type wheel embodying four fonts of printing characters, the positions of certain of the printing characters which are carried upon the periphery of the wheel being indicated upon the face thereof.

Figure 28 is a similar view showing a type wheel embodying five fonts.

Figures 29, 30 and 30ª are side elevations of a type wheel embodying two fonts and showing three successive positions of the type wheel.

Figure 31 is a diagrammatic view illustrating the normal position of the typewheel setting-member and the valve or gate with respect to the adjacent type wheel magazine and the adjacent printing cylinder.

Figure 32 is a view similar to Figure 31, the type wheel setting member and the gate being moved to a position to permit of the type wheel being transferred from the setting member to the printing cylinder.

Figures 33, 34, 35 and 36 are detail fragmentary views illustrating the gates for the control of the filler elements.

Figure 37 is a detail sectional view illustrating the mounting of one end of the column rule.

Figure 38 is a fragmentary sectional view illustrating the printing carriage.

Figures 39, 40 and 41 are fragmentary sectional views illustrating the means for imparting the rocking printing motion to the printing cylinder.

Figure 42 is a cross-sectional view on the line 42—42 of Figure 41.

Figure 43 is a side elevation of Figure 41.

Figure 44 is a detail sectional view on the line 44—44 of Figure 41.

Figure 45 is a detail sectional elevation of one of the spring actuated means for moving the printing carriage.

Figure 46 is an enlarged detail cross-sectional view on the line 46—46 of Figure 45.

Figure 47 is an enlarged detail sectional view on the line 47—47 of Figure 45.

Figure 48 is a detail plan section on the line 48—48 of Figure 45.

Figure 49 is a detail fragmentary view illustrating the tripping connection between the spring actuated carriage operating means at opposite ends of the machine.

Figure 50 is a fragmentary sectional view illustrating the means for increasing and decreasing the line spacing rotation of the platen.

Figure 51 is a cross-sectional view of Figure 50.

Figure 52 is a sectional view of a detail.

Figure 53 is a composite diagrammatic view showing a specimen of a typewritten line, a typographically printed line, and the present arrangement of typographical elements disposed in different lines but from which the said typographical line may be printed.

The main frame A of the present apparatus is substantially rectangular in form and includes an upright back wall 1, opposite side walls 2 and 3 and front wall 4. As clearly indicated in Figure 2, it will be seen that the front portion of the side wall 3 is considerably higher than the rear portion thereof, which is also true of the side wall 2, for a purpose as will hereinafter appear. Between the high front portions of the side walls 2 and 3 is located a keyboard mechanism which is designated in general by the reference character B, which in its arrangement of characters is substantially the same as that of what is known as the universal keyboard for typewriters.

Extending transversely across the rear low portion of the main frame is the substantially rectanguar frame C of the type bed part of the machine, which frame carries the typographical elements which are under the control of the keyboard. This type bed C is mounted to rock upon its longitudinal horizontal axis and is supported upon two posts or standards designated 5 and 6 respectively and shown in Figures 1 and 2 of the drawings. Each of these posts or standards rises from the main frame and, as best shown in Figures 10 and 15 of the drawings, is bifurcated at its upper end at 7 for the reception of a cross bar 8 extending between the front and rear sides of the type bed frame C. A suitable pivot pin 9 extends through the cross bar 8 and the opposite sides of the bifurcated part of the post. It will of course be understood that the pivotal mounting shown in Figure 15 is duplicated at the opposite end of the type bed frame. Under normal conditions, the type bed C occupies the inclined position shown in Figure 2 of the drawings i. e. with its rear side tilted downwardly and the entire frame disposed at an angle of about forty-five degrees to the horizontal. By reason of the pivotal mounting of the type bed frame, it will be understood that said frame may be rocked or turned from the position shown in Figure 2 to a position at substantially right angles to that of its normal position. This tiltable or rocking mounting of the type bed frame is utilized for the purpose of moving the typographical elements, by gravity, from their stored positions into operative positions and also back to their normal stored positions, all of which will be hereinafter more fully explained. While the type bed frame has been illustrated as normally occupying a position at about forty-five degrees to the horizontal, it will be explained that this angular disposition may be varied.

It will here be explained that all of the typographical elements are mounted on the type bed frame C, and the assemblage thereof into position for printing is carried out on the same frame, and therefore said typographical elements always remain upon the frame and are never removed therefrom. Superimposed upon the type bed frame is the printing carriage D which supports the platen for the impression medium and also carries the inking mechanism. The carriage is mounted to travel back and forth upon the type bed, and the printing operations or impression taking operations are performed by said carriage while traveling across the typographical elements which have been assembled in operative positions upon the type bed frame C.

According to the present invention I divide the typographical elements into groups and store each group independently of each of the other groups for a purpose as will hereinafter appear. In the embodiment of my invention as shown in Figure 1 of the drawings it will be explained that the typographical elements have been divided into six groups designated E, F, G, H, J and K. As the manner of mounting and manipulating each group of typographical elements is the same, a detailed description of one of them is deemed sufficient. For each of the groups of typographical elements, as shown in Figures 5 and 6, there is a rod or bar 10 having its opposite ends suitably supported in the front and rear sides of the type bed frame C. Adjacent one end of said bar is a magazine 11 in the form of a cylinder suitably fixed upon the rod 10 as for instance by a key 12. Extending longitudinally through the length of this magazine is a groove or channel 13 which is open at the inner end of the magazine. The outer end of the groove, channel or slideway may be closed in any suitable manner, preferably by means of a removable closure, such for instance, as a set screw 14. Stored upon this magazine 11 is a plurality of composite typographical elements 15 (see Figures 21 and 25), each of which is in the form of a ring having an internal diameter to permit ready sliding of the element longitudinally of the magazine. Upon the inner periphery of the ring there is a lug or projection 16 which normally lies in the groove or slideway 13 thereby to prevent rotation of the ring upon the magazine and at the same time to guide the ring in its sliding movements upon the magazine. Upon the outer periphery of the ring appear typographical face elements 17 which may be intaglio, cameo or otherwise. It will therefore be understood that each ring is in effect a type body, and is a composite typographical element because it carries a plurality of typographical faces. It will here be noted that the width of each typographical element 15 is the same throughout the plurality of elements in the group illustrated in Figure 5. Moreover the typographical elements 15 are duplicates in every particular. Perspective views of several typographical elements of different groups have been shown in Figure 21 of the drawings, wherein it will be seen that each typographical element is provided upon its outer periphery with cameo printable surfaces.

As hereinbefore indicated, the typographical elements have been divided into groups, and this division is made in accordance with the set-wise widths of the printable surfaces. In the present embodiment of the invention I have divided the typographical elements into six groups, as clearly indicated in Figure 1 of the drawings. It will of course be understood that a greater or less number of groups may be employed, but for ordinary practical purposes it is considered that six groups will be sufficient.

In order that a typographical element may be rotated so as to bring any one of its printing surfaces into operative or printing position, there is provided a rotatable disc or ring 18 mounted upon the rod or bar 10 and disposed at the inner end of the magazine 11. This disc 18 is of the same diameter as the magazine 11 and is provided with a transverse open ended groove or channel 19 extending across its outer periphery and, is normally in register with the channel or groove 13, whereby the innermost typographical element 15 may slide onto the disc 18, because the lug or projection 16 will readily pass from the groove 13 into the groove 19. When thus positioned upon the disc 18 and the latter rotated, the typographical element will also rotate and thus any predetermined printing surface on the typographical element may be brought into operative or printing position. The gate 18 is of the same width or thickness as the typographical element 15, so that when a typographical element is mounted upon the gate 18, the lug of the next adjacent typographical element cannot enter the groove 19, and therefore locking of the gate 18 by the lug 16 of any typographical element is effectually prevented.

It will now be understood that the element 18 has a plurality of functions, in that it first receives a typographical element and is of a width to receive only one element at a time, and after having received the element it is capable of being rotated so as to likewise rotate the typographical element for the purpose described. Moreover the part 18 also acts as a lock, gate or valve to close the groove or channel 13 and prevent the other typographical elements from sliding off of the magazine when the member 18 is occupied by one of the typographical elements. While one purpose of the part 18 is that of a gate or valve to prevent displacement of the typographical elements 15 from the magazine 11, the chief function of the part 18 is that of a rotary setting member for the typographical elements whereby the typographical element which may be upon the part 18 can be selectively rotated to bring a predetermined printing character into operative or printing position.

At the inner side of the rotary setting member 18 is a rotary gate 20 of the same diameter as the part 18 and provided with a sleeve 21 rotatably embracing a sleeve 22 extending from the part 18. This rotary gate is provided with an open ended groove or channel 23 extending across its outer periphery. When the grooves 19 and 23 are out of alignment, a printing element on the part 18 cannot escape therefrom, but when the grooves 19 and 23 are in alignment, a typographical element may slide from the part 18 across the gate 20.

Mounted upon the sleeve 21 is the printing cylinder 24, which cylinder is of the same diameter as the parts 11, 18 and 20, and is provided with a plurality of longitudinal grooves or channels 25 designed to receive the lug or projection 16 of a typographical element 15 in order that the latter may slide from the rotary setting member 18, across the gate 20 and on to the printing cylinder 24. Furthermore these grooves 25 serve to prevent rotation of a typographical element when mounted upon the printing cylinder because the lug or projection 16 is within one of the grooves 25. By reference to Figure 21, which shows three successive printing cylinders, it will be seen that each cylinder has a series of grooves 25, which series extend entirely around the periphery of the cylinder. By having a large number of grooves, channels or slideways 25, there will always be a groove or channel to receive the lug or projection 16 of a typographical element in whatever position said element comes to rest after having been rotatably set by the setting member 18, whereby a plurality of typographical elements may be rotatably set in printing alignment upon the printing cylinder. In the present embodiment of the invention, sixty-two grooves or slideways 25 have been provided upon the printing cylinder 24, said grooves being of like width and successive grooves being spaced at like intervals. The reason for employing sixty-two grooves or guideways will be hereinafter explained. Moreover, the printing cylinder 24 is rotatable, not for the purpose of obtaining a rolling printing contact, but for the purpose of changing from one font to another font, as will be hereinafter explained. To hold the printing cylinder 24 in its normal position and to prevent it from sliding endwise away from the gate 20, a suitable stop or abutment 26 is provided upon the sleeve 21 and in engagement with the adjacent end of the cylinder. It will of course be understood that the cylinder 24 has a working fit between the abutment 26 and the gate 20 so as to permit rotation of the cylinder and also to permit rotation of the gate 20 and the rotary setting element 18.

To prevent the typographical element 15 from immediately escaping from the lower end of the printing cylinder 24 when in its inclined position as in Figure 2, there is provided a column rule 27 which underlies the printing cylinder in the path of the typographical element and serves as a stop to prevent the said element from immediately escaping from the printing cylinder. As hereinafter described, means is provided for depressing the column rule 27 so as to permit of the escape of the typographical element from the printing cylinder, which is an operation preparatory to returning the printing element to its original stored position on the magazine 11.

The sleeve 22 of the rotatable setting member 18 is extended towards the opposite or rear side of the type bed frame C and is provided with a pinion 28 which is keyed or otherwise secured thereon. The sleeve 21 of the gate 20 is likewise extended in the same direction but terminates short of the pinion 28 and is provided with a pinion 29. When these pinions are properly rotated by suitable key controlled mechanism, it will be seen that the rotatable setting member 18 and the gate 20 may be properly rotated to bring their grooves or channels into and out of alignment for the purpose of permitting the shifting of typographical elements from the magazine 11 to the printing cylinder 24, as in Figures 31 and 32.

When one or more typographical elements 15 have been permitted to gravitate from the printing cylinder 24 they are received within a hollow cylindrical receiver 30 which is open at its inner end and closed at its outer end by means of a wall 31 which, as best shown in Figure 4 of the drawings, is common to the series of receivers 30 and is suitably connected to the frame C of the type bed, as for instance by having each end secured to a cross bar 32 of the frame C. The wall 31 of course has an opening in which the sleeve 21 may freely rotate. While the internal diameter of each typographical element 15 is of course somewhat greater than the external diameter of the sleeve 21, the external diameter of the element 15 is substantially that of the internal diameter of the receiver 30, the latter having an internal lining 33 of felt or other suitable material against which the outer periphery of the typographical element engages. It will now be understood that the receiver 30 effectually supports such typographical elements 15 as may escape thereinto from the printing roll 24.

Inasmuch as the internal projection 16 of the typographical element 15 within the receiver 30 may not be in alignment with the groove or guideway 25 in the top of the printing cylinder 24, it is necessary to first rotate said typographical element until its internal projection 16 comes into alignment with the groove 25 preparatory to tilting the type bed to its opposite limit for returning the typographical element to its stored position on the magazine 11. To accomplish this result there is provided a stationary bar or abutment 34 disposed longitudinally within the receiver 30 and supported at its opposite ends upon the wall 31 and the abutment 26. This bar or abutment 34 is disposed, as best illustrated in Figure 9, so that its far side is in alignment with the near side of the uppermost groove or channel 25 in the printing cylinder and therefore forms a continuation of one wall of the groove or channel 25. Alongside of this fixed bar is a movable bar 35, and it will be explained that the combined thickness of the two bars should not exceed the width of the adjacent tooth or section of the printing cylinder which separates adjacent grooves or channels 25. The bar 35 is suitably secured to the sleeve 21 so that the bar 35 may swing around within the receiver 30 when the sleeve 21 is rotated. In Figure 7 the bars 34 and 35 are in their normal position and do not interfere with the escape of typographical elements 15 from the printing cylinder 24 into the receiver 30 because of the relation of the said bars as shown in Figure 9. By rotating the sleeve 21 in a clock-wise direction, the bar 35 will contact with the internal projection 16 on the typographical element 15 and thereby rotate the latter until its projection 16 is stopped by the stationary bar 34, as shown in Figure 8 in which position the projection 16 will be in alignment with the groove or channel 25 in the top of the printing cylinder. It will of course be understood that each and every typographical element within the receiver 30 will be rotated by the movement of the bar 35 and brought into a position with its projection 16 aligned with the topmost groove in the printing cylinder. Such rotation of the sleeve 21 also rotates the gate 20 and brings its groove or channel 23 into alignment with the groove 19 and the groove 13 so that by rocking or tilting the type bed frame to its opposite position, the typographical elements in the receiver 30 will gravitate to their original positions on the magazine 11, the projections 16 traveling freely through the aligned grooves or channels. The rotation of the gate 20, as just described, is accomplished by reason of the fact that when the type bed is being rocked or tilted from its normal position to a position at substantially right angles thereto, the pinion 29 comes into mesh with a rack 37, best shown in Figure 2 of the drawings, whereby the pinion 29 is given the necessary rotation to operate the gate 20. When returning the type bed to its normal position the pinion 29 traveling in the reverse direction over the rack 37 returns the gate 20 to is prior position with its groove 23 out of alignment with the groove in the member 18 thereby closing said groove and preventing the typographical elements 15 from sliding back upon the printing cylinder. The rack 37 is carried upon the upper portion of an arcuate post 38 rising from the back portion 1 of the main frame A. This post lies between the wall 31 and the rear side of the frame C and is struck on an arc having for its center the axis upon which the type body frame C is mounted to rock. The type bed frame C is limited in its rocking or tilting movement by a stop shoulder 39 projecting transversely from the top of the post 38 and in the path of upward movement of the rear frame bar of the frame C. Downward movement is limited by the part 40 of the main frame which constitutes a shoulder or abutment in the path of the downward movement of the rear frame bar of the frame C.

The type bed frame C is rocked by hand, and to facilitate this rocking movement there is provided an upstanding handle 41 at either end of the frame C and upon the end plate 231 of the frame, which end plate may be segmental in shape as indicated in Figure 2 of the drawings. To maintain the type bed frame C in its normal position there is provided a retractile spring 42 (see Figure 17) associated with the frame C and the stationary post 5. This spring not only maintains the type bed frame in its normal position, but returns it to its normal position after it has been tilted to its opposite limit through the manipulation of the handle 41.

The typographical element 15 is primarily a printing element, and in the present embodiment of the invention is in the form of a ring, as clearly shown in Figure 25 of the drawings. The ring shape of the element is due to the fact that the element is provided with a concentric opening in order that the element may embrace the storage magazine 11 and the printing cylinder 24. While the cross-sectional shape of the magazine 11 and the printing member 24 is cylindrical, it is of course apparent that a cylindrical shape is not absolutely necessary as the cross-sectional shape may be that of a regular polygon. Whatever may be the cross sectional shape of the magazine 11 and the printing member 24, the concentric opening through the printing element 15 will have the same shape and dimensions. Although the printing element has been shown as having a circular outer periphery, it is of course apparent that such periphery may be that of a regular polygon. Upon the outer periphery of the printing element are provided the printing surfaces or type characters. Each of the type characters on any one printing element is such as would ordinarily be placed upon bodies of the same set-wise dimension, and therefore the printing element is of the same width throughout its outer periphery. The internal projection 16 works in the grooves or guideways on the storage magazine 11 and the printing member 24. This projection also prevents rotation of the printing element when on the storage member and also when on the printing member, and also interengages the printing element with the rotary setting member 18 so as to require the printing element to rotate with said member 18. Furthermore the projection 16 constitutes a stop which engages the face of the member 18, when the notch or groove 19 thereof is out of alignment with the projection 16, thereby to prevent escape of the printing elements from the magazine 11 when a printing element is being rotated by the setting member 18 and while said printing element is sliding along the member 24 into its printing position.

In the present embodiment, the printing elements 15 are stored upon the magazine with the projections 16 at the top of the magazine. Inasmuch as each printing element is received by the setting member 18 with the projection 16 at the top thereof and the notch or groove 19 in alignment with the groove or guideway 13, it is necessary to rotate the setting member 18 so as to bring its notch or groove 19 out of alignment with the groove or guideway 13, preparatory to moving the selected printing element to its printing position upon the cylinder 24, in order to close the inner end of the guideway 13, by the member 18, so as to prevent the printing elements remaining on the storage member 11 from escaping to the printing member 24. Inasmuch as each printing member 15 must be rotated by the setting member 18, the outer face portion 43 of the printing element 15 adjacent to and in alignment with the projection 16 does not carry a printing character, because, as just described, each printing element is taken off of the storage cylinder 11 with the projection 16 at the top thereof and is then rotated to bring the desired printing character uppermost, which will of course locate the projection 16 in alignment with some guideway of the member 24 other than the uppermost guideway. This blank or nonprinting surface 43 is what may be termed the neutral or zero portion of the printing element, and the printing or type characters appear upon the outer periphery of the element at one or both sides of said zero portion. In addition to the nonprinting zero portion 43, the outer face of the printing element is provided with another nonprinting portion 44, which may have any position upon the periphery of the printing element, and is brought uppermost or into printing position for the purpose of providing a blank space in the printed line. As plainly shown in Figure 25 of the drawings, the depth dimension of each printing character extends in the circumferential dimension of the printing element. It will be understood that the depth dimensions of the printing characters on each printing element are identical. It will now be explained that the guideways on the printing cylinder are regularly spaced in accordance with the depth dimension of the printing characters on the printing element, and the rotatable setting member 18 is rotated one such space or multiples of such space in order to bring the desired printing character into printing position. It will be further explained that any one printing element does not carry a complete alphabet, but carries only such letters of the alphabet as have substantially the same set-wise dimension.

In Figure 25 certain printing characters have been shown on one half of the circumference of the type wheel 15, and it will be explained that on the other half of the circumference appear the same alphabetical characters and disposed diametrically opposite the first mentioned characters. Alphabetically, the characters of one group are identical with the characters of the other group, but the two groups differ merely in style, design or face. For instance one group may be what is technically known as black face type and the other group light face type. By reference to Figures 27 and 28, it will be seen that instead of two groups, a type wheel may have any number of groups, as for instance four groups in Figure 27 and five groups in Figure 28. Of course the circumferential sequence of the characters in the several groups is identical, so that, after a printing element has been set in printing position upon the printing cylinder, the latter may be given a partial rotation so as to selectively bring any one of the group sections of the type wheel into printing relation, whereby a single printing element may be employed to print the characters thereof in many different styles, designs, faces or the like. The means for selectively rotating the printing cylinder will be hereinafter explained. This rotation of the cylinder is not a printing rotation but is what may be termed a setting rotation, as the cylinder is in a stationary position when the printing operation occurs. Furthermore each group includes a zero portion 43, successive printing portions and a nonprinting portion 44, which latter is brought into printing position when the printing element is to be used as a spacing element. The blank or nonprinting portion may have any location in the group and it must have the same location in each of the groups. Moreover a zero portion 43 always divides successive groups.

I have noted that a font of type may be divided into groups in accordance with the set-wise dimensions of the typographical elements, and I have determined that six groups will give a satisfactory workable division. In Figure 26, this grouping has been graphically illustrated. In this figure the letters, E, F, G, H, J and K designate respectively the six different type wheels which collectively carry a font of type. On the circumference of the type wheel E are arranged the printing characters which have the same set-wise dimension corresponding to the width of the wheel at the circumference thereof. Upon each of the other wheels are arranged the printing characters in accordance with the widths of the respective wheels. Each wheel has a zero portion 43 as hereinbefore described, and the printing characters are grouped in half sections, quarter sections, or in any other divisions as hereinbefore explained. Referring to Figure 1 of the drawings it will be explained that the part designated E contains a plurality of type wheels which are duplicates of the type wheel designated E in Figure 26. Each of the groups F, G, H, J and K of Figure 1 are respectively made up of type wheels as shown at F, G, H, J and K in Figure 26. It will now be understood that each of the groups shown in Figure 1 contains a plurality of duplicate type wheels.

In sub-dividing a font of type in accordance with the present invention I first determine, by actual measurement of the set-wise dimensions, the type bodies of the smallest set-wise dimensions that can properly be brought into one group, and then I make a type wheel having a circumferential surface width such as will properly carry the typographical characters of the bodies which have been selected to form the first group. I then do the same thing to determine what characters should go into the second group, and in a division of six groups, I have determined that the second group should be upon a type wheel whose transverse circumferential dimension is one and one half times that of the first wheel. The transverse dimension of the third wheel is twice that of the first wheel. The transverse dimension of the fourth wheel is two and one half times that of the first wheel. The transverse dimension of the fifth wheel is three times that of the first wheel. The transverse dimension of the sixth wheel is three and one half times that of the first wheel. In the present sub-division into six groups, the width of the narrowest type wheel is taken as a unit and the successive type wheels increase in width one half of the width of the unit type wheel. In other words the unit of variation in width of the successive type wheels is one half the width of the narrowest type wheel. It will of course be understood that the unit of variation in the widths of the successive type wheels will depend entirely upon the number of groups into which the font is divided and the number of groups into which a font may be divided is optional.

As hereinbefore described the gates or valves 18 and 20 are rotated by the pinions 28 and 29 respectively and, as best shown in Figures 2 and 6, these pinions are actuated by the racks 45 and 46 respectively. Each of these racks is arcuate in form and slides in a groove or guidway 47 formed in the adjacent face of one of the posts 38. The lower end of each rack normally projects beyond the lower end of the post and is preferably provided in its extremity with an anti-friction device 48. Each rack is yieldably held in its extreme outward or forward position by a spring 142 embracing a rod 143 carried by and offset from the rack and working through a guide 144 on the bottom of the post 38. By moving these racks back and forth the pinions 28 and 29 may be rotated, and the gates or valves 18 and 20 likewise rotated through the medium of the sleeves 22 and 21. By reference to Figure 2 of the drawings it will be understood that the racks 45 and 46 are at opposite sides of the pinions 28 and 29, whereby these pinions will be rotated in opposite directions and the gates 18 and 20 likewise rotated in opposite directions. By selectively controlling the endwise movements of the racks, the gates 18 and 20 may be selectively rotated so as to bring the desired printing character into printing position. By rotating the gates 18 and 20 in opposite directions, they may be so rotated that the grooves or notches 18 and 23 thereof will come into alignment and permit the escape of a printing element from the gate 18 to the printing cylinder 24 only when the printing element has been rotatably set to its desired printing position.

The racks 45 and 46 are individually moved by the members 49 and 50, each of which is in the form of a cam having an upper inclined edge which is designed to come into engagement with the adjacent extremity of the proper rack so as to slide the latter upwardly in its guideway 47. The members 49 and 50 each rise from bars 51 and 52 respectively, and these bars in turn are superimposed upon other bars 53 and 54. Each of the bars 53 and 54 has its rear end slidably mounted in suitable openings in a guide member 55 which extends the full width of the frame and has its opposite ends suitably supported thereon. These bars terminate short of the front of the machine and are suitably connected to the respective cross-heads 56 and 57 disposed one above the other. It will here be explained that as there are two pinions 28 and 29 for each printing cylinder, there is a bar 53 for each pinion 28 and a bar 54 for each pinion 29. As there are six printing cylinders, there will be six bars 53 and six bars 54. Extending from the cross-head 56 is a series of bars 58 which have their front ends slidably mounted in a guide member 59 which extends the full width of the machine and has its ends supported in the sides of the frame. Similar bars 60 extend from the cross-head 57 and alternate in vertical disposition with the bars 58 and have their forward ends guided in the guide member 59. As clearly shown in Figure 3 it will be seen that the upper part of the guide 59 is provided with notches or openings to receive the bars 58, and suitable openings are provided in the guide for the reception of the bars 60. It will here be explained that the guide 55 at the back of the machine is provided with openings arranged similarly to the openings 61 and 62 in the guide 59. It will now be understood that there is an upper slidable frame made up of bars 53, cross-head 56 and bars 58, and also a duplicate lower slidable frame made up of the bars 54, cross-head 57 and bars 60. These two frames are independent of one another and capable of individual slidable movements in a direction from front to rear of the machine. The normal positions of the bars 53 and 54 is that shown in Figure 2 in which position they are yieldably held by the springs 63 and 64 located at the back of the main frame and bearing in opposite directions against said back of the frame and the cross bars 65 and 66 which have their ends working in suitable guideways 67 and 68 formed in or on the adjacent side wall of the main frame A. At the front of the frame there is a buffer member 69 extending from side to side of the machine, as indicated in Figure 10 of the drawings, and in the paths of the bars 58 and 60 so as to limit the forward movements of said bars.

Each of the upper and lower slidable frames is key controlled, and the rearward thrust of the frames is obtained by the action of keys on cams carried by the frame. Each of the upper bars 58 is provided with a number of cam plates 70, 71 and 72 which extend above the top of the bars and are each provided with upper cam faces 73 which are inclined to the vertical and extend upwardly and rearwardly. At a predetermined position in each of the cam faces there is a notch or seat 74 for a purpose which will be hereinafter explained. Immediately above each cam there is a vertically disposed key stem 75 mounted for vertical reciprocation and disposed at one side of the cams, as clearly shown in Figure 3 of the drawings. Projecting from opposite sides of the lower end portion of the key stem are pins or projections 76 and 77. Each key stem is spring supported, as by a spring 162 hung from a bar 154 having its ends supported in the side walls 2 and 3 of the frame. The plate E³ is slotted to accommodate the springs 162, as shown in Figure 22. By forcing the key stem downwardly, the pin or projection 76 pressing against the cam face 73 will force the latter and the upper frame towards the rear end of the machine, and this motion will continue until the pin or projection comes into the seat 74, whereupon the downward movement of the key will be stopped and the slidable movement of the frame will also be stopped. Upon releasing the pressure of the hand upon the key stem 75 the latter will rise to its normal position by reason of spring pressure, as will hereinafter appear, and the frame will be returned to its normal position by the spring 63 at the back of the machine.

The lower slidable frame is likewise key actuated through the medium of cams 78 rising from the lower bars 60 into cooperative relation with the pins 77 on the key stems 75. The cams 78 have cam surfaces and notches or seats as described for the cams on the upper frame, but the lengths of the cam surfaces vary for a purpose as will be hereinafter explained.

It will here be explained that each key stem cooperates with the upper and the lower slidable frame and individually moves said frames. As shown in Figure 2, the key stem which is in cooperative relation with the cam 70 will operate to move the upper frame a distance equal to the base of the right angle triangle of which the cam face 73 is the hypothenuse. During the downward movement of the key stem, the lower slidable frame remains stationary until the pin 77 comes into contact with the inclined face of the adjacent cam 78 rising from the adjacent lower bar 60 whereupon the lower frame will be moved rearwardly, and the two frames will continue to move rearwardly until the pins 76 and 77 come into the respective notches or seats 74. It will here be explained that when the pin 77 comes into contact with the cam 78, the cam 70 will have been moved rearwardly until its seat 74 is in register with the seat of the cam 78, so that the two seats are in position to simultaneously receive the pins 76 and 77 and thereby arrest the slidable movements of the two frames at one and the same time.

The length of the movement of each slidable frame may be varied by locating the seat or notch 74 at different positions along the base of the triangle of which the cam edge 73 is the hypothenuse, and it will be understood that the various positions of the seats or notches is determined by the amount of rotation which it is necessary to impart to the rotatable gates 18 and 20.

Inasmuch as each of the upper and lower slidable frames is guided by the guides 55 and 59 in such a manner as to require the frame to move back and forth only, the bars 53 and 54 must be out of alignment with the racks 45 and 46, and provision must be made for selectively bringing the members 49 and 50 into cooperative relation with the rack bars 45 and 46 which are to be actuated from any key stem. To accomplish this result, the upper bar 51 has its opposite ends slidably mounted in guideways 79 and 80. The guideway 79 extends transversely across and is supported by the upper bars 53 and is connected thereto. The other guide way 80 is carried by the cross bar 56. Similarly disposed guideways 81 and 82 are provided for the lower bars 52. To prevent twisting and binding of the shiftable bars 51 and 52 in their respective guides, each end of each of said bars is provided with a lateral projection or cross head, such for instance as shown at 51ª and 52ª in Figures 10, 23 and 24 of the drawings, which projections or crossheads have a working fit in the guideway. By this mounting, each of the bars 51 and 52 may be moved laterally at substantially right angles to the slidable movements of the upper and lower frames. While all of the bars 51 and 52 are slidable in their guideways, only one pair is shifted at any one time, for the reason that under the operation of any one key stem 75 it is designed to move a type ring of only one of the groups of type rings into its printing position, and therefore each of the other bars 51 and 52 must remain in their normal positions out of alignment with their corresponding rack bars 45 and 46.

As has already been explained there is a bar 51 and a bar 52 for each of the groups of printing wheels E, F, G, H, J and K, indicated in Figure 1, and for each pair of bars 51 and 52 there is an endwise movable selector shift bar, six of which bars have been shown at E', F', G', H', J' and K', which shift bars extend at right angles to the bars 51 and 52. Each end of each of these shift bars is supported in the adjacent side wall of the main frame A and is preferably provided with a pin or tenon 81' which is slidable endwise in a recess or opening in the frame. Each of these shift bars, as clearly shown in Figures 2 and 3, is a double bar including upper and lower members spaced to overlie the bars 51 and 52 respectively, and connected at their ends by upright cross-heads 82 thereby completing a rectangular frame so that the top and bottom bar members move together. Each bar is yieldably maintained at one limit of its slidable movement by means of a spring or springs 83 interposed between one end of the bar and the adjacent side wall of the main frame A. As shown in Figure 3 the springs are at the right hand side of the machine and therefore the bars are normally maintained at their left hand limit. As best shown in Figure 2 it will be seen that the bars 51 and 52 are reduced in thickness throughout their front portions so as to accommodate the shift bars. These shift bars are confined between upper frame bars 84 and lower frame bars 85 which extend the full width of the machine and have their ends suitably supported upon the sides of the main frame A. These frame bars 84 are rigid and have no movements whatsoever. The shift bar E' is intended to shift the first pair of bars 51 and 52 which actuate the gates of the first group E type wheels, and is provided upon the under side of its upper and lower members with pairs of depending projections 86 and 87 close to and at opposite sides of the bars 51 and 52 respectively and thus constituting seats receiving the bars 51 and 52, whereby the latter bars are shifted laterally under endwise movements of the shift bar E'. The remaining bars 51 and 52 have no connection whatsoever with the shift bar E', and therefore only one pair of bars 51 and 52 are shiftably controlled by the shift bar E'. It will of course be understood that each of the other shift bars F', G', H', J' and K' are similarly engaged, in the order named, with the other pairs of bars 51 and 52 consecutively towards the opposite end of the machine, whereby the pairs of bars 51 and 52 may be selectively shifted.

The means for shifting the bars E', see Figure 24, includes an upstanding cam $E^2$ rising from the shift bar E' and provided with a cam surface 88 at the upper portion thereof and leading to an upright bifurcation or open ended slot in the cam member. In front of the cam member $E^2$, as viewed in Figure 2, there is a substantially horizontal plunger plate $E^3$ which is provided with an arm 90 normally in cooperative relation with the cam surface 88, as best shown in Figure 22, so that when the plunger plate $E^3$ is depressed its arm 90 will wipe downwardly over the upwardly inclined cam face 88 and thereby move the cam $E^2$ in the direction of the arrow on Figure 24 and on Figure 10, which will result in the movement of the shift bar E' in the same direction, which will in turn shift the pair of bars 51 and 52 into the dotted positions shown in Figure 10, thereby bringing the rack cams 49 and 50 into alignment with the racks 45 and 46 respectively preparatory to the forward movements of the upper and lower horizontal frames, which movement of the frames will of course actuate the racks 45 and 46, as hereinbefore described to operate the gates 18 and 20 associated with the type wheel group E. As indicated in Figure 2 the shift bars are respectively provided with the upstanding cam members $F^2$, $G^2$, $H^2$, $J^2$ and $K^2$, the cam $F^2$ also being shown in Figure 24 and Figure 3. For each of the said upstanding cam members there is a corresponding plunger plate $F^3$, $G^3$, $H^3$, $J^3$ and $K^3$, each having a horizontal arm 90 cooperating with its respective cam member. It will be noted that the plunger plates $E^3$ to $K^3$ are located one above the other in spaced relation, and the upstanding cam members $E^2$ to $K^2$ progress in length from $E^2$ to $K^2$ so as to come into cooperative relation with the arms 90 of the respective plunger plates. It will now be understood that by depressing any one of the plunger plates $E^3$ to $K^3$, its corresponding shift bar E' to K' may be operated and therefore the gates of the several groups E to K of type wheels may be selectively actuated, for the purpose of permitting a type wheel, of any group of type wheels, to move therefrom into printing position upon its corresponding printing cylinder. As hereinbefore explained, group E contains type wheels which carry typographical elements of the same or substantially the same set-wise dimensions, and inasmuch as the type wheels of group E have a movement of translation back and forth between the magazine of group E and its printing cylinder, these typographical characters of substantially the same set-wise dimensions never mingle with the typographical characters of other set-wise dimensions which are contained in the other groups.

The several plunger plates $E^3$ to $K^3$ respectively are yieldably and normally supported in the relation shown in Figure 2 of the drawings, and suitable means for so supporting the plates include upright rods 91, preferably four in number, two at each side of the main frame, and supported upon the frame by upper and lower brackets 92 and 93 carried by the main frame A. These posts extend through openings 94 in the corners of the respective plunger plates, as best shown in Figure 22 of the drawings. Mounted upon each rod and disposed between adjacent plunger plates are helical springs 95, the tops of which bear against the under sides of the respective plunger plates while their lower ends bear against abutments 96, as for instance pins carried by the respective rods 91. It will now be understood that each plunger plate is spring supported independently of each of the other plates, and therefore the plunger plates may be individually depressed without likewise depressing each of the other plates. The pins or abutments 96 not only serve to support the springs in place but also serve as stops to limit the upward movements of the plunger plates.

As best shown in Figure 22, it will be seen that the lowermost plunger plate $E^3$ is provided with a plurality of slots 97 extending in a direction front and rear of the plate for the purpose of accommodating the tops of the key cams which lie immediately beneath the plate. Slots in the other plunger plates are not required, and it is not necessary to slot the lowermost plate unless the movement thereof is sufficient to bring the plate down to the cams. Each plunger plate is provided with several series of openings 98 for the purpose of accommodating the key stems.

The several plunger plates $E^3$ to $K^3$ inclusive are key controlled, and as the several keys are duplicates in construction and manner of operating, a description of one of the keys is deemed sufficient. Each key stem 75 as shown in Figures $2^a$ and $2^b$ is polygonal in cross section, and has as many sides as there are plunger plates. Slidable longitudinally upon each longitudinal face of the key stem is a plunger 99 which has a tongue and groove slidable connection 100 with the stem, and is provided upon its upper end with a finger piece 101 and upon its lower end with an outstanding foot 102. The slide and the stem are provided with coacting stop shoulders 103 and 104 which limit the downward independent movement of the plunger and thereafter require that the plunger and stem move together. Each key stem 75 carries six plungers, one plunger for each plunger plate, and the foot 102 of each plunger normally bears against the upper face of one of the plunger plates. Normally the plungers 99 are at their upper limits with their finger pieces 101 all in the same horizontal plane. This is brought about by the fact that each plunger is of a length to reach down to its corresponding plunger plate, and therefore brought to its upper limit by the plunger plate when it comes to its normal position under the influence of its supporting springs 95. It will now be understood that each key stem carries a plunger for each plunger plate, and on the upper faces of the finger pieces 101 appear the letters, numerals or other font designations corresponding to the printing characters on the respective type wheels. On depressing any finger piece 101, the slide member thereof moves downwardly upon the key stem 75 and depresses one of the plunger plates which movement of the plunger plate shifts its corresponding shift bar of the series E' to K' inclusive which in turn brings the appropriate bars 51 and 52 into cooperative alignment with the desired rack bars 45 and 46. At the completion of the shifting movement of the bars 51 and 52, the shoulders 103 and 104 on the plunger and the key stem come into engagement, and thereafter the key stem 75 moves downwardly and actuates one of the key cams which lies below the key stem which results in movement of first one and then the other of the horizontal frames so as to push the rack cams 49 and 50 against the racks 45 and 46 resulting in the actuation of the gates 18 and 20 of one of the type wheel groups E to K.

I have hereinbefore explained that, in accordance with this invention, a font of type is divided into groups in accordance with the set-wise widths of the typographical characters, and in Figure 1 of the drawings I have indicated six such groups designated E to K inclusive. I have also explained that each group is made up of duplicate type wheels, and that each type wheel has a movement back and forth between the adjacent printing cylinder and the magazine which carries the printing wheels of any one group. The prime purpose of this grouping of the printing characters is to avoid the intermingling of type characters of different set-wise widths in juxtaposition in a continuous line of composition, and thereby to avoid the complexities necessarily involved in distributing typographical elements of various widths which have been set up in a continuous line. It is of course apparent that, by the present grouping of the typographical elements, together with the fact that each type ring can merely move back and forth between its magazine and its printing cylinder, it would be impossible to arrange the typographical elements in juxtaposition in a single continuous line, and it will now be understood that, in accordance with the present invention a compositional line is divided into a plurality of lines or fractional parts of a compositional line, with the typographical elements of like set-wise dimensions in one and the same alignment which is a fractional part of the compositional line. For a better understanding of this feature of the invention reference is made to Figure 53 which is a composite diagrammatic view showing a specimen of a typewritten line, a typographically printed line, and the present arrangement of typographical elements arranged in different lines but from which the said typographical line may be printed. At the top of this figure appear the words "Remind us that" as it would appear when written by any ordinary typewriting machine. As is well known, the mounting of the type characters and the spacing movement of the platen carriage of a typewriter is such that the successive letters are equally spaced. The space unit is equal to the value of an "m quad," and each printed letter appears as though it was impressed upon the paper from a type face mounted upon a body having an "m quad" value. Below the typewritten line appears the words "Remind us that it is time" appearing as a single line printed from movable type elements set by hand or printed from a line of type such as produced by a Mergenthaler machine or a Monotype machine, the letters being arranged closely together, the measure being filled and the line justified. In printing such a line from hand set type the several type faces are carried on bodies of different set-wise widths, as indicated in said Figure 53 immediately below the printed line, which brings about the close spacing of the successive letters, enables the filling of the measure and permits justification as is well understood. Moreover, the spacing between words may be varied. These several desirable features are not possible with an ordinary typewriting machine.

To produce an exact duplicate of the printed line of Figure 53, in accordance with the present invention the operator first sets in position the left hand column rule 27, in a manner as will be hereinafter explained. As the line is to be indented, the operator first determines the width of the indentation and presses one of the finger pieces 101 of one of the keys corresponding to the group of type wheels which has the desired set-wise width whereby a type wheel of the desired width will travel from one of the groups to the adjacent printing cylinder and over against the column rule 27 into the position indicated at 105. As this type wheel is to produce a space, it will of course be necessary to press that key which has a character or inscription designating a space. It has hereinbefore been explained that each type wheel has a blank or nonprinting section to be brought into printing position whenever a space is desired, and therefore it will be understood that the type wheel will be rotated so as to bring such blank space or nonprinting surface into printing position. Thus any type wheel width or multiple thereof may be employed as compositional spacing material. Simultaneously with the placing of the type wheel as a spacing element, spacing elements of the value of the type wheel are set against each of the other printing cylinders as indicated at 106 and against the column rule 27 in a manner as will be hereinafter described. The operator then presses the R key, which will result in the transfer of a type wheel from one of the groups to its printing cylinder and against whatever elements there may be on the same cylinder and between said type wheel and the column rule 27 as indicated at 107, and simultaneously with placing of the type wheel 107, spacing elements 108 of the same set-wise value as the wheel 107 will be placed upon the other printing cylinders in alignment with the type wheel 107 and at substantially right angles to the set-wise direction. In the same manner the successive letters or typographical elements and spacing or filling elements are placed upon the several cylinders up to the end of the first word, and then a justifying wedge shaped element 109, such as shown in Figures 15, 18, 19, 20 and 20ª, but not shown in Figure 53, is brought into operative position against the exposed face of the last type wheel or spacing element on each of the printing cylinders, by the depression of the space key 110 shown in Figures 1 and 2. The position of the justifying element at the end of the word "Remind," in Figure 53 is indicated by the blank space 109 on each of the printing cylinders. The successive words are likewise built up until the measure has been substantially filled as will be indicated by the position of the last placed type wheel with respect to the column rule 111 which underlies the printing cylinder, so as not to interfere with the transfer of the type wheels from the magazines to the printing cylinders, and which column rule may be brought up into its operative position, by means hereinafter described, for the purpose of completely defining the measure. After the measure has been substantially filled, the wedge shaped justifying elements are simultaneously forced inwardly so as to expand the temporary spacing between words, accomplish justification and lock up the several elements on each cylinder tightly between the two column rules. It will here be noted that each of the typographical elements is held against rotation upon its printing cylinder but is capable of sliding longitudinally of the cylinder, and therefore it will be understood that under the action of the wedge shaped justifying elements, the typographical elements will be moved into their final printing positions in a simple and accurate manner.

The several typographical elements having thus been assembled by the operation of the present machine, it will be seen that the element 107 carrying the printing face R is in alignment with the corresponding letter R of the printed line and with the type element R which produced the printed letter R. Likewise the successive printing elements of the present invention are lined up longitudinally of the column with the corresponding letters of the printed line and the corresponding type bodies which produced the several letters of the printed line, and the spaces between words are also lined up longitudinally of the column. In other words the type characters set up in accordance with the present invention occupy the same positions within the measure as in the printed line set up in the conventional manner. It will be understood that by the operation of the present machine typographical elements thereof have been arranged or set up in compositional succession within a predetermined measure, but instead of having all of the typographical characters in a single continuous line, the typographical elements are arranged in a plurality of parallel lines and are grouped according to set-wise dimensions i. e. typographical elements of like set-wise dimension being in one and the same line. By taking an impression of the first line of typographical elements, then taking an impression of the next succeeding line of typographical elements in alignment with the first impression, and continuing the operation throughout the several lines of typographical elements, it is apparent that the final product will be a single printed line in the compositional order of the line in the upper portion of Figure 53. The manner of obtaining the successive impressions will be hereinafter explained.

After taking the impressions from the typographical elements, the column rules 27 and 111 are depressed, thereby permitting the typographical elements to slide downwardly from the printing cylinders into the respective receivers 30, after which the type bed C, shown in Figure 2 in its normal position, is tilted or rocked through an arc of substantially ninety degrees, whereby the several typographical elements will automatically return by gravity to their storage magazines and in their original successive relations. It will now be understood how it is possible to set up or assemble, in accordance with the present invention, typographical elements of different set-wise dimensions and representing complete typographical fonts, said elements capable of being justified so as to completely fill a predetermined measure and arranged in compositional sequence so as to present a printable surface, without intermingling typographical elements of different widths in the same continuous line, and whereby each typographical element is moved back and forth in the same straight line between its stored position and its printing position, thus obviating the extremely complex operation commonly known as distributing type. Inasmuch as I employ a type carrier or type wheel carrying a plurality of printing faces, and arrange an entire font on relatively few type wheels, it is apparent that the mechanical operations necessary in assembling the type wheels in printing position and returning them to their stored positions are reduced to the minimum, which is a material advantage over machines which employ separate individually movable typographical elements and set the same in substantially the same manner as is required in the hand setting of type bodies.

For an explanation of the construction and operation of the spacers or fillers 108 and the justifying wedges 109 reference is made more particularly to Figures 6, 15, 18, 19, 20 and 20ª. Referring to Figure 6 of the drawings it will be explained that the fillers 108 normally stand in an upright position and are slidably mounted upon a rod or bar 112 which has its opposite ends supported in the frame of the type bed C and the plate 31. This bar is parallel with and spaced a suitable distance from the adjacent magazine 11 and printing cylinder 24, and while its cross-sectional shape may be varied, the preferred shape is shown in Figure 18 wherein it will be seen that the bar is substantially oblong in cross-section with its major axis disposed vertically. That portion 113 of said bar which is opposite the printing cylinder 24 is inclined upwardly and towards the printing cylinder preferably by twisting this intermediate portion of the bar into this desired position, which position is fully shown in Figures 6 and 19. Each filler 108 is provided with an eye or slideway 114 receiving the bar 112 with sufficient looseness to permit sliding of the filler along the bar under the influence of gravity when the type bed frame C is in either of its inclined positions. It will now be understood that the cross-sectional shape of the bar 112 may vary, and in fact it may be any shape other than circular so long as it is of a shape as will prevent the fillers from swinging loosely around the bar as a center. In other words the bar must be of a shape as will cause the fillers to swing inwardly toward the printing cylinder when the fillers slide on to the inclined part 113 of the bar and into cooperative relation with whatever elements may have been assembled upon the printing cylinder. The means for controlling and selecting the filler members as best shown in Figures 33, 34, 35 and 36, includes a plurality of gates or valves 115 mounted to rock or oscillate upon a rod 116 disposed directly beneath the bar 112 and supported at opposite ends in the frame C and the plate 31. Each gate or valve 115 is preferably segmental in the shape, normally rises from the rod 116 and is provided in its upper arcuate edge with a notch or gateway 117. An arcuate slot 118 is provided in the gate, and extending through the slots of all of the gates 115 is a rod 119 which is provided at opposite ends with arms 120 rigidly secured to the rod 116. Below the several gates is a bar 121 suitably hung from the rod 116. A spring 122 has its opposite ends connected to the bar 121 and the gate 115 so as to yieldably maintain the latter with the upper end of the slot 118 engaging the top of the bar 119 as a stop to limit the movement of the gate in one direction. The movement of the gate in the opposite direction is limited by the stop or abutment constituted by the opposite end of the slot coming into engagement with the bar 119. In Figure 6 of the drawings the fillers 108 and the bar or track 112 for the support thereof have been omitted from the upper part of the view so as to expose the gates 115, and it will be noted that notches or gateways 117 are uppermost and are in alignment with the exception of the first or innermost gate, and that the innermost gate is spaced from the next adjacent gate greater than the spacing between the other gates. Each filler 108 has a foot portion 123 which extends downwardly from the bottom of the filler and is received behind one of the gates 115 as best shown in Figure 18 and in Figure 33. In the normal arrangement of the gates, as shown at the top of Figure 6, and in Figure 33 the gateway 117 is out of alignment with the foot 123 of the first filler, and therefore said filler is restrained from sliding downwardly along its track 112, and said first filler also holds the remaining fillers in their normal positions upon the track, said other fillers having their feet in alignment with the aligned gateways of the other gates.

It will be remembered that the type wheel or typographical element E, as shown in Figure 26 of the drawings, was described as the unit width of type wheel, and it will here be explained that each filler is one-half as wide as the width of the type wheel E, so that it requires two fillers to produce the set-wise value of the unit type wheel E. Furthermore the unit of variation in width of the successive type wheels is one-half the width of the unit type wheel E, and therefore by the use of a plurality of filler elements, each of which is one-half the width of the unit type wheel E, filler members may be readily set up in accordance with the set-wise value of any of the type wheels.

With the arrangement shown in Figure 6 and Figure 35, the first two fillers may be permitted to escape and slide down the track 112 merely by turning or rocking the first or innermost gate to bring its gateway 117 into alignment with the filler, and simultaneously rotating the next gate to bring its gateway out of alignment with the gateway of the other gates, thereby preventing the escape of the filler elements which lie behind the last mentioned gate. The gates are of course key controlled, and when the key has been released, the gates which have been turned from their normal positions are returned to their normal positions by the springs 122. To obtain three fillers, the first gate and the third gate are operated as described for the first and second gates, whereby the first three fillers will be permitted to escape and the remaining fillers will be held trapped in rear of the third gate. It will now be understood by selective operation of the first gate and any of the other gates any desired number of fillers may be permitted to escape and travel along the track and be turned inwardly towards the adjacent printing cylinder by the deflected portion 113 of the track, said fillers coming to rest when they contact with the column rule or whatever typographical element has been put in operative position on the cylinder and within the measure. Instead of having each filler one-half the width of the narrowest type wheel, any fractional width thereof may be employed, the purpose of the fillers being to build upon the respective printing cylinders spacing or filler values corresponding to the set-wise values of the type wheels as they are set upon their respective printing cylinders.

As clearly indicated in Figures 6 and 18 it will be seen that the justifying wedges 109 are disposed in the space between the gates 115 and the magazine 11, and are mounted upon a track 124 which is supported at opposite ends in the frame C and the plate 31. Each justifying element has an eye 125 embracing the track 124, and a depending foot 126 which corresponds to and has the same general functions as the foot 123 for the filler 108. Also the justifying element is intended to slide upon its track 124 and be maintained normally in an upright position as explained for the fillers 108. The track 124 has an intermediate deflected portion 127 located opposite the printing cylinder 24 and has the function of turning the justifying elements 109 towards the printing cylinder so as to give the justifying element an initial position. Each justifying element is stopped at the desired position with respect to the printing cylinder by coming into contact with whatever element has already been set upon the cylinder, as for instance as shown in Figure 21 of the drawings. As shown in Figures 18 to 20ª, each justifying element includes the shank or stem 109, the eye 125, the foot 126, the wedge element 128 and the nose portion 129. The nose 129 is in the same vertical plane with the shank of the justifier, is preferably pointed as shown in the drawing and may be reduced to a thickness less than that of the shank if desired. The wedge portion 128 is a flange set at an obtuse angle to the shank in order that successive justifiers may nest, as clearly indicated in Figures 20 and 20ª of the drawings. The wedge portion 128 is also convex or rounded longitudinally for a purpose as will hereinafter appear. The nose portion 129 is thin and corresponds to what is commonly known as a "hair space" in hand set fonts, and the apex of the triangular wedge 128 is located at the base of the nose 129, and the outer or free edge 130 of the wedge diverges rearwardly from the shank 109 and is on an arc struck from the middle of the eye 125 as a center. The maximum effective wedging width of the flange 128 is equal to that of an "n quad," so that this justifying element is capable of producing any degree of spacing from that of a "hair space" to that of an "m quad."

When one or more justifying elements 109 have been placed upon the track portion 127, the nose portion 129 contacts with the last element set up on the printing cylinder, and therefore the justifying elements comes to a stop in an initial position. The next element which is placed upon the printing cylinder travels thereon until it comes into contact with and is stopped by the nose 129, as will be readily understood by reference to Figure 19, whereby the adjacent elements on the cylinder will have a temporary spacing. The purpose of having the wedging flange 128 disposed at an angle greater than a right angle, as shown in Figure 20 will be understood by reference to Figure 20ª which shows three typographical elements 108 and two justifying elements 109. The intermediate typographical element 108 is a thin element and less than the value of an "m quad," and to accommodate the justifying elements to an arrangement of typographical elements, as shown in Figure 20ª it is necessary to permit nesting of the justifying elements in order that their shanks and noses may come into close proximity, as otherwise there would always be a space between successive justifying elements equal to the width of an "m quad" because the maximum spacing effect of the flange 128 is that of an "m quad."

After the measure has been approximately filled with typographical elements placed upon the several printing cylinders, it becomes necessary to justify the typographical elements, and this is accomplished in the present machine by moving or swinging the justifying elements inwardly towards the printing cylinder so as to force their wedge shaped flanges 128 inwardly between adjacent typographical elements, including fillers 108, so as to increase the spaces at the locations of the justifying elements and thereby wedge and lock the typographical elements between the column rules. This manipulation of the justifying elements is accomplished as follows. The part 127 of the track 124 is a separate portion of the track and is fixed upon a rod 131 which has a rotatable bearing in the other track portion and projects at the outer side of the frame C. By rotating this rock bar in the proper direction, it is apparent that the justifying elements may be forced inwardly between the typographical elements to accomplish the results hereinbefore explained. By reason of the fact that the justifying elements are duplicates and move simultaneously and to the same extent, when rocking the track portion 127, it is apparent that the spacing effected by the several justifying elements is equal in width in the setwise direction. Moreover, and as will be best understood by reference to Figures 18 and 19, it will be seen that, by reason of the arcuate disposition of the edge 130 of the wedge 128, said edge travels in an arcuate path struck from the rock bar 131 as a center, whereby each successive portion of the edge 130 wipes across one and the same part of the typographical element with which it is in contact, thereby reducing to the minimum the frictional engagement between the justifying element and the typographical element.

Inasmuch as there is a rock bar 131 for each of the printing cylinders, and it is desired to simultaneously move all of the justifying members which have been set upon the cylinders, means is provided for moving the justifying elements, and such means may consist of a shaft 132 mounted in suitable bearings 133 upon the front of the type bed frame C. Each rock bar 131 is suitably geared to the shaft 132.

A handle or finger piece 134 is provided upon one end of the shaft 132 and preferably located just beyond one end of the frame C in position for convenient manipulation. By turning the finger piece 134 in the proper direction, it is apparent that the several justifying elements, which have been set upon the printing cylinders, may be moved or swung to produce their wedging and justifying actions. Inasmuch as the several rock bars 131 rotate within the track portion 124, the latter is not rocked, and therefore such justifying elements as may remain upon the track portion 124 are not effected by the manipulation of the shaft 132. For the purpose of maintaining the justifying elements in their final set position, the shaft 132 is provided with a ratchet wheel 135, shown in Figures 1 and 17 of the drawings, and there is a dog or pawl 136 mounted upon the frame C and cooperating with the ratchet wheel 135 through a slot or opening formed in the frame C, to hold the shaft 132 in the position to which it has been turned, whereby the justifying elements will be maintained in their set positions. The turning of the shaft 132 by manipulation of the finger piece 134 is against the pressure of a tension spring 137, which spring is designed to automatically return the shaft 132 to its normal position when the dog or pawl 136 has been tripped or released from the ratchet wheel 135. The tripping of the dog 136 is automatic and the manner of doing so will be hereinafter explained.

The justifying elements are normally stored in an upright position on the fixed right hand portion of the track 124, and may be selectively released and permitted to slide along the track by a system of gates which is a substantial duplicate of that described for the fillers 108. The gate system for the justifying elements includes two gates only which have been designated 138 and 139, see Figure 6, which gates are substantially duplicates of the gates 115 and are mounted to rock upon a bar 140 having its ends mounted in the frame C and the plate 31. Inasmuch as the construction, mounting and operation of the gates 138 and 139 are identical with those of the gates 115, reference is made to Figures 33, 34 and 35 for an understanding of the operation of the gates 138 and 139. In their stored positions, all of the justifying elements are in rear of the gate 138 with their depending feet 126 in alignment with the notch in the rear gate. The notch in the front gate 138 is out of alignment with the notch in the rear gate 139 whereby the several justifying elements are prevented from sliding along the track 124. The two gates are spaced to normally accommodate the foot of a justifying element between the gates. By moving the two gates so as to bring the notch or gateway of the gate 138 into register with the foot of the first justifying element and at the same time moving the rear gate to bring its notch out of alignment with the other feet, the first justifying element will be permitted to slide along its track through the notch of the first gate and into its position with respect to the printing cylinder. Inasmuch as only one justifying element at a time is to be positioned with respect to the printing cylinder, two gates are sufficient to control the several justifying elements. This arrangement of gates provides for taking off one justifying element at each operation of the key which controls the justifying elements. Should it be desired to place two or more justifying elements in position alongside of one another, this can be accomplished by two or more depressions of the proper key.

For an understanding of the manner of operating the gates 115, reference is made to Figure 35 which shows a side elevation of several of the gates. A flexible loop 145 depends from and extends between the first and second gates, and from this loop depends a pull cord or chain 146 having a loose or slidable connection with the loop as through the medium of a ring 147 slidably mounted upon the loop. By pulling downwardly upon the pull cord 146 the first two gates will be simultaneously rotated in the same direction so as to permit of the escape of the first two filler elements. Upon releasing the pull cord 146 the springs 122 will return the gates to their normal positions. Between the first and the third gate there is a loop 148 to which is connected another pull cord 146ª. By pulling downwardly upon the pull cord 146ª the first and third gates will be operated which will result in the releasing of the three filler members in front of the third gate and the trapping of the other filler elements in rear of the third gate. The front gate is similarly connected to each of the several gates of the series of gates, whereby the first gate and any one of the other gates may be selectively operated to release the desired filling elements and permit them to travel from their stored positions to their operating positions.

It will be remembered that when a type wheel is placed upon a printing cylinder, filler elements are also placed upon each of the other cylinders, and therefore the depression of any key of the keyboard to set a desired type wheel also results in the release of the necessary filler elements. When pressing a key of the keyboard, one of the plunger plates E³ to K³ will be depressed, and its finger or projection 90 wiping across the cam 88 will move one of the shift bars E' to K' in the direction of the arrow on Figure 10 as hereinbefore described. Each of the shift bars E' to K' is provided with a series of upstanding pins, shoulders or abutments 150, and each shift bar is provided with five such pins or shoulders, one pin or shoulder for each of the cylinders on which a filler element or elements is to be positioned. Each shoulder or projection 150 is disposed so as to cooperate with one arm of a bell crank lever 151, as best shown in Figure 24 of the drawings, such bell crank working in a vertical plane and mounted upon a bearing 152 in the form of a bridge which extends across the several shift bars and is supported at its ends upon the frame bars 81. When a shift bar is moved in the direction of the arrows on Figure 10 and Figure 24 it will be seen that the shoulder or projection 150 wipes against one arm of the bell crank 151 thereby rocking the bell crank which is connected to the appropriate pull cord 146. The bell crank is returned to its normal position by means of a spring, such for instance as shown at 151ª in Figure 24 of the drawings.

The means for actuating the gates 138 and 139 is identical with the means for actuating the gates 115 shown in Figures 33, 34 and 35, and includes a pull cord 153. As best shown in Figure 2 of the drawings, it will be seen that the pull cord 153 extends downwardly and is connected to a cross bar 155 underlying the horizontal slidable frame of the key mechanism and connected at opposite ends to levers, one of which is shown at 156 in Figure 2 of the drawings and the other of which is also shown at 156 in Figure 10 of the drawings. The front ends of these levers are also indicated in Figure 3 of the drawings. Each of these levers is pivoted or fulcrumed at its rear end at 157, and its front end rests upon a universal bar 158 normally pressed upwardly by springs 159 best shown in Figures 2 and 3 of the drawings. Upward movement of the universal bar 158 is limited by the front guide 59 which constitutes a stop in the path of the upward movements of the levers 156. The levers 156 are actuated by the spacer bar 110 which extends transversely across the front of the keyboard and is connected to the front of the levers 156 by depending links or rods 160 pivotally connected to the respective levers at 161. After typographical elements have been positioned upon the printing cylinders sufficient to produce a word, or at whatever position it is desired to produce a space in the printed line, the space bar 110 is depressed whereby a justifying element will be set in place upon each of the cylinders, because the six pull cords 153 will be pulled downwardly by the bar 155 thus actuating the gates 138 and 139 for the justifying elements of each of the cylinders.

The measure which determines the length of the line to be set up is defined by the column rules 27 and 111, as best shown in Figure 1 of the drawings and also shown in Figures 4, 15, 17. As the column rules are substantially duplicates in form, mounting and manner of operation, a detailed description of one of them is deemed sufficient. Each column rule is in the form of a rectangular bar provided with an upstanding substantially U-shaped shoulder or abutment 163 for each printing cylinder, the space between the arms of the abutment being proportioned to receive the cylinder and the arms extending a suitable distance upwardly to constitute a stop for typographical elements, filler elements and justifying elements. Each end of the column rule is mounted in an upstanding casing 164 having an upright slot 165 to receive the end of the column rule. This casing is suspended from the cross bar 32 in a manner as will be hereinafter described. Within the casing is a follower block 166 to which the column rule is suitably connected. Depending from the follower block is a rod 167 carrying at its lower end a head or piston 168. A helical spring 169 is within the casing with one end bearing against the head or plunger 168 and its other end bearing against a shoulder or abutment within the casing as for instance a pin or crossbar 170. The tendency of this spring is to move the block 166 to its lowest limit, which limit is defined by the bottom of the slot 165. A headed pin 171 is carried by the follower 166 opposite the column rule and works in a slot 172 in the casing. A link 173 loosely depends from the headed pin 171 of the column rule 27, and a similar but longer link 174 depends from the column rule 111. Slides 175 and 176 are pivotally associated with the lower ends of the respective links 173 and 174, and are mounted in respective guideways 177 and 178 in a cross bar 179 hung from the frame bar 8 by suitable bracket arms 180. Associated with the slides 175 and 176 are plunger rods 181 and 182 respectively which rods project through the front open ends of the guideways. The bar 181 extends forwardly a suitable distance and is provided at its forward end with an upstanding arm 181ª which rises above the top of the frame C. The upper end of the arm 181ª at one end of the machine is connected to the upper end of the other arm 181ª, see Figure 4 of the drawings, at the opposite end of the machine by a cross bar or bridge bar 181ᵇ, which constitutes a handle or push bar for manual manipulation so as to simultaneously operate the two slide bars 181 for elevating the column rule 27 into its operative position. A similar connection for the opposite bars 182 is provided and includes an arm 182ª rising from the forward end of the bar 182 which latter projects in front of the bar 181. It is preferred to have the bar 181ᵇ at a higher elevation than the bar 182ᵇ in order to give convenient access to the bar 181ᵇ. Each column rule may be conveniently moved upwardly into its operative position by pressing inwardly upon one or the other of the rods 181ᵇ and 182ᵇ so as to bring one or the other of the links 173 and 174 into a substantially vertical position, which will result in the elevating of that column rule with which the link is associated against the tension of the spring 169. The column rule is held in its elevated operative position by means as will be hereinafter explained.

Each casing 164 is provided at its top with a substantially U-shaped bracket 185 slidably embracing the frame bar 32 with its open end at the column rule side of the casing. The arms of the bracket are provided with inturned shoulders 186 and 187 respectively to engage the front side of the frame bar 32. The said shoulders are separated by a space so as to accommodate the shoulder 188 of a latch 189 rising from the column rule. This latch is pivoted in its upper portion at 190 upon a bracket 191 rising from the column rule. The shoulder 188 of the pivoted latch or hanger is designed to engage over the top of the shoulder 187 so as to maintain the column rule in its uppermost position. By tripping the latch or hanger from the shoulder 187, the column rule will be pulled downwardly by the spring 169, whereby the stops 163 on the column rule will descend to a position out of the paths of the typographical elements on the printing cylinders so as to permit of said typographical elements sliding across the cylinders. The latch or hanger 189 is yieldably maintained in engagement with the shoulder 187 by a suitable spring 192 bearing against the lower end portion of the hanger or latch.

The column rules are adjustable towards and away from one another so as to set them in accordance with the desired measure, and this is accomplished by having the brackets 185 slidably mounted on the frame bar 32 and adjustably locked in place by suitable clamping means, such, for instance as set screws 193 extending through the tops of the brackets into engagement with the cross bar. On one face of the cross bar is a suitable scale 194 with which the brackets 185 cooperate, whereby the brackets may be adjusted so as to space the column rules accurately to any predetermined measure defined in "pica ems" and fractions thereof.

Preparatory to removing the type wheels from the printing cylinders and returning them to their stored positions, it is necessary to lower the column rules 27 and 111, and to accomplish this result I have provided the following means. Mounted upon the tops of the frame bars 8 and 32 are rods 195 working endwise through guide brackets 196 on said frame bars. The inner ends of these bars are connected by a cross bar 197 extending across the fronts of the upper ends of the pivoted latches 189. These rods 195 are normally maintained at one limit by suitable springs 184 embracing the rods and bearing against suitable collars or shoulders 198 on the rods and also against certain of the brackets 196. The rear or outer ends of the bars 195 are connected by a bridge or arch bar 149 rising a suitable distance above the horizontal frame constituted by the bars 195 and 197. This part 149 is a trip member disposed in the path of the printing carriage, which will be hereinafter described, so that when the carriage strikes the part 198 it will pull the bars 195 rearwardly or outwardly and thereby swing the latches 189 on their pivots 190 so as to release the locks from the shoulders 187 and thereby permit the column rules to descend under the influence of the respective springs 169. It will here be explained that the length of the bar 197 exceeds the width of the maximum measure that can be provided on this machine in order that the bar will always cooperate with the upper ends of the latches 189 in any adjusted positions of the column rules.

For tripping the latches 189 at the opposite side of the machine, a link or rod 199 has one end pivotally connected to each latch 189 and extends therefrom along the inner side of the adjacent column rule to one end of a lever 200 pivoted at 201 to the column rule and intermediate the ends of the lever. When the top of the latch 189 is moved to the left, as viewed in Fig. 15, by the trip mechanism, the rod 199, connected with said latch, is moved endwise to the right thereby rocking the lower end of the lever 200 to the left which pulls the other rod 199 to the left and actuates the corresponding latch 189 at the right hand side of the machine, whereby both ends of the column rule are simultaneously pulled downwardly by the respective springs 169. It will of course be understood that duplicate tripping mechanism is provided at the right hand side of the machine, so that the carriage will release column rules at each limit of its travel.

When the column rules descend, they each automatically actuate means which moves the justifying elements 109 into upright positions so that they may slide from the track portion 127, shown in Figure 6, to the left hand portion of the track. To accomplish this result I have provided suitable means including a rock bar 202, shown in Figures 4 and 17 and mounted in suitable bearings or brackets 203 carried by the frame bar 8. One end of the rock bar is provided with a crank arm 204 overlying the rear portion of the dog 136 and in cooperative relation therewith so as to trip the dog from engagement with the ratchet wheel 135 when the arm 204 is turned downwardly. The rock bar is also provided with a crank arm 205 extending in the opposite direction to that of the arm 204 and associated with an upstanding push rod 206 mounted in suitable bearings 207 on the hanger arm 180. A spring 208 yieldably maintains the rod 206 at its lower limit immediately above and in alignment with the push bar 181 and in the path of a cam 209 provided upon the top of the bar 181. When the column rules are pulled downwardly by the springs 169, the slide 175 and its push rod 181 are moved outwardly or to the left as viewed in Figure 17, whereby the cam 209 wiping under the foot of the push rod 206 lifts the latter which results in the rocking of the rock bar 202 to move its arm 204 downwardly against the dog 136 to release the latter from the ratchet wheel 135. As soon as the ratchet wheel 135 has been released, the shaft 132 will immediately rotate under the influence of its spring 137, shown in Figure 1, thereby rotating the several rock bars 131 which are associated with the shaft 132, and consequently turning the several track portions 127 into vertical alignment with the other portions 128 of the track, whereby the justifying elements on the track portions 127 may slide downwardly to the left hand ends of the tracks as viewed in Figure 6.

When the type bed frame C is rocked from its position shown in Figure 2 to a position at substantially right angles thereto for the purpose of returning the typographical elements to their stored positions, it becomes necessary to turn the innermost gate 115, shown in Figures 6, 33 and 35 of the drawings, to bring its notch 117 in alignment with the notches of the other gates in order that the feet 123 of the fillers 108 may have an unobstructed path across the several gates. To properly open the innermost gate, under the conditions just set forth, said gate is provided with a sleeve 210 rotatable upon the bar 116 and extending through the plate 31. Upon the outer end portion of the sleeve there is a stud or projection 211 in the form of a crank arm. Referring now to Figures 23 and 23ᵃ of the drawings, it will be seen that the inner face of the adjacent post 38 is provided with a track 212 disposed in the path of the upward movement of the trip projection 211 which will wipe along the track 212 and thus rotate the sleeve 210 which will turn the innermost gate 115 to bring its notch 117 into alignment with the notches of the remaining gates. It is preferred to have track 212 inclined as shown so as to avoid wedging of the trip arm 211 against the track during the return movement of the type bed frame C. A similar arrangement is provided for turning the gate 138, shown in Figure 6 of the drawings so as to bring its notch into alignment with the notch of the rear gate 139 to permit of the justifying members returning to their normal positions. Accordingly the gate 138 is provided with a sleeve 213 rotatable upon the bar 140, extending through the plate 31 and provided upon its outer end with a trip projection 214 disposed to wipe across an inclined track 215 provided upon the adjacent post 38. It will of course be understood that each of the innermost gates 115 and 138 are returned to their normal positions, after the trip arms of the sleeves 210 and 213 have escaped from the tracks 212 and 215, by reason of the springs associated with said gates, as shown in Figures 33 and 35.

It has been hereinbefore described that each type wheel may be provided with type faces of two or more different fonts, and that after the type wheel has been set upon a printing cylinder, the latter may be adjustably rotated to bring into printing position the desired printing face of any of the fonts which may be upon the type wheel. To accomplish this result there is provided, as shown in Figures 15 and 17, a rack bar 216 slidably mounted upon the outer side of the column rule 27 and having its teeth in mesh with the longitudinal grooves of the printing cylinder 24. Normally this rack bar locks the printing cylinders against accidental rotation, but by moving the rack bar endwise the several printing cylinders may be simultaneously and selectively rotated to bring into printing position any face of type with which the type wheels may be provided. This rack may be slidably mounted upon the column rule 27 in any suitable manner, as for instance by means of a slot and pin engagement, such as is shown at 217 in Figure 15. As clearly shown in Figure 37, it will be seen that the column rule 27 is provided with a laterally offset terminal 27ª which works in the slot 165 of the casing 164, whereby the column rule 27 is located at one side of the casing 164 and the rack 216 is disposed entirely at one side of the casing in order that it may extend past the casing and through a slot 218 in the frame C. The purpose of the slot 218 is to permit of the necessary up and down movements of the rack during the raising and lowering of the column rule. A suitable handle or finger piece 21 is provided upon the outer end of the rack for convenience in moving the latter endwise. Suitable means is provided to hold the rack against accidental endwise movement of the rack, such for instance as a spring pressed dog or detent 220 extending through a boss or projection 221 on the frame C and engaging a toothed portion of the rack bar. To guide the operator in moving the rack bar for selectively rotating the printing cylinders, a suitable scale 222 may be provided upon the rack bar and in cooperative relation with the boss 221 and the frame C, either of which latter members may operate as an index cooperating with the scale. While the rack bar 216 has been illustrated as projecting at one end only of the frame C, it is of course apparent that it may also be projected at the opposite end of the frame into position for manipulation at said opposite side of the machine if desired. By mounting the rack bar on one of the column rules, I am enabled to employ a single elevating means common to the column rule and the rack bar.

As hereinbefore set forth it is an important object of the present invention to print in several different faces, designs or the like from a single printing wheel, and an understanding of how this may be accomplished will be understood by reference to Figures 27, 28, 29, 30 and 30ª. In Figure 29 there has been shown a type wheel 15 having two fonts of printing characters thereon, the positions of certain of said printing characters being indicated on the face of the wheel, it of course being understood that the actual printing characters are carried on the periphery of the wheel. According to the embodiment of the invention as disclosed in the accompanying drawings, and shown in Figures 5, 6 and 31, the type wheels are stored with their non-printing zero portions 43 uppermost and with the internal lug 16 at the uppermost zero portion and normally in the groove or channel 13 in the top of the storage cylinder 11. While the groove or channel 13 of the storage cylinder 11 may have any position around the cylinder, the neutral or zero non-printing portion 43 of each type wheel should be in alignment with the printing alignment along the printing cylinder, which printing alignment is at the top of the cylinder as shown in the accompanying drawings, but which might have any other position with respect to the printing cylinder. The reason that each type wheel should be stored with its neutral or zero non-printing portion in the printing alignment is because the type wheel is rotatably moved from its stored position by the rotatable setting member 18 in order to bring some selected printing character into the printing alignment with respect to the printing cylinder. Furthermore when a printing wheel is on the setting member 18, with its lug 16 in the notch or recess 19, preparatory to rotating the setting element 18, the gateway 23 of the gate 20 is out of alignment with the notch 19 in order to prevent premature escape of the printing wheel which is on the setting member 18, and consequently a printing wheel could not be transferred from the storage cylinder 11 to the printing cylinder 24 in the same circumferential position that it occupied on the storage cylinder 11.

In Figure 29 the printing wheel 15 is shown in the position it would occupy when on the rotatable setting member 18 with its zero non-printing portion 43 uppermost and in printing alignment, the platen being indicated in dotted lines. In a two font type wheel, such as shown in Figure 29, wherein one font occupies substantially one half of the wheel and the other font occupies the other half of the wheel, it will be seen that like printing characters occupy diametrically opposite positions upon the type wheel, and this is also true of the non-printing portions 43 and 43ª. To bring the printing character "2" into printing position at the top of the printing cylinder, as shown in Figure 30, the appropriate key of the keyboard is depressed which will result in the turning of the setting element 18 in a clockwise direction, as viewed by the operator, see Figure 1, and shown by the arrows on Figures 29 and 32, until the printing character "2" comes to the top in the printing alignment with respect to the platen. During this rotation of the setting member 18 and the type wheel, the gate 20 has been rotating in the opposite direction until its gateway 23 has registered with that groove of the printing cylinder into which the lug or projection 16 of the printing wheel should come when the printing character "2" has been brought into printing alignment. Should it be desired to print the character "2" in the other font of the same type wheel, which printing character is diametrically opposite the uppermost printing character, all that it is necessary to do is to adjustably rotate the printing cylinder 24 through 180 degrees, by manipulation of the rack bar 216, best shown in Figure 15, which will bring the said other printing character "2" into printing alignment as shown in Figure 30ª. Thus, with a printing wheel having two fonts of printing characters thereon, two different faces or designs of printing character may be printed. By reference to Figure 27, which shows four fonts of printing characters, and Figure 28 which shows five fonts of printing characters, it is apparent that any number of fonts may be carried by one and the same printing wheel, which printing wheel is under the control of a single key, the change from one font to another being accomplished by the adjustable rotation of the printing cylinder 24 through the medium of the adjusting rack 216. It will be remembered that the depth dimension of a printing character lies in the circumferential dimension of the printing wheel and it will also be remembered that a single printing wheel does not carry a complete font of printing characters, but only such printing characters as have the same or substantially the same set-wise dimension. In Fig. 27, the several non-printing portions of the type wheel have been successively designated 43, 43ª, 43ᵇ, and 43ᶜ, and similar designations appear on Figure 28 which indicate the five non-printing portions of a type wheel embodying five different fonts.

It will of course be understood that the manipulation of any one key of the keyboard always imparts the same amount of rotation to the setting member 18, and of course the printing wheel which is upon the setting member 18 has imparted to it the same rotating movement. The keys of the keyboard and the mechanism actuated thereby are arranged to selectively rotate the member 18 in accordance with the number of printing characters in a single font on the printing wheel, and to avoid complex key mechanism for the purpose of further rotating the printing wheel to bring into printing position the printing characters of the other fonts on the printing wheel, I provide for selectively rotating the printing cylinder by manipulation of the rack 216 through which the printing cylinder may be rotated, after the printing wheel has been placed thereon to bring into printing alignment the printing character of any one of the fonts corresponding alphabetically to the printing character which was originally in printing alignment on the printing cylinder.

In setting up typographical elements to produce a compositional line, the words thereof may be set up in printing characters of different faces or designs. For instance, referring to Figure 53, the word "Remind" may be set up in the manner hereinbefore described. If the type wheels have two fonts thereon, the word "Remind" will appear in printing alignment in one face and it will also appear in another face at the diametrically opposite side of the printing cylinder. It will now be understood that the word "Remind" will be set up on the printing cylinder as many times as there are fonts on the type wheels. Having set up the word "Remind" with the desired printing characters in the printing alignment, the printing cylinder is then adjustably rotated to such a position that when the word "us" is set up in the normal manner the desired different faced printing characters come into alignment with the word "Remind" which was originally in printing alignment but is now out of printing alignment. Now by adjustably rotating the printing cylinder so as to bring it into its original position with the original setting up of the word "Remind" in printing alignment, the word "us" will also be in the same printing alignment but in printing characters of a different face from that of the word "Remind." Any combinations of different faced type in the same compositional line may be accomplished by the proper adjustable rotation of the printing cylinder, within the number of fonts which appear upon the printing wheels of a single machine.

The means for taking impressions from the printing characters which have been set up by the present machine, such for instance as has been shown in Figure 53, includes a carriage which is designated generally by the reference character L and is best shown in Figures 1, 4, 5, 15 and 16. As best shown in Figure 4, it will be seen that this carriage is in the form of a rectangular frame open at its top and bottom and including opposite side bars 223 and 224 and end bars 225 and 226. The longitudinal side bars 223 and 224 are relatively wide as compared with the end bars, and from the middle of the side bars rise the respective posts 227 and 228, each of which, as best shown in Figures 5 and 39, is provided with an opening or passage 229 extending entirely through the post in the direction of the travel of the carriage and constitutes a guideway receiving a track rail or bar 230, the ends of which are supported in the segmental end plates 231 of the type bed carriage C. Each track rail is provided in its opposite upright faces with grooves or channels in which are received anti-friction devices 232 on which the carriage is hung so as to travel back and forth on the track. Within the frame of the printing carriage and midway between the ends thereof is a cylindrical platen 233 mounted upon the shaft 234 having its end portions extending through and rotatably mounted in the side bars 223 and 224. That end of the shaft 234 which is towards the operator is provided with a suitable handle 235 for convenience in manually rotating the shaft. While the platen is mounted to rotate loosely upon its shaft, it can also be engaged with the shaft to rotate therewith in any suitable manner, such for instance as by the construction shown in the patent to C. H. Shepard Number 686,992 issued November 19, 1901. Briefly this construction includes a disc or plate 236 rigidly secured to one end of the platen and carrying brackets 237 upon the outer side of the plate and between which brackets is mounted a worm shaft 238 which is provided upon one end with a gear 239 engaging a circular rack 240 carried by the inner end of a cylindrical cap 241 which is loosely rotatable upon the shaft and houses and encloses the worm shaft 238 and its associated parts. The worm shaft 238 engages a worm 242 fixed upon the shaft 234. When the shaft 234 is rotated, the pressure of the shaft acts on the side of the worm 242 through the worm shaft 238 and the force comes at such an angle to the worm that it does not rotate the shaft 238 on its axis, and hence the shaft, its pinion or gear 239, the brackets 237, the head or plate 236 and the platen 233 will all turn together with the shaft 234. Upon turning the part 241, which constitutes a finger piece, the crown gear 240 will rotate the pinion 239 and the shaft 238, which latter will then feed itself around the worm wheel 242, which latter remains stationary, and this circular bodily movement of the shaft 238 around the shaft 234 will also turn the part 236 around the shaft, because the part 236 carries the brackets 237 which support the worm 238. As the part 236 is attached to the platen 233 the latter will rotate therewith in either direction around the shaft 234.

As shown in Figures 5 and 15, it will be seen that the platen 233 is above the printing cylinders 24, and is intended to travel across the printing cylinders so as to obtain impressions from each of them. In order that a clear and distinct impression may be obtained from each printing cylinder, it is designed to impart to the platen a rolling or rotary movement which shall be timed with respect to the translating movement of the platen so that the translating movement of the platen will be compensated and a true rolling contact obtained between the platen and the printing cylinder. To accomplish this printing rotation of the platen there is provided an upstanding arm 243 best shown in Figures 5, 11, 39 and 40, which arm is loosely mounted at its lower end upon the platen shaft 234, and has a segmental lower end or foot 244, the outer periphery of which is struck from the center of the shaft 234 and is provided with radially disposed teeth or projections 245 and 246 disposed equally at opposite sides of the longitudinal axis of the arm 243. Extending at opposite sides of the upstanding arm 243 are substantially horizontal arms 247, each of which carries at its outer end a friction roller 248 in the usual cooperative relation to the periphery of the platen for holding the paper thereagainst. In Figure 15 of the drawings a sheet of paper 249 is shown held against the platen by the friction rollers 248. It will here be explained that the upstanding arm 243 is located at the inner side of the frame bar 224 and between the latter and the adjacent end of the platen, and the arms 247 support corresponding ends only of the friction rollers 248. The other ends of the friction rollers are supported in a crosshead 250, shown in dotted lines in Figure 15, and having its central portion loosely mounted upon the platen shaft 234. Referring to Figures 4 and 5 of the drawings, it will be seen that the cross-head 250 is located between the carriage frame bar 223 and the cap member 241 so as not to interfere with any of the other parts of the platen. For the purpose of guiding the sheet of paper 249 around the platen when inserting and removing the paper, there is provided, at each end of the platen, a paper guide 251 which is in the form of a metal strip suitably embracing the lower peripheral portion of the platen at the end thereof and having its ends hung from the rods 248′ which carry the friction rollers 248. As shown in Figure 4 of the drawings it will be seen that the friction rollers 248 terminate short of the ends of the platen in order to accomodate the ends of the paper guide 251 which are hooked or otherwise hung upon the rods 248′.

The upstanding arm 243 is rocked upon the platen shaft 234 automatically during the travel of the printing frame L, and to accomplish this result, there is a bar 252 disposed below and in the same vertical plane with the arm 243 and supported at its opposite ends in the end pieces 231 of the type bed frame. On the top of this bar are upstanding teeth or projections 253, one for each printing cylinder and disposed in alignment therewith. Normally the arm 243 is in the tilted position shown in Figure 40, so that when the printing frame or carriage is traveling in the direction of the arrow, see Figure 40, the tooth or projection 245 will engage the near side of the upstanding abutment or projection 253 and result in the rocking of the arm 243 in the direction of the arrow thereon. As the arm is rocked from the position in Figure 40 to the position shown in Figure 11, it is plain that the lug 245 will eventually clear the adjacent side of the abutment 253 and thereafter pass over the top thereof as the printing carriage continues its traveling movement, after which the arm 243 will be returned to its normal position by a spring device as will be explained. The arm 243 is rocked by the projection 246 engaging the abutment 253 when the printing carriage travels in the opposite direction, it of course being understood that the arm 243 will have been tripped to the corresponding inclination at the opposite side of the vertical by means as will be hereinafter explained. The rocking motion of the arm 243 is imparted to the platen in a manner as will be hereinafter described.

Disposed above the arm 243 is an arcuate track member 254 which is disposed upon an arc struck from the platen shaft 234 as a center and is carried by the post 228, and disposed in an arcuate groove or channel formed in the inner face of said post. This track is stationary upon the post, and mounted to slide thereon is an arcuate slide 255 which is guided and retained upon the track in any suitable manner, as for instance by tongue and groove connections 256 as best shown in Figure 42 of the drawings, wherein it will be seen that the slide is in the form of a shell which is substantially C-shaped in cross-section, the opposite edges of the shell traveling in grooves or guideways in the top and bottom of the track. Normally the slide 255 is at one limit of its movement, as shown in Figures 11 and 40 and is held by a dog 257, shown in Figure 41, which dog is pivoted between its ends at 258 upon the track 254, one free end of the dog engages a shoulder or tooth 259 upon the inner side of the slide 255 at the adjacent open end of the slide. A suitable spring 260 is employed to hold the free end of the dog 257 in engagement with the tooth or shoulder 259. The other free end 261 of the dog is enlarged and is designed to form a shoulder for engagement by a trip member 262 carried on the end of a rod or pin 263 extending through a slot 264 in the slide 255 with its outer end suitably associated with a trip rod 265, preferably by having the part 263 provided with an eye 266 through which the trip rod 265 slidably extends. When the trip rod 265 is tripped, in a manner as will be hereinafter explained, the pin 263 will be moved in the slot 264 so as to bring its trip head or shoulder 262 into wiping engagement with the part 261 of the dog 257, whereby the part 261 will be lifted and the other end of the dog tripped or released from engagement with the shoulder 259 on the slide 255, and further movement of the rod 265 will move the slide 255 to its opposite position on the track 254, whereupon the shoulder 259 on the other end of the slide 255 will engage with the dog 257 on said other end of the track for the purpose of locking or holding the slide at its said opposite limit.

Normally the arm 243 occupies a position inclined to the vertical, such as shown in Figure 40, and is maintained in this position by a pair of springs 183, each of which has one end secured to the upper end of the arm 243 and its opposite end suitably secured to one end portion of the slide 255. When the arm 243 has been rocked from the position shown in Figure 40 to the position shown in Figure 11 and subsequently the lug 245 has escaped from the shoulder or abutment 253, the spring 183 which has been placed under tension immediately draws the arm 243 back to its normal position. This spring actuation of the arm 243 occurs in each direction of travel of the printing carriage because of the presence of the two springs 183.

The means for transmitting the oscillations of the arm 243 to the platen includes an arm 267 provided at one end with a cross head 267′ constituting a slide working vertically in a guideway 268 in the arm 243 and normally held depressed by one or more springs 269 interposed between the top of the part 267′ and the closed top of the guideway. A slot 270 in the arm 243 accommodates the arm 267 in its up and down movements. The outer end of the arm 267 is provided with a depending dog or detent 271 which cooperates with a gear 272 fixed upon the platen shaft 234 and located between the arm 243 and the adjacent end of the platen. This dog or detent is in the form of a wedge of a size and shape to fit snugly between adjacent teeth of the gear 272 so as to interlock the gear and the arm in the manner of a clutch, whereby the gear 272 will be rocked when the upstanding arm 243 is rocked in the manner hereinbefore described. It will here be explained that the arm 243 is mounted to rock loosely upon the platen shaft 234 in order that the platen may be rotated independently of the arm by manipulation of the finger piece 235 or otherwise and completely turned over if desired and therefore a detachable or disengageable connection has been provided between the arm 243 and the gear 272 whereby the gear may be rocked by the arm 243, and whereby said arm may be disconnected from the gear whenever it is desired to rotate the platen to a greater or less extent than can be accomplished by the operation of the arm 243. It will here be explained that the rocking motion imparted to the platen 233 by the swinging of the arm 243 is to obtain the desired rolling printing contact between the platen and the printing characters on the respective printing cylinders.

To provide for line spacing movements of the platen, I provide the means shown in Figures 12, 13 and 14 which includes a dog 273 which has its lower free end in cooperative relation with the teeth of the gear 272 and its upper end pivoted to a link 274 which is in turn pivoted to the top of the detent 271. An arcuate rod or bar 275 is pivoted to the dog 273 and extends through a slot or opening 276 in the upstanding shank portion of the part 271 which rises above the arm 267. The top of the rod 275 is provided with a finger piece 277, and the convex side of the rod is provided with teeth 278 which are designed to engage with the bottom of the slot 276 and adjust the position of the dog 273 with respect to the part 271. A trip arm 279 is pivoted to the upstanding shank portion of the part 271, as best shown in Figure 12, passes through a slot or opening in the dog 273 and is provided at its outer free end with an upstanding post 280 having a set screw 281 in the top thereof which is designed to run under and contact with a stationary trip member 282 hung from a bar 283, shown in Figure 15 of the drawings, and supported at opposite ends in the end pieces 231 of the type bed frame. A spring 284 extends between the dog 273 and the shank of the detent 271 and exerts a pressure normally tending to draw these parts towards one another.

By reference to Figures 5, 38 and 39 it will be seen that the line spacing mechanism above described is located between the platen oscillating arm 243 and the platen, and that the projection or detent 271 together with the arm 267 constitutes a crank arm for imparting oscillating movements from the arm 243 to the gear 272 and thence through the shaft 234 to the platen 233. Normally the projection or detent 271 is held in engagement with the gear 272 by the pressure of the springs 269, so as to produce in effect a rigid connection between the arm 243 and the gear 272. The springs 269 permit of the projection or detent 271 being lifted out of engagement with the gear 272 so as to permit rotation of the platen 233 independently of the oscillations of the arm 243, so as to permit line spacing adjustable rotation of the platen and any other desired independent rotations of said platen.

Line spacing is obtained when the post member 280 wipes against the underside of the stationary and adjustable trip member 282 at either limit of the travel of the carriage carrying the platen. It will of course be understood that an adjustable trip 282 is at each end of the machine, one of such trips being shown in Figure 15 and the other shown in Figure 38. The trip is likewise shown in Figure 5 of the drawings and includes an upstanding shank having a lateral arm 285 which overlies the bar 283 and is adjustably secured thereto in any suitable manner as by means of a set screw 286. The trip portion 282 is in the form of a flat blade or plate which is inclined downwardly and outwardly towards the adjacent end of the machine. By reference to Figure 13, and assuming that the carriage is traveling in the direction of the arrow, the line spacing mechanism being in the condition shown in Figure 12, the top of the post 280 will engage the under inclined face of the trip member 282 as indicated in dotted lines in Figure 13 whereby the post 280 and the arm 279 will be rocked downwardly on the fulcrum afforded by the bottom of the slot in the dog 273 which will result in the lifting of the detent 271 out of engagement with the gear 272, whereby the latter will be free to rotate and will be rotated in the direction of the arrow thereon by reason of the fact that the dog 273 is being pressed downwardly by the arm 279. The amount of rotation of the gear 272 may be adjusted by manual setting of the prop member 275 on the bottom of the slot 276 so as to vary the spacing between the dog 273 and the detent 271. By such setting or adjustment the gear 272 may be rotated one or more steps or distances according to the position of the dog 273. Just as soon as the top of the post 280 clears the bottom of the stationary trip member 282, the spring 284 will return the parts of the line spacing mechanism to their original position which of course will result in the dropping of the detent 271 in between adjacent teeth of the gear 272 which results in the locking of the gear and prevents overthrow of the platen.

Attention is here directed to the fact that the platen 233 is loosely mounted on the platen shaft 234 and may be given a variety of movements by a variety of different means. In the first place there is a clutch connection between the platen and the shaft which is afforded by the worm 242, the worm wheel 238, the pinion 239, the rack or crown gear 240 and the cooperating parts, which clutch permits of the platen being rotated by hand manipulation of the hand wheel 235 on the platen shaft. The platen may be rotated upon the shaft by manipulation of the cap or casing 241 as hereinbefore explained, and during this movement the platen shaft is held against rotation by reason of the detent 271 engaging with and locking the gear 272, see Figure 12, which is fast upon the platen shaft 234. Furthermore line spacing movements may be imparted to the platen by the line spacing mechanism shown in Figures 12 and 13. Although the detent 271 is normally in engagement with the gear 272 through the pressure of the springs 269, the pressure of these springs may be overcome by forcible manual manipulation of the hand wheel 235 on the end of the platen shaft whereby the platen shaft and the platen may be rotated by hand notwithstanding the presence of the spacing mechanism and without requiring any separate adjustment or tripping thereof. It will now be understood that the detent 271 and associated parts constitute in effect a clutch connection between the oscillating arm 243 and the platen gear 272 whereby the arm may be clutched to the fear for rocking the same and may also be disconnected from the gear to permit movements of the platen independent of the rocking arm 243.

From the foregoing description it will be understood that the platen 233 while mounted to rotate loosely upon the shaft 234 so that it may be rotated freely in opposite directions upon the shaft through the manipulation of the cap or finger piece 241, rotation of the shaft 234 either by manipulation of the finger piece 235 or through the oscillation of the gear 272, fast on the shaft 234, by the oscillation of the arm 243, will also rotate the platen with the shaft by reason of the interlocking of the platen with the shaft by the cap 241 and its contained parts.

The line spacing mechanism, as hereinbefore described, imparts a stepped rotary movement to the platen 233 and therefore the line spacing is either a single step or a multiple thereof. In view of this fixed line spacing, I also propose to provide for both increasing and decreasing the line spacing movements of the platen so as to obtain any predetermined line spacing for the purpose of simulating hand set matter which, as is well known, is set solid and is also leaded or double leaded, etc. The mechanism for accomplishing this result is shown in Figures 5, 50 and 51, and includes means for automatically manipulating the finger pieces 241 which, as hereinbefore described, is associated with the platen 233 and its shaft 234 so as to loosely rotate the platen upon its shaft. Mounted to rotate upon the part 241 is a ring gear 287 upon which is mounted a dog or pawl 288 having one end in cooperative relation with an annular series of straight sided teeth 289 on the exterior of the part 241. This dog is pivoted upon a headed pin 290 carried by the ring gear 287 and is under the tension of a spring 291 embracing the pin and connected at opposite ends to the dog and pin respectively. As best shown in Figure 51 it will be seen that the head of the pin is spaced from the dog or pawl so as to permit of a slight lateral sliding of the dog on the pin against the tension of the coil spring, in order that the handle portion of the dog may be engaged with the shoulder or keeper 292 provided upon the adjacent face of the ring gear 287 for a purpose as will hereinafter appear. Located diametrically opposite the dog 288 is a duplicate dog 293. In mesh with the top of the ring gear is a slide 294 provided with a toothed lower side and mounted to slide endwise in a guideway 295 provided upon the adjacent side of the printing carriage or to be more particular upon the post 227. This slide is normally maintained in the position shown in Figure 50 by means of springs 296 and 297 connected to opposite sides of the post 227 and also connected to adjusting screws 298 and 299 extending through threaded openings in shoulders or projections 300 and 301 rising from the ends of the slide. Normally the dog 288 is held out of engagement with the teeth 289 by reason of the free end of the handle of the dog being engaged against the under side of the shoulder or abutment 302 carried by the slide. Movement of the slide 294, to the right as viewed in Figure 50, will rotate the ring gear 287 in a clock-wise direction. As the dog 288 is carried by and moves with the gear 287, and when the dog is in engagement with the teeth 289, the part 241 will rotate with the gear and, as hereinbefore described, the platen 233 will be rotated on the shaft 234, without disturbing the line spacing mechanism. Automatic operation of the slide 294 is accomplished by means of a trip 303 adjustably disposed in the path of the slide 294 so as to stop the slide before the printing carriage reaches its limit of movement, the result of which is a relative movement between the slide and the carriage, which produces the further result of turning the platen when the slide 294 is stopped by the part 303, the ring gear 287 will be rotated in the clock-wise direction because it is traveling to the left upon the slide as a track. During the initial movement of the gear 287, the upper free end of the dog 288 will escape from beneath the abutment 302 and the other end will be automatically thrown into engagement with the teeth 289 on the part 241 by the action of the spring 291. It will of course be understood that the rotation of the platen is slight as compared with the rotation of the part 241, thereby to obtain a finer rotatable adjustment of the platen 233 than can be accomplished by the line spacing mechanism hereinbefore described which imparts a stepped movement only of the platen 233 defined by the regularly spaced teeth on the gear 272. Inasmuch as the platen will be rotated in a clock-wise direction by the movement of the slide 294, it will be understood that the operation of the slide increases the line spacing interval over that which was accomplished by the line spacing mechanism hereinbefore described. The stop 303 may be adjustably supported in any suitable manner and has been shown connected to the track rail 230 by means of a set screw 304. By adjusting the stop longitudinally of the track rail, so as to change the throw or movement of the slide 294 to the right, in Figure 50, any predetermined increase in line spacing may be accomplished, between the regular stepped spacing of the line spacing mechanism. After the printing carriage has come to a stop and then starts to travel in the reverse direction, the tension on the springs 296 and 297 will be relieved and the slide 294 will be restored to its normal position. The movement of the slide 294, in returning to its normal position, rotates the ring 287 in a counter clock-wise direction without rotating the part 241, because the dog 288 merely rides backwards over the teeth 289. Just before the pivot of the dog reaches its uppermost position, the upper free end of the dog will wipe against the under side of the abutment 302 whereby the lower free end of the dog will be disengaged from the teeth 289.

When the printing carriage approaches the limit of its travel to the right hand side of the machine, as viewed in Figure 50, the right hand end of the slidable rack 294 will come into engagement with a stop 305, similar to the stop 303, whereby the movement of the slidable rack will be stopped during the further movement of the carriage which results in relative movement between the carriage and the rack rotates the ring gear 287 in a counter clock-wise direction, the dog 288 becoming freed from the abutment 302 and the active end of the dog idling across the teeth 289. After the printing carriage comes to a stop and then starts on its return movement to the left, the slidable rack 294 will start to resume its normal position under the influence of the springs 296 and 297, which will result in the rotation of the gear 287 in a clock-wise direction, whereupon the active end of the dog 288 will engage one of the teeth 289 and rotate the part 241 in a clock-wise direction which will in turn rotate the platen 233 so as to slightly increase the line spacing movement of the platen previously applied thereto by the line spacing mechanism.

The variable spacing mechanism, above described, accomplishes what is technically known in the typographical art as leading, and is active at or adjacent the opposite limits of travel of the printing carriage. Between the periods of operation of the variable line spacing mechanism, the platen 233 is passing across the printing cylinders 24 and is of course oscillated as it passes over each printing cylinder to obtain the desired rolling printing contact therewith. During the oscillation of the platen 233 in its printing operation, the part 241 rotates with the platen and also rotates loosely within the ring gear 287, the latter being held against rotation by the part 294 which is in turn held by the springs 296 and 297, and consequently there is no movement of the gear 287 and the part 294 during the oscillating printing movements of the platen 233.

To reduce the line spacing interval, such as has been produced by the normal line spacing mechanism, there has been provided at the bottom of the gear 287 a slidable rack 306 which in its mounting and operation is the same as that shown and described for the slidable rack 294, and the detailed description of the latter part and the reference characters applied thereto also apply to the part 306, said part 306 of course being mounted in a guideway on the side 223 of the printing carriage. At each end of the machine and in the path of the adjacent end of the slidable rack 306 is a stop including a post 307 which, as best shown in Figure 15, rises from the frame bar 32 and is provided at its upper end with a set screw 308, the inner end of which is in the path of the adjacent end of the part 306. Of course the post 307 is beyond the limit of movement of the part 306.

It will now be understood that the slidable rack 306 operates to impart rotation to the platen 233 in exactly the same manner as described for the slidable rack 294 except that the direction of rotation of the platen is reverse to that imparted to it by the slidable rack 294, because the slidable rack 306 is operating upon the diametrically opposite peripheral portion of the gear 287.

When either of the slidable racks is to be used, the dog associated with the other rack is held in its inoperative position by being moved laterally outward upon its pivot pin 290 until its handle portion clears the abutment 302 and also clears the keeper or shoulder 292, whereupon the dog is rotated to pass beyond the shoulder 292 and then is permitted to be drawn back by the spring 291 and against the gear 287 with the handle portion of the dog in engagement with the opposite side of the shoulder 292, as shown at the bottom of Figure 50.

As hereinbefore indicated, the printing carriage is mounted to travel back and forth from side to side of the machine upon the track rails 230. The mechanism for moving the carriage is the same at each side of the machine and therefore a detailed description of one of the mechanisms is deemed sufficient. Each of these mechanisms includes a shaft 309 mounted in parallelism with the printing cylinders 24, one at each end of the type bed frame C, as clearly indicated in Figure 1 of the drawings. The front end of this shaft is rotatively mounted in the front side of the frame C, and, as best shown in Figure 45, the other end of the shaft terminates short of the rear side of the frame and is provided with an enlarged terminal 310 which is rotatable with and detachably associated with the main shaft and is mounted in a bearing 311 extending between the cross bar 8 and the adjacent end of the frame. The rear extremity of the part 310 is provided with a ratchet wheel 312. A stub shaft 313 is journaled in the rear side of the frame C and also in the rear end of the part 310. A beveled gear 314 is fixed upon the stub shaft 313 and carries a pawl 315 cooperating with the ratchet wheel 312. The beveled gear 314 meshes with the teeth of an arcuate rack 316 rising from the frame bar 1, as shown in Figure 17. This gear rotates in one direction when the type-bed frame is rocked from the normal position shown in Figure 2, and also rotates in the opposite direction when the type-bed frame is returned to its normal position. By reference to Figure 47, it will be seen that when the gear 314 travels upwardly it will be rotated in-clockwise direction and, by reason of the pawl 315, the part 310 and the shaft 309 will be rotated. When the gear travels downwardly, it will rotate in a counterclockwise direction, the pawl 315 riding idly around the ratchet wheel 312 without rotating the shaft 309. The shaft 309 is radial with respect to the pivotal axis 9 of the type bed frame C, and the rack 316 is struck on an arc from the pivotal axis 9 as a center in order that the gear 314 may travel properly thereon. Substantially midway between the ends of the shaft 309 is a drum 317 which is in the form of a hollow cylinder and is mounted to rotate loosely upon the shaft. A cross bar 318 extends across one end of the cylinder and is connected at opposite ends to the bar 8 and the adjacent end of the frame C, and is provided with a boss 319 loosely received within an opening in the adjacent end of the cylinder and constituting a bearing for one end of the cylinder. The shaft 309 is provided with an enlargement 320 extending through an opening in the other end of the cylinder and constituting a bearing therefor. A spiral spring 321 encircles the shaft 309, is located within the drum, and has one end connected to the bearing 319 and its other end connected to the shaft, as for instance to the part 320 thereof. The part 320 is provided with an annular series of ratchet teeth 322 just outside of the drum and designed for cooperation with a dog or pawl 323 mounted to rock and also to slide upon a pin 324 extending outwardly from the adjacent end of the drum. A spiral spring 325 embraces the pin and bears in opposite directions against the adjacent end of the drum and the pawl 323 to normally hold the latter at one side of the ratchet wheel 322 and against the plain portion of the part 320 of the shaft 309. The pawl may be pushed inwardly against the tension of the spring for the purpose of bringing the pawl into cooperation with the ratchet wheel 322. For the purpose of controlling the pawl 323, there is provided a push device comprising inner and outer heads 326 and 327 in the form of rings mounted to slide upon the shaft 309, the head 326 being upon the part 320 of the shaft. Suitable bars 328 connect the heads 326 and 327. By pushing inwardly upon the slidable frame, the inner head 326 may be forced against the pawl 323, regardless of the circumferential position of the latter, and the pawl thereby pushed into engagement with the ratchet wheel 322. A suitable push rod or handle 329 extends forwardly from the outer head 327 and through a slot or opening 330 in the adjacent side bar of the frame C. Any suitable handle 331 may be provided upon the outer end of the push bar 329. Carried upon the shaft 309 and located between the head 327 and the frame C is a ratchet wheel 332, and cooperating with the under side thereof is a dog 333 pivoted at 334 on the inner side of the frame C and having a depending tail portion 335, which extends downwardly across the push bar 329. A cam portion 336 is provided upon the push rod 329 and spaced outwardly from the dog 333 so as to permit of an initial inward movement of the push rod 329 and its associated parts so as to move the pawl 323 into engagement with the ratchet wheel 322 prior to the engagement of the cam 336 with the tail 335 of the dog 333, the result being that the drum pawl 323 is first put into engagement with the ratchet wheel 322 and subsequently the dog 333 is tripped from engagement with the ratchet wheel 332. As shown in Figure 49, it will be seen that the dog 333 at the opposite end of the type bed frame is simultaneously actuated through the medium of connecting rods 337 and 338 extending from the tails of the respective dogs and connected to opposite ends of a rocker arm 339 pivoted intermediate of its ends as at 340 to the inner side of the front frame bar of the type bed frame C. The position of this rocker 339 is also shown in Figures 4 and 5. A cord 341 is wound in a counter-clockwise direction upon the drum 317 at the left-hand side of the machine and extends upwardly to a suitable guide 342 provided upon the adjacent end plate of the type bed frame and thence to the printing carriage L to which it is connected at 343. The pull cord 341ª which leads from the other end of the printing frame to the winding drum at the opposite side of the machine is wound in a clockwise direction around said drum, from which it will be understood that when one of the cords is being wound upon its drum, the other cord is being unwound from its drum. It will be remembered that in its normal printing position, the type bed frame C has its rear side tilted downwardly, as shown in Figure 1. When the type bed frame is tilted to restore the printing wheels to their storage cylinders, the gear 314 will travel upwardly upon the rack 316, thereby rotating the gear 314 in a clockwise direction and likewise rotating the shaft 309, whereby the spring 321 will be wound because one end thereof is connected to the shaft at 320 and its other end connected to the bearing 319. It will of course be understood that the springs of the two winding drums are simultaneously wound, one in one direction and the other in the opposite direction.

During the winding of the spring 321, the dog 333 is idling with respect to the ratchet wheel 332, which dog of course locks the shaft and prevents unwinding of the spring when the type bed frame is swung downwardly to its normal position, during which movement of the frame, the gear 314 idles backwardly over the ratchet wheel 312, because of the rotatable mounting of the shaft 313 in the part 310 and in the frame C. The drum 317 is held against rotation when the spring 321 is being wound because of the frictional resistance offered by the pull cord 341. By moving the drum pawl 323 into engagement with the ratchet wheel 322 so as to interlock the drum with the shaft, and then tripping the dog 333 from the ratchet wheel 332 so as to release the shaft 309, the latter will be rotated in a counter-clockwise direction, by the unwinding of the spring 321, whereby the cord 341 will be wound upon the drum and the printing carriage will be pulled from the right hand side of the machine to the left hand side thereof. When tripping the dog 333 at the left hand side of the machine, the dog 333 at the right hand side of the machine will also be tripped, but the drum pawl 323 at the right hand side of the machine will be unaffected and will remain in cooperation with the plain part of the shaft 309, whereby the drum will be loose upon the shaft so as to unwind thereon in a counter-clockwise direction and pay out the cord 341ª while the cord 341 is being wound upon the drum at the left hand side of the machine. During this loose rotation of the drum at the right hand side of the machine, the shaft 309 at said right hand end of the machine will be rotated in a clockwise direction under the influence of its winding spring. When the printing carriage has traveled from either side of the machine to the opposite side thereof, each of the winding springs 321 will have become unwound, so that when the type bed frame is again tilted to restore the printing wheels to their storage cylinders, the two winding springs 321 will be again wound, the two springs being wound to the same extent so as to avoid over-winding of either spring, which of course puts equal tension upon the drums and insures a uniform travel of the carriage in either direction.

When the printing carriage is at the right of the machine, and it is desired to travel the carriage to the opposite side of the machine, the push bar 329, at the left of the machine, is pushed in so as to clutch the winding drum at the left to its shaft 309 and also to release said shaft and permit unwinding of the spring to rotate the drum and wind the cord 341 thereon. This manipulation of the push rod 329 simultaneously releases the shaft 309 at the right hand side of the machine so as to permit of the unwinding of its spring and without interference with its drum which is not clutched to the shaft. While the drum at the right hand side of the machine is unwinding in one direction, the shaft is rotating, under the influence of the spring, in the opposite direction, thereby placing sufficient frictional resistance upon the drum as to prevent too rapid unwinding thereof and thereby to maintain the cord 341ª taut. Of course the same operation takes place at the left hand side of the machine when the printing carriage is traveling to the right. With the printing carriage at the left, to travel it to the right, the push d 329 at the right of the machine is pushed inwardly, and then the winding drum at the right operates to pull the carriage from the left to the right in the manner described for moving the carriage from the right to the left.

While any suitable means may be employed for inking the type which has been set up in printing position upon the printing cylinders, I prefer the means best shown in Figures 4, 15 and 16, which means includes an ink roll 344, one at each side of the platen and in parallelism therewith and on a shaft 345 journaled in the opposite sides of the printing frame. Mounted to oscillate upon the ends of the shaft 345 are bell cranks 346 which carry at their lower ends an inking roller 347 which is in frictional engagement with the ink roll 344 and may be brought into a position to wipe across and apply ink to the printing characters which have been set up in printing positions on the type cylinders. A brayer 348 is mounted in cooperative relation with an upper portion of the ink roll 344 and is mounted to feed back and forth upon a right and left screw-threaded shaft 349 journaled in the opposite sides of the printing frame. One end portion of the brayer shaft 349 is provided with a wide faced gear 350 traveling upon a rack 351 mounted at opposite ends in the end plates of the type bed frame. The gear 350 is also in engagement with a gear 352 on the shaft 345 so as to rotate the ink roll 344. The inking roller 347 is located between the platen 233 and the ink roll 344 and is designed to trail in front of the platen when in its operative position. As viewed in Figure 15, the printing carriage is traveling to the right, and therefore the inking roller 347 in advance of the platen is in its operative trailing position, while the inking roller in rear of the platen is in an elevated inoperative position. The positions of the inking rollers are reversed when the printing carriage is traveling to the left.

For maintaining each inking roller in an elevated inoperative position there is provided a cam 353 for each bell crank 346 and in cooperative relation with a small roller 354 pivoted upon the upstanding arm of the bell crank. Each cam 353 is pivoted to the adjacent side of the printing frame, as best shown in Figure 44, and is connected to the arm 265, so that the cam may be rocked by the rod or arm 265. The rods or arms 265 at one end of the printing frame are connected by a cross bar 355, best shown in Figure 44 of the drawings, whereby the cams will be moved simultaneously. A suitable spring 356 is associated with the upright arm of each bell crank and is carried by the carriage frame 224 in such a manner as to yieldably urge the inking roller 347 downwardly. The top and bottom faces of each cam are so disposed that when the top face is engaged beneath the roller 354, as at the left of the printing carriage in Figure 15, the bell crank and the inking roller will be held in an elevated position against the tension of the spring 356 so as to hold the inking roll in its inoperative position. By swinging the arm 265 into the position shown at the right of Figure 15, the cam will permit of the bell crank being forced downwardly by the spring 356 until stopped by the roller 354 coming in contact with the underside of the cam, whereby the bell crank will be held with the inking roller in its lowermost and operative position, the spring 356 permitting of an upward yielding of the roller whenever necessary.

The rods or arms 265 not only control the cams 353 but also release the latch 257 shown in Figure 41, and move the slide 255, as hereinbefore described. It is proposed to automatically move or trip the arms 265, and this is accomplished by means of a trip 357, one at each side of the machine and preferably mounted upon a bracket 358 adjustably mounted upon the rod or bar 283. These trips are in the path of the upper ends of the arms 265 which are at the front side of the printing carriage, as plainly seen in Figure 5 of the drawings. The trip 357 at the right side of the machine is pivoted to swing to the right so as to permit of the adjacent arm 265 wiping past the stop without causing any movement of the arm 265 when the printing carriage is traveling to the right. After the arm 265 has passed the stop and the direction of movement of the carriage is reversed, the arm 265 will come into contact with the stop 357, and as the latter is held against swinging or turning towards the left, the arm 265 will be swung to a position reverse to that shown at the right hand side of Figure 15, as shown in Figure 15ª. In this position of the parts, the arm 265 rests against the spring 356 with the cam 353 at the under side of the roller 354. As the arm 265 is held against further movement to the right by the spring 356, all of the parts will be maintained in the positions shown in Figure 15ª. In order that the top of the arm 265 may clear the trip 357, said arm must be swung slightly to the right, which movement of the arm is permitted by the yielding of the spring 356, when the arm 265 is forcibly swung to the right (as indicated in dotted lines in Figure 15ª) as it travels beneath the trip 357. Immediately upon the arm 265 being released from the trip 357, the spring 356 will resume its normal position and move the arm 265 into the position shown in Figure 15ª, whereby all of the parts will be maintained in their desired positions. In any of the various positions of the bell crank 346, the ink roller 347 will always be in contact with the ink roll 344. Inasmuch as the corresponding arms 265 at the front and rear of the printing carriage are connected by a cross bar 355, best shown in Figure 44, it will be understood that the tripping of either arm 265 at the front of the carriage will also result in the simultaneous tripping of the corresponding arm 265 at the rear of the carriage. Furthermore, as best shown in Figures 11 and 40, it will be seen that the arms 265 at the front of the carriage are connected for simultaneous movements by the arcuate slide 255, so that when either of the arms 265 is tripped the other arm at the same side of the carriage will be simultaneously tripped. As the arms 265 are connected in pairs by the respective cross bars 355, and as corresponding arms of the two pairs are connected by the slide 255, the four arms are connected for simultaneous tripping movements, and therefore it will be understood that the tripping of any one arm will result in the tripping of all of the arms, and therefore the present invention is not limited to the tripping of the particular arms shown and described.

For the purpose of regulating the pressure of the platen 233 against the printing characters set up on the printing cylinders 24, the track rails 230 are vertically adjustable in any suitable manner, such for instance as shown in Figures 15 and 17, wherein 359 designates a ledge or flange extending from the adjacent end plate of the type bed frame, and 360 indicates a cross bar connecting the track rails and maintaining them properly spaced. An adjusting screw 361 extends downwardly through a threaded opening in the cross bar 360 and bears at its lower end upon the top of the ledge 359, whereby the cross bar 360 and the track rails connected thereto may be adjusted vertically. Of course the vertical adjustment of the rails 230 is slight and fillers of paper, cardboard or the like may be introduced between the flange or ledge 359 and the cross bar 360 when the latter is adjusted to any appreciable extent above the flange 359.

What I claim is:

1. The herein described typographical method which consists in assembling typographical elements in a predetermined sequence but out of alignment in the set-wise direction and in parallel lines.

2. The herein described typographical method which consists in assembling typographical elements in a predetermined sequence but out of alignment in the set-wise direction and in parallel lines and within a predetermined measure.

3. The herein described typographical method which consists in assembling typographical elements out of alignment in the set-wise direction and in parallel lines, and taking impressions of the lines of elements in one and the same printing alignment.

4. The herein described typographical method which consists in assembling typographical elements out of alignment in the set-wise direction and in parallel lines according to set-wise widths of the elements.

5. The herein described typographical method which consists in assembling typographical elements out of alignment in the set-wise direction and in parallel lines according to set-wise widths of the elements and within a predetermined measure.

6. The herein described typographical method which consists in assembling typographical elements out of alignment in the set-wise direction and in parallel lines according to set-wise widths of the elements, and taking impressions of the several lines of elements in one and the same printing alignment.

7. The herein described typographical method which consists in assembling typographical elements out of alignment in the set-wise direction and in predetermined parallel lines according to setwise widths of elements, and justifying the several lines of elements with respect to a predetermined measure.

8. The herein described typographical method which consists in assembling typographical elements out of alignment in the set-wise direction and in predetermined parallel lines according to set-wise widths of elements, justifying the several lines of elements with respect to a predetermined measure, and taking impressions of the several lines of elements in one and the same printing alignment.

9. The herein described typographical method which consists in assembling typographical elements out of alignment in the set-wise direction and in predetermined parallel lines, and justifying the lines of elements with respect to a predetermined measure.

10. In the art of typography, the steps of assembling typographic elements consecutively in composing order but in different parallel lines, and arranging the elements of like set-wise width in one and the same line.

11. In the composing of typographical lines, the steps of assembling typographic elements in different parallel lines according to predetermined widths of printing elements with the printing elements of like width in the same respective lines, and assembling filling elements in each of the other lines in accordance with the printing elements of each line.

12. In the composing of typographical lines, the steps of assembling printing elements in different parallel lines according to predetermined widths of elements with the elements of like width in the same respective lines, and simultaneously setting filling elements in each of the other lines when setting each printing element.

13. In the art of typography, the steps of assembling typographic elements consecutively in composing order but in different parallel lines, with the elements of like setwise width in one and the same line, and simultaneously with the assembling of said typographic elements arranging filling elements in each of the other lines and corresponding in width to each typographic element.

14. In the art of typography, the steps of assembling typographic elements consecutively in composing order but in different parallel lines, with the elements of like setwise width in one and the same line, and simultaneously with the assembling of each of said typographic elements arranging filling elements in each of the other lines and corresponding in width to and in alignment with said typographic elements transversely of the set-wise direction.

15. In the composing of typographical lines, the placing of a typographical element and filling elements corresponding in width to that of the face carrying element in alignment with said face carrying element and transversely of the set-wise direction.

16. The herein described typographical method which consists in providing type high printing surfaces out of set-wise alignment, and taking impressions of the surfaces in one and the same printing alignment.

17. The herein described typographical method which consists in providing type high printing surfaces in staggered relation and out of set-wise alignment, and taking impressions of the surfaces in one and the same printing alignment.

18. The herein described typographical method which consists in providing type high printing surfaces out of set-wise alignment, and individually bringing said printing surfaces and an impression receiving medium into rolling impression contact along a common impression line on the said medium.

19. The herein described typographical method which consists in bringing a impression receiving medium and a printing surface comprising staggered portions of a composed typographical line into rolling impression contact along the same alignment on the impression receiving medium, whereby there is printed on the medium in one complete and continuous line those fractional parts of the line which as printing surfaces were disposed in a plurality of lines.

20. The herein described typographical method which consists in providing type high printing surfaces out of set-wise alignment, and relatively positioning the printing surfaces and an impression receiving medium to bring the impression of the printing surfaces into one and the same alignment on the impression receiving medium.

21. The herein described typographical method which consists in providing type high printing surfaces out of set-wise alignment, taking an impression of one of the printing surfaces upon an arcuate impression receiving medium by a rolling movement of said medium, translating said arcuate medium to another printing surface and simultaneously rotating said medium reversely to the direction of its rolling printing movement to bring the medium into position to receive an impression from said other printing surface in alignment with the first impression, and rolling said medium to take the second impression.

22. The herein described typographical method which consists in dividing typographical elements into parallel groups according to set-wise dimensions, and selectively assembling the elements consecutively in composing order in different parallel lines and in alignment with their respective groups.

23. The herein described typographical method which consists in dividing typographical elements into parallel groups according to set-wise dimensions, selecting elements consecutively in composing order, moving them in straight paths in alignment with their respective groups, and arranging them in composing order but in different parallel lines.

24. The herein described typographical method which consists in dividing typographical elements into parallel groups according to set-wise dimensions, selectively assembling the elements consecutively in composing order in different parallel lines and in alignment with their respective groups, and subsequently returning the elements along the same straight paths to their respective groups.

25. The herein described typographical method which consists in dividing typographical elements into parallel groups according to set-wise dimensions, selecting elements consecutively in composing order, moving them in straight paths in alignment with their respective groups, arranging them in composing order but in different parallel lines, and subsequently returning the elements along the same straight paths to their respective groups.

26. The herein described typographical method which consists in dividing typographical elements into parallel groups according to set-wise dimensions, selectively assembling the elements consecutively in composing order in different parallel lines and in alignment with their respective groups, and subsequently and simultaneously returning the elements along the same straight paths to their respective groups.

27. The herein described typographical method which consists in dividing typographical elements into parallel groups according to set-wise dimensions, selecting elements consecutively in composing order, moving them in straight paths in alignment with their respective groups, arranging them in composing order but in different parallel lines, and subsequently and simultaneously returning the elements along the same straight paths to their respective groups.

28. The herein described typographical method which consists in providing printing devices having typographical elements disposed about the peripheries thereof, the typographical elements of each printing device being of substantially the same set-wise dimension, grouping the printing devices according to the set-wise dimensions of their typographical elements and arranging the groups in parallelism, selectively rotating printing devices to bring predetermined typographical elements into predetermined positions, and bodily moving the selected printing devices in alignment with their respective groups and assembling them in printing position with the selected typographical elements in compositional order in different parallel lines and in alignment with their respective groups.

29. The herein described typographical method which consists in providing printing devices having typographical elements disposed about the peripheries thereof, the typographical elements of each printing device being of substantially the same set-wise dimension, grouping the printing devices according to the set-wise dimensions of their typographical elements and arranging the groups in parallelism, selectively rotating printing devices to bring predetermined typographical elements into predetermined positions, bodily moving the selected printing devices in alignment with their respective groups and assembling them in printing position with the selected typographical elements in compositional order in different parallel lines and in alignment with their respective groups, and subsequently returning the printing devices to their respective groups along paths in alignment with said groups.

30. The herein described typographical method which consists in providing printing devices having typographical elements disposed about the peripheries thereof, the typographical elements of each printing device being of substantially the same set-wise dimension, grouping the printing devices according to the set-wise dimensions of their typographical elements and arranging the groups in parallelism, selectively rotating printing devices to bring predetermined typographical elements into predetermined positions, bodily moving the selected printing devices in alignment with their respective groups and assembling them in printing position with the selected typographical elements in compositional order in different parallel lines and in alignment with their respective groups, and subsequently and simultaneously returning the printing devices to their respective groups along paths in alignment with said groups.

31. The herein described typographical method which consists in dividing typographical elements into parallel groups according to set-wise dimensions, selectively assembling the elements consecutively in composing order in different parallel lines and in alignment with their respective groups, and justifying the several lines of elements with respect to a predetermined measure.

32. The herein described typographical method which consists in dividing typographical elements into parallel groups according to set-wise dimensions, selecting elements consecutively in composing order, moving them in straight paths in alignment with their respective groups and arranging them in composing order but in different parallel lines, and justifying the several lines of elements with respect to a predetermined measure.

33. The herein described typographical method which consists in providing printing devices having typographical elements disposed about the peripheries thereof, the typographical elements of each printing device being of substantially the same set-wise dimension, grouping the printing devices according to the set-wise dimensions of their typographical elements and arranging the groups in parallelism, selectively rotating printing devices to bring predetermined typographical elements into predetermined positions, bodily moving the selected printing devices in alignment with their respective groups and assembling them in printing position with the selected typographical elements in compositional order in different parallel lines and in alignment with their respective groups, and justifying the several lines of elements with respect to a predetermined measure.

34. The herein described typographical method which consists in providing printing devices having typographical elements disposed about the peripheries thereof, the typographical elements of each printing device being of substantially the same set-wise dimension, providing substantially parallel groups of printing devices, each group having typographical elements of substantially the same set-wise dimension, providing a series of filling elements for each group of printing devices, selectively rotating printing devices to bring predetermined typographical elements into predetermined positions, bodily moving the selected printing devices in alignment with their respective groups and assembling them in printing position with the selected typographical elements in compositional order in different parallel lines and in alignment with the respective groups, and positioning filling elements in alignment with the selected printing devices at right angles to the set-wise direction.

35. The herein described typographical method which consists in providing typographical elements and filling elements, dividing the typographical elements into parallel groups according to set-wise dimensions, selecting typographical elements consecutively in composing order and moving them in straight paths in alignment with the respective groups, arranging the typographical elements in composing order but in different parallel lines, and positioning filling elements in alignment with the positioned typographical elements at right angles to the set-wise direction.

36. The herein described typographical method which consists in providing typographical elements, filling elements, and justifying elements, dividing the typographical elements into parallel groups according to set-wise dimensions, selecting typographical elements consecutively in composing order and moving them in straight paths in alignment with the respective groups, arranging the selected typographical elements in composing order but in different parallel lines, positioning filling elements in alignment with the positioned typographical elements and at right angles to the set-wise direction, and forcing justifying elements between predetermined positioned elements to justify said elements within a predetermined measure.

37. The herein described typographical method which consists in dividing typographical elements into parallel groups according to set-wise dimensions with the groups inclined to the vertical, selecting typographical elements consecutively in composing order, permitting the selected typographical elements to gravitate in straight paths in alignment with their respective groups into printing position, and arranging the selected typographical elements in composing order but in different parallel lines.

38. The herein described typographical method which consists in dividing typographical elements into parallel groups according to set-wise dimensions with the groups inclined to the vertical, selecting typographical elements consecutively in composing order, permitting the selected typographical elements to gravitate in straight paths in alignment with their respective groups into printing position, and arranging the selected typographical elements in composing order but in different parallel lines, reversing the inclined position of the groups of typographical elements and the positioned elements, and permitting the positioned elements to gravitate to their original positions in the respective groups.

39. The herein described typographical method which consists in dividing typographical elements into parallel groups according to set-wise dimensions with the groups inclined to the vertical, selecting typographical elements consecutively in composing order, permitting the selected typographical elements to gravitate in straight paths in alignment with their respective groups into printing position, and arranging the selected typographical elements in composing order but in different parallel lines, reversing the inclined position of the groups of typographical elements and the positioned elements, and permitting the positioned elements to gravitate to their original positions in the respective groups, and then returning the groups to their original inclined positions.

40. The herein described typographical method which consists in dividing typographical elements into parallel groups according to set-wise dimensions, selectively rotating typographical elements to bring predetermined portions thereof into predetermined positions, moving the selected elements in straight paths in alignment with their respective groups and arranging them in composing order but in different parallel lines, rotating the positioned typographical elements to their original angular positions, and then bodily moving said elements along straight paths in alignment with their respective groups into their original positions in said groups.

41. The herein described typographical method which consists in dividing typographical elements into parallel groups according to set-wise dimensions, selectively rotating typographical elements consecutively in composing order to bring predetermined portions thereof into predetermined positions, bodily moving the selected typographical elements in straight paths in alignment with their respective groups into printing position and arranging them in composing order but in different parallel lines, moving the positioned typographical elements along continuations of their original paths and to positions beyond the printing position, then rotating the said elements into their original angular positions, and then bodily returning the said elements along their respective straight paths into their original positions in their respective groups.

42. The herein described typographical method which consists in dividing typographical elements into parallel groups according to set-wise dimensions with the groups inclined to the vertical, selectively rotating typographical elements to bring predetermined portions thereof into predetermined positions, permitting the selected typographical elements to gravitate in paths in alignment with the groups and into printing position and arranging them in composing order but in different parallel lines, taking an impression from the positioned typographical elements in the same printing alignment, then permitting the positioned elements to gravitate along a continuation of their original paths to positions beyond the printing position, rotating the selected typographical elements into their original angular positions, reversing the inclined positions of the groups and the selected typographical elements, and permitting the selected typographical elements to gravitate along their original paths and into their original positions in their respective groups.

43. The herein described typographical method which consists in providing a plurality of rotatable printing wheels having typographical elements upon the peripheries thereof, the typographical elements of each wheel being of substantially the same set-wise dimension and differing from the set-wise dimensions of the typographical elements of the other wheels, providing a plurality of parallel groups of said printing wheels, the typographical elements of the wheels of each group being identical and differing from those of each of the other groups, selectively rotating a terminal wheel of one of the groups to bring a predetermined typographical element into a predetermined position and then bodily moving said element into printing position along a straight path in alignment with said group, and selectively rotating and bodily moving printing wheels of certain of the other groups in compositional order and disposing the selected typographical elements thereof in compositional order and in printing position.

44. The herein described typographical method which consists in providing a plurality of rotatable printing wheels having typographical elements upon the peripheries thereof, the typographical elements of each wheel being of substantially the same set-wise dimension and differing from the set-wise dimensions of the typographical elements of the other wheels, providing a plurality of parallel groups of said printing wheels, the typographical elements of the wheels of each group being identical and differing from those of each of the other groups, selectively rotating a terminal wheel of one of the groups to bring a predetermined typographical element into a predetermined position and then bodily moving said element into printing position along a straight path in alignment with said group, and selectively rotating and bodily moving printing wheels of certain of the other groups in compositional order and disposing the selected typographical elements thereof in compositional order and in printing position, rotating the positioned wheels to their original angular positions, and then moving them reversely along their original paths into their original positions in the respective groups of wheels.

45. The herein described typographical method which consists in providing a plurality of rotatable printing wheels having typographical elements upon the peripheries thereof, the typographical elements of each wheel being of substantially the same set-wise dimension and differing from the set-wise dimensions of the typographical elements of the other wheels, providing a plurality of parallel groups of said printing wheels, the typographical elements of the wheels of each group being identical and differing from those of each of the other groups, providing a series of filler elements for each group of wheels, selectively rotating a terminal wheel of one of the groups to bring a predetermined typographical element thereof into a predetermined position, bodily moving said selected wheel in a straight path in alignment with said group of wheels and into printing position, moving filler elements of the remaining groups of wheels into alignment with the positioned wheel at right angles to the set-wise direction, selectively positioning wheels of the other groups in compositional order but in parallel lines and also positioning filler elements in accordance therewith, taking an impression of the positioned typographical elements in a single printing alignment, returning the filler elements to their original positions, rotating the wheels to their original angular positions, and then bodily moving the wheels reversely along their original paths into their original positions in the respective groups.

46. The herein described typographical method which consists in providing a plurality of rotatable printing wheels having typographical elements upon the peripheries thereof, the typographical elements of each wheel being of substantially the same set-wise dimension and differing from the set-wise dimensions of the typographical elements of the other wheels, providing a plurality of parallel groups of said printing wheels, the typographical elements of the wheels of each group being identical and differing from those of each of the other groups, providing a series of filler elements for each group of wheels, selectively rotating a terminal wheel of one of the groups to bring a predetermined typographical element thereof into a predetermined position, bodily moving said selected wheel in a straight path in alignment with said group of wheels and into printing position, moving filler elements of the remaining groups of wheels into alignment with the positioned wheel at right angles to the set-wise direction, selectively positioning wheels of the other groups in compositional order but in parallel lines and also positioning filler elements in accordance therewith, taking an impression of the positioned typographical elements in a single compositional line, returning the filler elements to their original positions, moving the positioned wheels in continuations of their original paths to positions beyond the printing positions, then rotating the wheels into their original angular positions, and then moving the wheels reversely along their original paths into their original positions in the respective groups of wheels.

47. The herein described typographical method which consists in positioning a column rule, assembling typographical elements out of alignment in the set-wise direction and in parallel lines according to set-wise widths of the elements and in compositional order with respect to the column rule, positioning justifying wedges in preliminary positions with respect to the positioned typographical elements, positioning another column rule, and forcing the justifying elements between certain of the typographical elements to justify all of the typographical elements between the column rules.

48. The herein described typographical method which consists in positioning a column rule, assembling typographical elements out of alignment in the set-wise direction and in parallel lines according to set-wise widths of the elements and in compositional order with respect to the column rule, positioning justifying wedges in preliminary positions with respect to the positioned typographical elements, positioning another column rule, and forcing the justifying elements between certain of the typographical elements to justify all of the typographical elements between the column rules, disengaging the justifying elements and returning them to their original positions, removing the column rules, and returning the typographical elements to their original positions.

49. The herein described typographical method which consists in providing a plurality of rotatable printing wheels having typographical elements upon the peripheries thereof, the typographical elements of each wheel being of substantially the same set-wise dimension and differing from the set-wise dimensions of the typographical elements of the other wheels, providing a plurality of parallel groups of said printing wheels, the typographical elements of the wheels of each group being identical and differing from those of each of the other groups, providing a series of filler elements for each group of wheels, positioning a column rule, selectively rotating a terminal wheel of one of the groups to bring a predetermined typographical element thereof into a predetermined position, bodily moving said selected wheel in a straight path in alignment with said group of wheels and into printing position with respect to the column rule, moving filler elements of the remaining groups of wheels into alignment with the positioned wheel at right angles to the set-wise direction, selectively positioning wheels of the other groups in compositional order but in parallel lines and also positioning filler elements in accordance therewith, positioning a second column rule, forcing justifying wedges between certain of the typographical elements to justify the elements within the measure defined by the column rules, taking an impression of the positioned typographical elements in a single printing alignment, removing the column rules, returning the justifying elements and fillers to their original positions, moving the positioned printing wheels in continuations of their original paths to positions beyond the printing position, rotating the wheels to their original angular positions, and returning the wheels along their original paths to their original positions in the respective groups.

50. The herein described typographical method which consists in dividing typographical elements into parallel groups according to set-wise dimensions with the groups inclined to the vertical, positioning a column rule, selecting typographical elements consecutively in composing order, permitting the selected typographical elements to gravitate in straight paths in alignment with their respective groups into printing position with respect to the column rule, arranging the selected typographical elements in compositional order but in different parallel lines, positioning a second column rule, taking an impression of the several lines in a single printing alignment, removing the column rules, permitting the positioned typographical elements to gravitate in continuations of their original paths into positions at one side of the printing position, reversing the inclination of the group of typographical elements and the selected typographical elements, and permitting the latter to gravitate reversely along their original paths into their original positions in the respective groups.

51. The herein described typographical method which consists in dividing typographical elements into groups according to set-wise dimensions of the elements, and selectively moving the typographical elements in compositional order into printing positions and back to their original positions in the respective groups without intermingling typographical elements of different set-wise dimensions.

52. The herein described typographical method which consists in dividing typographical elements into substantially parallel groups according to set-wise dimensions and selectively moving the typographical characters in straight paths from the groups to printing positions in compositional order and back to their original positions in the respective groups without intermingling typographical elements of different set-wise dimensions.

53. The herein described typographical method which consists in dividing typographical elements into substantially parallel groups, and selectively moving the typographical elements in straight paths in compositional order to and from printing positions.

54. A typographical apparatus having typographical elements, and key controlled means for selectively assembling the typographical elements out of alignment in the set-wise direction and in parallel lines.

55. A typographical apparatus having typographical elements, and key controlled means for selectively assembling the typographical elements in compositional order but out of alignment in the set-wise direction and in parallel lines and within a predetermined measure.

56. A typographical apparatus having typographical elements, key controlled means for selectively assembling the typographical elements in compositional order but out of alignment in the set-wire direction and in parallel lines, and means for taking impressions of the several lines of typographical elements in one and the same printing alignment.

57. A typographical apparatus having typographical elements, key controlled means for selectively assembling typographical elements in compositional order but out of alignment in the set-wise direction and in parallel lines according to set-wise widths of the elements, means for positioning column rules at opposite sides of the positioned typographical elements, and means for justifying the several lines of elements with respect to the measure defined by the column rules.

58. A typographical apparatus having typographical elements, key controlled means for selectively assembling the typographical elements in compositional order but out of alignment in the set-wise direction and in predetermined parallel lines according to set-wise widths of elements, means for positioning filling elements in alignment with the respective typographical elements and at right angles to the set-wise direction, means for positioning column rules at opposite sides of the positioned typographical elements, and means for selectively forcing justifying wedges between the typographical elements to justify them within the measure defined by the column rules.

59. A typographical apparatus having parallel groups of typographical elements, the typographical elements of each group being of substantially the same set-wise dimension and differing from the set-wise dimensions of each of the other groups, and key controlled means for selectively assembling the typographical elements in compositional order in different parallel lines and in alignment with their respective groups.

60. A typographical apparatus having parallel groups of typographical elements, the typographical elements of each group being of substantially the same set-wise dimension and differing from the set-wise dimensions of each of the other groups, and key controlled means for selecting typographical elements consecutively in compositional order and moving them in straight paths in alignment with their respective groups into printing positions but in different parallel lines.

61. A typographical apparatus having parallel groups of typographical elements, the typographical elements of each group being of substantially the same set-wise dimension and differing from the set-wise dimensions of each of the other groups, key controlled means for selecting typographical elements consecutively in compositional order and moving them in straight paths in alignment with their respective groups into printing positions but in different parallel lines, and means for returning the printing elements along their original straight paths to their respective groups.

62. A typographical apparatus having parallel groups of printing devices provided with typographical elements disposed about the peripheries thereof, the typographical elements of each printing device being of substantially the same set-wise dimension and differing from the set-wise dimensions of each of the other groups, and key controlled means for selectively rotating printing devices to bring predetermined typographical elements into predetermined positions and then bodily moving the selected printing devices in alignment with their respective groups and assembling them in printing position with the selected typographical elements in compositional order in different parallel lines and in alignment with their respective groups.

63. A typographical apparatus having substantially parallel groups of typographical elements, the typographical elements of each group being of substantially the same set-wise dimension and differing from the set-wise dimensions of each of the other groups, a series of filling elements for each of the groups of typographical elements, and key controlled means for selectively assembling typographical elements in compositional order but in different parallel lines in alignment with the groups of typographical elements, and other key controlled means for positioning filling elements in alignment with the respective positioned typographical elements and at right angles to the set-wise direction.

64. A typographical apparatus having substantially groups of printing wheels provided with typographical elements upon the peripheries thereof, the typographical elements of each printing device being of substantially the same set-wise dimension and differing from the set-wise dimensions of each of the other groups, means for positioning a column rule, means for selectively rotating printing devices to bring predetermined typographical elements into predetermined positions and then bodily moving the selected printing wheels in alignment with their respective groups into printing position with respect to the column rule and in compositional order in different parallel lines and in alignment with their respective groups, means for positioning a second column rule, means for removing the column rule, means for rotating the printing wheels into their original angular positions, and means for bodily moving the selected type wheels reversely along their original paths into their original positions in the respective groups.

65. A typographical apparatus including parallel groups of printing wheels provided with typographical elements disposed about the peripheries thereof, said groups being inclined to the vertical, the typographical elements of each printing wheel being of substantially the same set-wise dimension and differing from the set-wise dimensions of each of the other groups, means for positioning a column rule, means for selectively rotating printing wheels to bring predetermined typographical elements into predetermined positions, means to release the selected printing wheels and permit them to gravitate towards the column rule into printing relation with respect thereto, means to remove the column rule and permit the selected wheels to gravitate to positions beyond the position of the column rule, means for rotating the selected printing wheels into their original angular positions, and means to reverse the inclined positions of the groups of printing wheels and the selected printing wheels and to permit the latter to gravitate reversely along their original paths into their original positions in the respective groups of wheels.

66. In a typographical apparatus, a series of magazines inclined to the vertical and a corresponding series of printing cylinders in alignment with the magazines, printing wheels mounted upon each of the magazines, each printing wheel being provided upon its periphery with typographical elements, the typographical elements of each wheel being of substantially the same set-wise dimension and differing from the set-wise dimensions of the typographical elements of the wheels of the other magazines, means for selectively rotating the lowermost printing wheels of the magazines to bring predetermined typographical characters into predetermined positions, means to permit the selected wheels to gravitate from the magazines to the respective printing cylinders, means for releasing the respective printing wheels on the printing cylinders to permit them to gravitate beyond the printing positions, means to rotate the selected printing wheels to return them to their original angular positions, and means to reverse the inclined positions of the printing cylinders and the magazines and to permit the selected printing wheels to gravitate reversely along their original paths and to the respective magazines.

67. In a typographical apparatus, a magazine inclined to the vertical, a series of printing wheels embracing the magazine and provided around their peripheries with typographical elements, a printing member inclined to the vertical and in longitudinal alignment with the magazine, and means for selectively rotating the lowermost printing wheel to bring a predetermined typographical element into a predetermined position, and means to subsequently release the selected wheel and permit the same to gravitate to the printing member.

68. In a typographical apparatus, a magazine inclined to the vertical, a plurality of printing wheels mounted upon the magazine and provided around their peripheries with typographical elements, a printing member inclined to the vertical and in longitudinal alignment with the magazine, a rotatable wheel-setting member disposed between the printing member and the magazine to receive the lowermost printing wheel, means to selectively rotate the setting member to bring predetermined typographical elements into a predetermined position, a rotatable gate normally preventing gravitation of a printing wheel from the setting member, and means for rotating the gate to release a printing wheel on the setting member and to permit said printing wheel to gravitate to the printing member.

69. In a typographical apparatus, a magazine inclined to the vertical, a plurality of printing wheels mounted upon the magazine and provided around their peripheries with typographical elements, a printing member inclined to the vertical and in longitudinal alignment with the magazine, a rotatable wheel-setting member disposed between the printing member and the magazine to receive the lowermost printing wheel, means to selectively rotate the setting member to bring predetermined typographical elements into a predetermined position, a rotatable gate normally preventing gravitation of a printing wheel from the setting member, means for rotating the gate to release a printing wheel on the setting member and to permit said printing wheel to gravitate to the printing member, and means to reverse the inclined position of the printing member and the magazine to permit gravitation of the positioned printing wheel back to the magazine.

70. In a typographical apparatus, a cylindrical magazine inclined to the vertical and provided with a longitudinal guideway, a cylindrical printing member spaced from and in longitudinal alignment with the magazine and provided with a series of longitudinal guideways corresponding to the guideway of the magazine, a plurality of printing wheels embracing the magazine and provided with portions slidably engaging the guideway of the magazine, each printing wheel having typographical elements around the periphery thereof, a rotatable setting member disposed between the magazine and the printing member and provided with a guideway for alignment with the guideway of the magazine and adapted to receive a printing wheel with a portion thereof in the guideway, means to selectively rotate the printing member with a printing wheel thereon to bring predetermined typographical elements into a predetermined position, a rotatable gate between the setting member and the printing member and normally closing one end of the guideway of the setting member, said gate having a guideway normally out of alignment with the guideway of the setting member, and means for rotating the gate to bring its guideway into alignment with the guideway of the setting member to permit a printing wheel to gravitate from the setting member to the printing member.

71. In a typographical apparatus the combination of a cylindrical magazine inclined to the vertical and provided with a longitudinal groove open at its lower end, a printing cylinder spaced from the lower end of the magazine and disposed in longitudinal alignment therewith and also provided with a plurality of longitudinal grooves open at their upper ends and corresponding to the groove of the magazine, a plurality of printing wheels embracing the magazine and provided with internal projections slidably engaging the groove of the magazine, a cylindrical and rotatable setting member disposed between the printing member and the magazine and provided with an open ended groove for alignment with the groove of the magazine to permit the lowermost printing wheel to gravitate to the setting member, means to selectively rotate the setting member with a printing wheel thereon to bring a predetermined typographical element into predetermined position, a cylindrical and rotatable gate mounted between the setting member and the printing cylinder and provided with an open ended groove normally out of alignment with the groove of the setting member to prevent the escape of the printing wheel on the setting member, and means for selectively rotating the gate to bring its groove into alignment with the groove of the setting member and a groove of the printing cylinder to permit a printing wheel on the setting member to gravitate to the printing cylinder.

72. In a typographical apparatus the combination of a cylindrical magazine inclined to the vertical and provided with a longitudinal groove open at its lower end, a printing cylinder spaced from the lower end of the magazine and disposed in longitudinal alignment therewith and also provided with a plurality of longitudinal grooves open at their upper ends and corresponding to the groove of the magazine, a plurality of printing wheels embracing the magazine and provided with internal projections slidably engaging the groove of the magazine, a cylindrical and rotatable setting member disposed between the printing member and the magazine and provided with an open ended groove for alignment with the groove of the magazine to permit the lowermost printing wheel to gravitate to the setting member, means to selectively rotate the setting member with a printing wheel thereon to bring a predetermined typographical element into a predetermined position, a cylindrical and rotatable gate mounted between the setting member and the printing cylinder and provided with an open ended groove normally out of alignment with the groove of the setting member to prevent the escape of the printing wheel on the setting member, and means for selectively rotating the gate to bring its groove into alignment with the groove of the setting member and a groove of the printing cylinder to permit a printing wheel on the setting member to gravitate to the printing cylinder, means to release a printing wheel on the printing cylinder and permit it to gravitate to a position beyond the printing position, means to rotate the printing wheel in its nonprinting position into its original angular position, means to rotate the gate to bring its groove into alignment with the aligned grooves of the printing cylinder, the setting member and the magazine, and means to reverse the inclination of the magazine and the printing cylinder to permit the selected printing wheel to gravitate to its original position on the magazine.

73. In a typographical apparatus, a magazine inclined to the vertical, a plurality of printing wheels carried by the magazine, a printing member opposite the lower end of the magazine and in longitudinal alignment therewith, means to successively and selectively rotate the printing wheels to bring them into predetermined angular positions and to permit them to gravitate from the magazine to the printing member into printing position thereon, means to permit the printing wheels to gravitate from the printing member, a receiver to receive the selected printing wheels when they gravitate from the printing member, means to rotate the printing wheels in the receiver and bring them to their original angular positions, and means to reverse the inclination of the receiver and the printing member and the magazine to permit the selected printing wheels to gravitate back to their original positions on the magazine.

74. A typographical apparatus having typographical elements divided into groups according to set-wise dimensions, and key controlled means for selectively moving the typographical elements in compositional order into printing positions and back to their original positions in the respective groups without intermingling typographical elements of different set-wise dimensions.

75. A typographical apparatus having typographical elements disposed in substantially parallel groups according to set-wise dimensions, and means to selectively move the typographical characters in straight paths in alignment with the respective groups into printing positions in compositional order and back to their original positions in the groups, whereby intermingling of typographical elements in the same printing alignment is obviated.

76. A typographical apparatus having typographical elements disposed in substantially parallel groups according to set-wise dimensions of the typographical elements, and means to selectively move the typographical elements in straight paths in compositional order to and from printing positions.

77. In a typographical apparatus, a supporting bar, a magazine concentric with the bar, a plurality of printing wheels embracing the magazine, a cylindrical setting member mounted to rotate upon the bar and to successively receive printing wheels thereon, said setting element having a sleeve provided at its outer end with a gear, a cylindrical gate mounted to rotate upon the sleeve and to control the escape of printing wheels from the setting member, a sleeve extending from the gate and rotatably embracing the first mentioned sleeve and provided at its outer end with a gear, a printing cylinder embracing the outer sleeve and disposed to receive printing wheels from the setting element, and key controlled means associated with the gears for selective rotation of the setting member and the gate to control the transfer of printing wheels from the magazine to the printing cylinder.

78. In a typographical apparatus, a supporting bar, a magazine concentric with the bar, a plurality of printing wheels embracing the magazine, a cylindrical setting member mounted to rotate upon the bar and to successively receive printing wheels thereon, said setting element having a sleeve rotatable upon the bar and provided at its outer end with a gear, a cylindrical gate mounted to rotate upon the sleeve and to control the escape of printing wheels from the setting member, a sleeve extending from the gate and rotatably embracing the first mentioned sleeve and provided at its outer end with a gear, a printing cylinder embracing the outer sleeve and disposed to receive printing wheels from the setting element, and key controlled means associated with the gears for selective rotation of the setting member and the gate to control the transfer of printing wheels from the magazine to the printing cylinder.

79. In a typographical apparatus, a supporting bar inclined to the vertical, a cylinder magazine thereon, a plurality of printing wheels mounted upon the magazine and capable of gravitating therefrom, a printing cylinder concentric with the supporting bar and adapted to receive printing wheels from the magazine, a rotatable setting member and a rotatable gate mounted upon the bar and located between the magazine and the printing cylinder to retain the printing wheels on the magazine and to control their transfer between the magazine and the printing cylinder, concentric sleeves carried by the setting member and the gate and extending through and beyond the printing cylinder, gears upon the outer ends of the sleeves, a displaceable column rule associated with the printing cylinder, a printing-wheel receiver located between the printing cylinder and the gears and concentric with the sleeves and adapted to receive printing wheels from the printing cylinder, key controlled means for selectively actuating the gears to manipulate the setting member and the gate, means to reverse the inclined position of the supporting bar with its associated parts to permit gravitation of the selected printing wheels back to the magazine, means in the paths of the gear for the gate to engage and operate said gear during tilting of the supporting bar to rotate the gate to permit the return movement of the printing wheels, and means carried by the outer sleeve and located within the receiver to rotate the printing wheels in the receiver to their original angular positions.

80. In a typographical apparatus, a type bed frame normally inclined to the vertical and pivotally supported on a horizontal axis to permit reversal of the angular disposition of the frame, a printing member on the frame, a magazine on the frame, a plurality of printing wheels mounted on the magazine and capable of gravitating to the printing member, a rotatable setting member to successively receive printing wheels thereon, a rotatable gate associated with the setting member to control the escape of printing wheels from the setting member, and key controlled means for actuating the setting member and the gate, said means including gears and endwise movable racks associated with the gears and disposed on arcs struck from the pivotal axis of the type bed frame.

81. In a typographical apparatus, a type bed frame normally inclined to the vertical and pivotally supported on a horizontal axis to permit reversal of the angular disposition of the frame, a printing member on the frame, a magazine on the frame, a plurality of printing wheels mounted on the magazine and capable of gravitating to the printing member, a rotatable setting member to successively receive printing wheels thereon, a rotatable gate associated with the setting member to control the escape of printing wheels from the setting member, and key controlled means for actuating the setting member and the gate, said means including gears and endwise movable racks associated with the gears and disposed on arcs struck from the pivotal axis of the type bed frame, and a fixed arcuate rack in the path of the gate gear during the reversing movement of the type bed frame to rotate the gate and permit printing wheels on the printing member to gravitate back to the magazine.

82. In a typographical apparatus, a type bed frame, a printing member thereon, a magazine on the frame, printing wheels stored on the magazine and provided with typographical elements, a rotatable setting member to selectively rotate successive printing wheels, a gate to control the transfer of printing wheels from the setting member to the printing member, gears for controlling the setting member and the gate, endwise movable racks associated with the respective gears, a key, pusher devices in cooperative relation with the respective racks, and means actuated by the key for successively actuating the pusher devices to successively actuate the gears.

83. In a typographical apparatus, a type bed frame, a printing member thereon, a magazine on the frame, printing wheels stored on the magazine and provided with typographical elements, a rotatable setting member to selectively rotate successive printing wheels, a gate to control transfer of printing wheels from the setting member to the printing member, gears for controlling the setting member and the gate, endwise movable racks associated with the respective gears, a key, pusher devices in cooperative relation with the respective racks, and means actuated by the key for successively actuating the pusher devices to successively actuate the gears, the type bed frame being normally inclined to the vertical to affect gravitation of the printing wheels from the magazine to the printing member, said frame being pivotally mounted on a horizontal axis to permit reversing the angular disposition of the frame for effecting gravitation of printing wheels from the printing member back to the magazine, and a rack in the path of the gate gear during reversal of the frame, for actuation of the gate to permit gravitation of printing wheels from the printing member to the magazine.

84. In a typographical apparatus, a series of substantially parallel printing members, a group of typographical elements for each printing member, a series of filler members for each group of typographical elements, and means for selectively moving a typographical element to its corresponding printing member and also moving filler members to the other printing members and in alignment with the positioned typographical element at right angles to the set-wise direction.

85. In a typographical apparatus, a series of substantially parallel printing members, a group of typographical elements for each printing member, a bar disposed in substantial parallelism with each printing member and its group of typographical elements, filler members stored upon each bar at one side of the adjacent printing member, means to selectively move typographical elements into printing positions upon the respective printing members, and means for selectively moving filler members along their bars into cooperative relation with respective printing members in alignment with a positioned typographical element at right angles to the set-wise direction.

86. In a typographical apparatus, a series of substantially parallel printing members, a group of typographical elements for each printing member, a series of filler members for each group of typographical elements, and means for selectively moving a typographical element to its corresponding printing member and also moving filler members to the other printing members and in alignment with the positioned typographical element at right angles to the set-wise direction, a series of justifying wedges for each group of typographical elements, means to selectively move justifying wedges into cooperative relation with typographical elements positioned upon the printing member, and means to force said justifying wedges in between successive typographical elements to justify each line of elements.

87. In a typographical apparatus, a series of substantially parallel printing members, a group of typographical elements for each printing member, a series of filler members for each group of typographical elements, means for selectively moving a typographical element to its corresponding printing member and also moving filler members to the other printing members and in alignment with the positioned typographical element at right angles to the set-wire direction, a bar in substantially parallel relation with each printing member and its group of typographical elements, justifying wedges stored upon the bar at one side of the printing member, means to selectively move justifying elements along their bars into cooperative relation with respective printing members, and means to rock the positioned justifying wedges and force them in between elements positioned on the respective printing members to justify the several lines of typographical elements.

88. In a typographical apparatus, a series of substantially parallel printing members, a group of typographical elements for each printing member, a series of filler members for each group of typographical elements, means for selectively moving a typographical element to its corresponding printing member and also moving filler members to the other printing members and in alignment with the positioned typographical element at right angles to the set-wise direction, and means to tilt the printing member and the cooperating members into a position inclined to the vertical to permit gravitation of the positioned typographical elements and filler members to their original positions.

89. In a typographical apparatus, a type bed frame normally inclined to the vertical and pivotally mounted on a horizontal axis to permit of the frame being tilted to a reverse angular position, a series of substantially parallel printing members on the frame, a group of typographical elements in alignment with each printing member and capable of gravitating into printing position upon said printing member, means to selectively permitting the escape of typographical elements to the respective printing members, a series of filler members for each group of typographical elements, means to selectively permit gravitation of filler members into cooperation with respective printing members and in alignment with a positioned typographical element at right angles to the set-wise direction, the typographical elements and the filler members capable of gravitating to their original positions when the angular position of the type bed frame is reversed.

90. In a typographical apparatus, a type bed frame normally inclined to the vertical and pivotally supported at its longitudinal axis to permit reversing of the angular disposition thereof, a series of substantially parallel printing members carried by the frame, a series of typographical elements for each printing member and capable of gravitating into printing positions upon the printing members, key actuated means for selectively controlling the transfer of typographical elements to the printing members, a pair of bars supported by the frame in substantially parallel relation to each of the printing members and its series of typographical elements, a series of filler members mounted upon one of the bars and capable of gravitating into cooperative relation with the adjacent printing member, a series of justifying wedges upon the other bar and capable of gravitating into cooperative relation with the adjacent printing member, means to selectively control the transfer of filler members and justifying elements from their stored positions into cooperation with the respective printing members, means for actuating positioned justifying wedges to justify respective positioned typographical elements, and means to tilt the type bed frame to a reverse angular position to permit gravitation of the positioned members back to their original stored positions.

91. In a typographical apparatus, the combination of a main frame, a type bed frame normally inclined to the vertical and pivotally supported at its longitudinal axis to permit reversing the angular position of said bed frame, a series of substantially parallel bars upon the type bed frame and extending in the inclined direction of said frame, a series of printing cylinders carried by the bars, a series of magazines upon the bars and above the printing cylinders, a plurality of duplicate printing wheels on each magazine and capable of gravitating to the respective printing cylinders, each printing wheel having typographical elements at the periphery thereof, the set-wise widths of the typographical elements of each magazine differing from those of each of the other magazines, a rotatable setting member mounted upon each bar between the magazine and the printing cylinder to receive a printing wheel and selectively rotate the same, a sleeve extending from the setting member through and beyond the printing cylinder, a rotatable gate mounted upon the sleeve between the setting member and the printing cylinder to control the escape of printing wheels from the setting member to the printing cylinder, a sleeve projecting from the gate through and beyond the printing cylinder, gears upon the outer ends of the sleeves, a displaceable column rule in cooperative relation with the printing cylinders to retain printing wheels thereon, means to displace the column rule to permit printing wheels to gravitate from the printing cylinders, receivers in alignment with the lower ends of the printing cylinders to receive printing wheels, a series of filler members for each series of printing wheels, a series of justifying members for each series of printing wheels, key actuated means for rotating the gears to control the setting member and the gate and also to control the filler members and the justifying members, and means in the path of the gate gear to rotate the latter and permit printing wheels to gravitate from the receivers to their respective magazines when the type bed frame is tilted to a reverse inclined position.

92. In a typographical apparatus, a printing cylinder, a series of printing wheels provided on their peripheries with two or more sets of typographical elements, the sets being alphabetically the same but facially different, means to selectively rotate a printing wheel to bring a predetermined typographical character into printing position and then move the wheel to printing position on the printing cylinder, and means to selectively rotate the printing cylinder to bring any one of the sets of typographical elements into printing position.

93. In a typographical apparatus, a printing member having set up thereon a line of typographical elements in printing position, and in compositional order and also provided at different angular positions with similar typographical elements in the same compositional order but facially different, and means for selectively rotating the printing member to bring any one of the lines of typographical elements into printing position.

94. In a typographical apparatus, a printing member, a plurality of lines of typographical elements set up thereon in compositional order, the compositional order of the typographical elements of the several lines being the same but facially different, and means to selectively move the printing member to bring any one of the typographical lines into printing position.

95. In a typographical apparatus, a printing cylinder provided with a series of longitudinal grooves, a cylindrical magazine in alignment with the printing cylinder and provided with a longitudinal groove, a printing wheel embracing the magazine and provided with an internal projection slidably engaging the groove of the magazine, a rotatable setting cylinder disposed between the magazine and the printing cylinder and provided with an open ended groove to receive the projection of the printing wheel, said printing wheel being provided at its periphery with a plurality of sets of typographical elements, said sets of typographical elements being alike alphabetically but facially different, means to selectively rotate the setting member to bring a predetermined typographical element into printing position, a rotatable cylindrical gate between the setting member and the printing cylinder and provided with an open ended groove to receive the projection of the printing wheel and permit escape thereof from the setting member to the printing cylinder, and means to selectively rotate the printing cylinder to bring any one of the sets of typographical elements of the positioned printing wheel into printing position.

96. In a typographical apparatus, a printing cylinder provided with a series of longitudinal grooves, a cylindrical magazine in alignment with the printing cylinder and provided with a longitudinal groove, a printing wheel embracing the magazine and provided with an internal projection slidably engaging the groove of the magazine, a rotatable setting cylinder disposed between the magazine and the printing cylinder and provided with an open ended groove to receive the projection of the printing wheel, said printing wheel being provided at its periphery with a plurality of sets of typographical elements, said sets of typographical elements being alike alphabetically but facially different, means to selectively rotate the setting member to bring a predetermined typographical element into printing position, a rotatable cylindrical gate between the setting member and the printing cylinder and provided with an open ended groove to receive the projection of the printing wheel and permit escape thereof from the setting member to the printing cylinder, and an endwise movable rack having its teeth in cooperative relation with grooves of the printing cylinder to effect selective rotation thereof to bring any one of the sets of typographical elements of the positioned printing wheel into printing position.

97. A printing member having sets of typographical elements of the same set-wise dimension only, said sets having the same sequence but facially different.

98. A cylindrical printing member having sets of typographical elements of the same set-wise dimension only upon the periphery thereof, said sets having the same sequence but facially different.

99. A printing member in the form of a ring having a circular exterior and a circular interior, the exterior of the ring being provided with sets of typographical elements of the same set-wise dimension only, said sets having the same sequence but facially different.

100. A printing member in the form of a ring having a circular exterior and a circular interior, the exterior of the ring being provided with sets of typographical elements of the same set-wise dimension only, said sets having the same sequence but facially different, and a radially disposed projection on the interior of the ring.

101. A printing member having an exterior periphery and an interior periphery, a projection on the interior periphery, and sets of typographical elements of the same set-wise dimension only on the outer periphery, said sets having the same sequence but facially different.

102. A printing member having an exterior periphery and an interior periphery, sets of typographical elements of the same set-wise dimension only upon the outer periphery, said sets having the same sequence but facially different, successive sets being separated by a non-printing space, and a projection on the inner periphery of the printing member at one of the non-printing spaces.

103. A printing font comprising a series of printing members provided with typographical elements, the set-wise dimensions of the typographical elements of one printing member being the same but differing from the set-wise dimensions of the typographical elements of each of the other printing members.

104. A printing font comprising a series of rotatable printing members provided upon their peripheries with typographical elements, the typographical elements of each printing member being of the same set-wise dimension but differing from the set-wise dimensions of each of the other printing members.

105. A printing font comprising six rotatable printing members provided upon their peripheries with typographical elements, the typographical elements of each member being of the same set-wise dimension and differing from the set-wise dimensions of the typographical elements of each of the other printing members.

106. A font of typographical elements divided into groups according to set-wise dimensions, and printing members carrying the respective groups of typographical elements.

107. A font of typographical elements divided into six groups according to set-wise dimensions, and printing members carrying the respective groups of typographical elements.

108. A font of typographical elements divided into groups according to set-wise dimensions, the second group having a set-wise dimension one and one-half times that of the first group, the third group having a set-wise dimension twice that of the first group, the fourth group having a set-wise dimension two and one-half times that of the first group, the fifth group having a set-wise dimension three times that of the first group, and the set-wise dimension of the sixth group being three and one-half times that of the first group.

109. A series of printing members, each printing member having sets of typographical elements, the sets of each printing member being sequentially the same but facially different, and the typographical elements of each printing member being of the same set-wise dimension but differing from the set-wise dimensions of each of the other printing members.

110. A series of printing wheels, each wheel being provided on its periphery with sets of typographical elements, the sets of each wheel being sequentially the same but facially different, there being a non-printing space between successive sets, and the set-wise dimension of the typographical elements of each wheel being the same but differing from the set-wise dimensions of the typographical elements of each of the other wheels.

111. A series of printing wheels, each wheel being provided upon its outer periphery with sets of typographical elements, the sets of each wheel being sequentially the same but facially different and having a set-wise dimension differing from that of the typographical elements of each of the other wheels, there being a non-printing space between successive sets of typographical elements, and each printing wheel being provided with an internal projection at one of the non-printing spaces.

112. In a typographical apparatus, a font of typographical elements divided into groups according to set-wise dimensions, a carrier for each group of typographical elements, and means to selectively shift the respective carriers and to move them in substantially parallel lines into printing positions and in compositional order.

113. In a typographical apparatus, the combination of a font of typographical elements divided into groups according to set-wise dimensions, a rotatable and bodily movable carrier for each group of typographical elements, and means to selectively rotate the carriers to bring predetermined typographical elements thereof into predetermined positions and to move the carriers in substantially parallel lines into printing positions in compositional order.

114. In a typographical apparatus, the combination of printing wheels provided with sets of typographical elements, the sets of each wheel being sequentially the same but facially different and having a set-wise dimension differing from that of the typographical elements of each of the other wheels, means for selectively rotating the wheels to bring predetermined typographical elements into predetermined positions and for bodily moving the wheels into printing positions, and means for selectively rotating the positioned wheels to bring any one of the sets of typographical elements into printing position.

115. The combination with substantially parallel fractional lines of type, of means for taking impressions therefrom in one and the same printing alignment.

116. The combination with substantially parallel fractional lines of type, of means for taking impressions therefrom in successive order and in the same printing alignment.

117. The combination with substantially parallel fractional lines of type, of means for presenting an impression receiving element successively to the lines of type and for taking impressions therefrom in one and the same printing alignment.

118. The combination with substantially parallel fractional lines of type of a carriage having a shiftable platen, means to impart travel to the carriage, and means to selectively shift the platen to take impressions of the lines of type in one and the same printing alignment.

119. The combination with substantially parallel fractional lines of type, of a carriage having an oscillatory platen, means to impart travel to the carriage, and means to selectively oscillate the platen to take impressions of the lines of type in one and the same printing alignment.

120. The combination with substantially parallel fractional lines of type, of a carriage having a platen, means to move the carriage across the lines of type, and means to impart a rolling printing movement to the platen at each fractional line of type to take the impressions in one and the same printing alignment.

121. The combination with substantially parallel fractional lines of type, of means for taking impressions therefrom in one and the same printing alignment, and line spacing mechanism.

122. The combination with substantially parallel fractional lines of type, of a carriage having a shiftable platen, means to impart travel to the carriage, means to selectively shift the platen to take impressions of the lines of type in one and the same printing alignment, and line spacing mechanism for the platen.

123. The combination with substantially parallel fractional lines of type, of a carriage having a platen, means to impart a rolling printing movement to the platen at each fractional line of type to take impressions in one and the same printing alignment, line spacing mechanism for the platen, and means to actuate the line spacing mechanism after the taking of the impression from the last fractional line of type.

124. The combination of a series of substantially parallel printing members, a carriage to travel across said members, a platen on the carriage, and means to impart a rolling printing movement to the platen only when in printing relation with each printing member.

125. The combination of a series of substantially parallel printing members, a carriage to travel across said members, a platen on the carriage, and means to oscillate the platen at each printing member.

126. The combination of a series of substantially parallel printing members, a carriage to travel across said members, a platen on the carriage, means to impart a rolling printing movement to the platen at each printing member, and means to impart line spacing rotation to the platen.

127. The combination of a series of substantially parallel printing members, a carriage to travel across said members, a platen on the carriage, means to impart a rolling printing movement to the platen at each printing member, means to impart line spacing rotation to the platen, and other means to vary the line spacing of the platen.

128. The combination of a series of substantially paralle printing members, a carriage to travel across said members, a platen on the carriage, means to impart a rolling printing movement to the platen at each printing member, means to impart line spacing rotation to the platen, and other means t increase the line spacing of the platen.

129. The combination of a series of substantially parallel printing members, a carriage to travel across said members, a platen on the carriage, means to impart a rolling printing movement to the platen at each printing member, means to impart line spacing rotation to the platen, and other means to decrease the line spacing of the platen.

130. The combination of a series of substantially parallel printing members, a carriage to travel across said members, a platen on the carriage, means to impart a rolling printing movement to the platen at each printing member, means to impart line spacing rotation to the platen, and other means to selectively increase or decrease the line spacing of the platen.

131. The combination of a series of substantially parallel printing members, a carriage to travel across said members, a platen on the carriage, and means to impart a rolling printing movement to the platen only when in printing relation with each printing member and in each direction of travel of the carriage.

132. The combination of a series of substantially parallel printing members, a carriage, means to feed the carriage back and forth across the printing members, a platen on the carriage, and means to impart a rolling printing movement to the platen only when in printing relation with each printing member and selectively in opposite directions according to the direction of travel of the carriage.

133. The combination of a series of substantially parallel printing members, a carriage, means to feed the carriage back and forth across the printing members, a platen on the carriage, and means to impart a rolling printing movement to the platen in one direction during one direction of travel of the carriage and to impart a rolling printing movement in the opposite direction during travel of the carriage in the opposite direction and only when the platen is in printing relation with a printing member.

134. The combination of a series of substantially parallel printing members, a carriage, means to feed the carriage back and forth across the printing members, a platen on the carriage, means to impart a rolling printing action to the platen at each of the printing members, and trip means to reverse the direction of rolling movement of the platen for each direction of travel of the carriage.

135. The combination of a series of substantially parallel printing members, a carriage, means to feed the carriage back and forth across the printing members, a rotatable platen on the carriage, a crank projection associated with the platen, and projections in the path of the crank projection and at each printing member to engage the crank projection and rotate the platen as the latter travels across the projection.

136. The combination of a series of substantially parallel printing members, a carriage, means to feed the carriage back and forth across the printing members, a rotatable platen on the carriage, a crank projection associated with the platen, projections in the path of the crank projection and each printing member to engage the crank projection and rotate the platen as the latter travels across the projection, and means to return the platen to its normal angular position.

137. The combination of a series of substantially parallel printing members, a carriage, means to feed the carriage back and forth across the printing members, a rocking platen on the carriage, a spring device yieldably maintaining the platen in a predetermined angular position, and trip mechanism for rocking the platen at each printing member against the tension of the spring device.

138. The combination of a series of substantially parallel printing members, a carriage, means to feed the carriage back and forth across the printing members, a rocking platen on the carriage, a spring device yieldably maintaining the platen in a predetermined angular position, trip mechanism for rocking the platen at each printing member against the tension of the spring device, and means to reverse the action of the spring device and shift the angular position of the platen for each direction of travel of the carriage.

139. In a typographical apparatus, the combination of a printing member, a carriage mounted to travel back and forth across the printing member and beyond opposite ends thereof, key controlled means for positioning typographical elements on the printing member, and a platen on the carriage and in impression relation to the printing member in each direction of travel of the carriage.

140. The combination of a series of substantially parallel printing members, a carriage mounted to travel back and forth across the printing members, a platen on the carriage and in impression relation to the printing member in each direction of travel of the carriage, and means to impart a rolling printing movement to the platen at each of the printing members.

141. In a typographical apparatus, the combination of a series of substantially parallel printing members, a carriage mounted to travel back and forth across the printing members, a platen on the carriage and in impression relation to the printing members in each direction of travel of the carriage, and means to impart a rolling printing movement to the platen at each printing member selectively in reverse directions in accordance with the direction of travel on the carriage.

142. In a typographical apparatus, the combination of a series of substantially parallel printing members, a carriage mounted to travel back and forth across the printing members and beyond opposite ends of the series of printing members, key controlled means for positioning typographical elements upon the printing members, a platen on the carriage and in impression relation to the printing members in each direction of travel of the carriage, and means to impart a rolling printing movement to the platen at each printing member.

143. In a typographical apparatus, the combination of a type bed frame, key controlled means for positioning typographical elements upon the frame in compositional order but in parallel lines according to setwise dimensions, a carriage mounted to travel back and forth across the positioned typographical elements, and a platen mounted upon the carriage in impression relation to the positioned typographical elements in each direction of travel of the carriage.

144. In a typographical apparatus, the combination of a printing member, a carriage mounted to travel back and forth across the printing member, key controlled means for positioning typographical elements on the printing member, a platen on the carriage and in impression relation to the printing member in each direction of travel of the carriage, line spacing mechanism for the platen, and means at opposite ends of the travel of the carriage for automatically actuating the line spacing mechanism.

145. In a typographical apparatus, the combination of a type bed frame, key controlled mechanism for positioning typographical elements in substantially parallel lines on the type bed frame, a carriage mounted to travel back and forth across the type bed frame, a platen on the carriage and in impression relation to positioned typographical elements in each direction of travel of the carriage, means to impart a rolling printing action to the platen at each line of typographical elements, line spacing mechanism for the platen, and means for actuating the line spacing mechanism for each direction of travel of the carriage, 146. In a typographical apparatus, the combination of a substantially parallel series of printing members, key controlled means for positioning typographical elements upon the printing members, a carriage mounted to travel back and forth across the series of printing members, a rocking platen on the carriage and in impression relation to the printing members in each direction of travel of the carriage, a spring device yieldably maintaining the platen in a predetermined angular position, trip mechanism for rocking the platen at each printing member against the tension of the spring device, and means to reverse the action of the spring device and shift the angular position of the platen for each direction of travel of the carriage.

147. In a typographical apparatus, the combination of a substantially parallel series of printing members, key controlled means for positioning typographical elements upon the printing members, a carriage mounted to travel back and forth across the series of printing members, a rocking platen on the carriage and in impression relation to the printing members in each direction of travel of the carriage, a spring device yieldably maintaining the platen in a predetermined angular position, trip mechanism for rocking the platen at each printing member against the tension of the spring device, means to reverse the action of the spring device and shift the angular position of the platen for each direction of travel of the carriage, line spacing mechanism for the platen, and means for actuating the line spacing mechanism for each direction of travel of the carriage.

GARLAND P. FERRELL.